(12) United States Patent
Xu et al.

(10) Patent No.: US 12,031,726 B2
(45) Date of Patent: Jul. 9, 2024

(54) INGREDIENT FEEDING, COOKING AND HEATING SYSTEM, AND FULL-CLOSED COOKING MACHINE

(71) Applicant: SHANGHAI AICAN ROBOT (GROUP) CO., LTD., Shanghai (CN)

(72) Inventors: Jinbiao Xu, Shanghai (CN); Guang He, Shanghai (CN); Qing He, Shanghai (CN); Luoya Zeng, Shanghai (CN)

(73) Assignee: SHANGHAI AICAN ROBOT (GROUP) CO., LTD., Shanghai (CN)

( * ) Notice: Subject to any disclaimer, the term of this patent is extended or adjusted under 35 U.S.C. 154(b) by 1106 days.

(21) Appl. No.: 16/862,615

(22) Filed: Apr. 30, 2020

(65) Prior Publication Data

US 2020/0297160 A1   Sep. 24, 2020

Related U.S. Application Data

(63) Continuation of application No. PCT/CN2018/113943, filed on Nov. 5, 2018.

(30) Foreign Application Priority Data

Nov. 3, 2017   (CN) .......................... 201711081136.X
Nov. 3, 2017   (CN) .......................... 201711081145.9
(Continued)

(51) Int. Cl.
*F24C 15/20*       (2006.01)
*A47J 36/32*       (2006.01)
(Continued)

(52) U.S. Cl.
CPC .......... *F24C 15/2007* (2013.01); *A47J 36/32* (2013.01); *A47J 36/34* (2013.01); *A47J 36/38* (2013.01);
(Continued)

(58) Field of Classification Search
CPC .. A47J 36/32; A47J 36/34; A47J 36/38; A47J 37/101; A47J 44/00; A47J 37/105;
(Continued)

(56) References Cited

U.S. PATENT DOCUMENTS

| | | | |
|---|---|---|---|
| 4,106,118 A * | 8/1978 | Hoover | B01F 35/7548 241/97 |
| 2009/0297678 A1* | 12/2009 | Liu | A23L 5/11 426/438 |
| 2016/0106259 A1* | 4/2016 | Xu | G07F 17/0078 700/275 |

FOREIGN PATENT DOCUMENTS

| | | |
|---|---|---|
| CN | 1552265 A | 12/2004 |
| CN | 101238954 A | 8/2008 |

(Continued)

OTHER PUBLICATIONS

Machine Translation of Lui et al. JP 2007-512036 performed Aug. 4, 2023 (Year: 2007).*

(Continued)

*Primary Examiner* — Brian W Jennison

(57) ABSTRACT

An ingredient feeding, cooking and heating system comprises a cooking cavity (100) formed by a hollow shell in a sealed manner and main cooking equipment arranged in the cooking cavity (100), the main cooking equipment comprises a wok device and an ingredient feeding device (2), a cooking area for accommodating the wok device is arranged at a middle portion of the interior of the cooking cavity (100), a feeding area for accommodating the ingredient feeding device (2) is arranged at an upper portion of the interior of the cooking cavity (100) and above the cooking area; the wok device comprises a wok (1), a furnace body device (13) adapted for bearing and heating the wok (1), and a wok rotating device (14) adapted for controlling the wok (Continued)

(1) to rotate. A full-closed cooking machine comprises the ingredient feeding, cooking and heating system.

19 Claims, 49 Drawing Sheets

(30) Foreign Application Priority Data

| Nov. 3, 2017 | (CN) | 201711081493.6 |
| Nov. 3, 2017 | (CN) | 201711081495.5 |
| Nov. 3, 2017 | (CN) | 201711083522.2 |
| Nov. 3, 2017 | (CN) | 201721459045.0 |

(51) Int. Cl.
  *A47J 36/34* (2006.01)
  *A47J 36/38* (2006.01)
  *A47J 37/10* (2006.01)
  *A47J 37/12* (2006.01)
  *A47J 44/00* (2006.01)
  *F24C 14/00* (2006.01)
  *H05B 6/12* (2006.01)

(52) U.S. Cl.
  CPC .......... *A47J 37/101* (2013.01); *A47J 44/00* (2013.01); *H05B 6/1227* (2013.01); *A47J 37/105* (2013.01); *A47J 37/1228* (2013.01); *F24C 14/005* (2013.01)

(58) Field of Classification Search
  CPC . A47J 37/1228; F24C 15/2007; F24C 14/005; H05B 6/1227
  See application file for complete search history.

(56) References Cited

FOREIGN PATENT DOCUMENTS

| CN | 201348300 Y | 11/2009 | |
| CN | 101718448 A | 6/2010 | |
| CN | 103110340 A | 5/2013 | |
| CN | 103126513 A | 6/2013 | |
| CN | 103126515 A | 6/2013 | |
| CN | 103284583 A | 9/2013 | |
| CN | 203168901 U | 9/2013 | |
| CN | 203302842 U | 11/2013 | |
| CN | 203576262 U | 5/2014 | |
| CN | 104019480 A | 9/2014 | |
| CN | 204274111 U | 4/2015 | |
| CN | 204654568 U | 9/2015 | |
| CN | 105433759 A | 3/2016 | |
| CN | 105662107 A | 6/2016 | |
| CN | 105686016 A | 6/2016 | |
| CN | 105942136 A | 9/2016 | |
| CN | 205548288 U | 9/2016 | |
| CN | 106166026 A | 11/2016 | |
| CN | 106618161 A | 5/2017 | |
| CN | 206152542 U | 5/2017 | |
| JP | 2007512036 * | 5/2007 | ............ A47J 27/14 |

OTHER PUBLICATIONS

International Search Report of PCT Patent Application No. PCT/CN2018/113943 issued on Feb. 13, 2019.

* cited by examiner

INGREDIENT FEEDING, COOKING AND HEATING SYSTEM, AND FULL-CLOSED COOKING MACHINE

CROSS REFERENCE TO RELATED APPLICATIONS

The present application is a Continuation application of PCT Application No. PCT/CN2018/113943 filed on Nov. 5, 2018, which claims the benefit of Chinese Patent Application Nos. 201711081145.9, 201711081495.5, 201711083522.2, 201711081493.6, 201721459045.0 and 201711081136.X filed on Nov. 3, 2017. All the above are hereby incorporated by reference.

FIELD OF THE INVENTION

The present invention relates to the technical field of intelligent manufacturing and intelligent service, in particular to an ingredient feeding, cooking and heating system and a full-closed cooking machine.

BACKGROUND OF THE INVENTION

Chinese culinary art is extensive and profound and has a variety of cooking techniques, which mainly comprise: stir frying, stewing, deep frying, boiling, steaming, pan frying, grilling, etc. The essence of various cooking techniques is to cook ever-changing dishes with various tastes and flavors by changing food match and controlling heating. Up to now, cooking process involves a lot of manual labor and relies very much on the cooker's experience and skills. Nowadays, an intelligent cooking machine appears, and the cooking machine can automatically complete the cooking process as long as a user puts food ingredients into the cooking machine, so that the user can enjoy delicious food very conveniently. An existing cooking machine generally comprises an ingredient feeding device adapted for containing and putting food ingredients, a wok, a wok rotating mechanism, a wok heating device, a seasoning adding device, a control device and the like, and the working principle of the existing cooking machine is that: the food ingredients are placed in the ingredient feeding device, when the cooking machine starts a cooking procedure, the control device controls the ingredient feeding device to throw the food ingredients in the ingredient feeding device into the wok, at the moment, the control device controls the wok heating device to heat the wok, the control device further controls the wok rotating mechanism to rotate the wok, and in the cooking process, the control device further controls the seasoning adding device to add seasoning into the wok; after a preset cooking procedure is completed, the cooking process can be completed.

However, when the present invention is implemented, the inventor finds that the existing cooking machine does not have any isolation measures for cooking equipment such as an ingredient feeding device and a wok device which are directly contacted with food inside, and relates to the problems of insufficient food safety, sanitation and environmental protection.

SUMMARY OF THE INVENTION

The embodiment of the present invention aims to provide an ingredient feeding, cooking and heating system and a cooking machine capable of achieving full-closed cooking, which can effectively solve the problems of insufficient food safety, sanitation and environmental protection of internal cooking equipment of an existing cooking machine.

In order to achieve the above goal, an embodiment of the present invention provides an ingredient feeding, cooking and heating system comprising a cooking cavity formed by a hollow shell in a sealed manner and main cooking equipment arranged in an interior of the cooking cavity, the main cooking equipment comprises a wok device and an ingredient feeding device, a cooking area for accommodating the wok device is arranged at a middle portion of the interior of the cooking cavity, and a feeding area for accommodating the ingredient feeding device is arranged at an upper portion of the interior of the cooking cavity and positioned above the cooking area; the wok device comprises a wok, a furnace body device adapted for bearing and heating the wok, and a wok rotating device adapted for controlling the wok to rotate; the ingredient feeding device guides in food materials and feeds the food materials into the wok, the furnace body device heats the wok and the wok rotating device rotates the wok, and thereby achieving cooking processing of the food materials in the wok.

Therefore, according to the ingredient feeding, cooking and heating system provided by the embodiment of the present invention, the cooking cavity arranged in the sealed manner is constructed to serve as a sealed cooking working space, and the cooking equipment is arranged in the sealed cooking space in the cooking cavity, so that the cooking function is realized; therefore, the safety and sanitation of main cooking equipment which is in direct contact with food in the cooking cavity can be guaranteed, and the working space related to food safety, sanitation and environmental protection is guaranteed.

Preferably, the wok device further comprises a wok working position controlling device for driving the wok to turn; before the ingredient feeding device feeds the food materials into the wok, the wok working position controlling device drives the wok to turn until an opening of the wok faces the ingredient feeding device.

Preferably, the wok device further comprises a wok lid for closing or opening the wok; after the ingredient feeding device guides in food materials and feeds the food materials into the wok, the wok working position controlling device drives the wok to turn until the opening of the wok faces the wok lid so as to close the wok, then the furnace body device heats the wok and the wok rotating device rotates the wok, and thereby achieving cooking processing of the food materials in the wok; after the wok lid closes the wok, the wok lid rotates along with the wok when the wok rotates.

Preferably, the main cooking equipment further comprises a dish discharging device, and a dish discharging area for accommodating the dish discharging device is arranged below the cooking area in the cooking cavity; after the cooking processing of the food materials in the wok is achieved, the wok is driven by the wok working position controlling device to turn until the opening of the wok faces a dish plate on the dish discharging area so as to achieve dish discharging.

According to the above embodiment, the shell is used for forming the closed cooking cavity, the cooking cavity is sequentially divided into the multiple functional areas such as the feeding area, the cooking area and the dish discharging area from top to bottom, the whole cooking space is orderly and fully utilized, and the size of the cooking cavity is greatly reduced. Besides, the feeding area, the cooking area and the dish discharging area are communicated, mutual cooperation among the discharging device, the wok device and the dish discharging device is facilitated, so that the cooking processes of feeding, cooking and dish discharging are automatic and orderly, the cooking efficiency and effect are effectively improved, the structure is simplified, the size of the cooking cavity is effectively reduced, and the miniaturization development requirement is met.

Preferably, the ingredient feeding device comprises an ingredient-dropping chamber for containing the food materials and at least one compartment door driving mechanism; the bottom wall of the ingredient-dropping chamber is provided with at least one ingredient-dropping opening aligned with an opening of the wok in ingredient feeding process, and each ingredient-dropping opening is provided with a compartment door, and each compartment door driving mechanism is adapted for correspondingly driving the compartment door to be opened and closed.

Preferably, the ingredient feeding device further comprises an ingredient-guiding shell of a hollow structure; the ingredient-guiding shell is provided with an opening formed in a top portion and an opening formed in a bottom portion thereof and is gradually narrowed from the top portion to the bottom portion thereof, the top portion of the ingredient-guiding shell is connected with the bottom portion of the ingredient-dropping chamber, and the opening in the bottom portion of the ingredient-guiding shell is aligned with the opening of the wok during feeding.

Preferably, a side portion of the shell forming the cooking cavity is provided with an ingredient container guiding opening corresponding to the feeding area, a side face of the ingredient-dropping chamber is provided with an ingredient-receiving opening for an ingredient container to go in and out, and the ingredient container guiding opening is correspondingly arranged with the ingredient-receiving opening; a door plate capable of being opened and closed is arranged on the outer side of the ingredient container guiding opening, and a sealing strip is arranged at the juncture of the door plate and the shell.

Preferably, the ingredient feeding device further comprises a flipping mechanism, and the flipping mechanism is adapted for turning the ingredient feeding device as a whole up and down; when the ingredient feeding device guides in the food materials, each ingredient-dropping opening faces the direction opposite to the opening of the wok, and the ingredient-receiving opening is aligned with the ingredient container guiding opening; after the ingredient feeding device guides in the food materials, the ingredient feeding device is turned by the flipping mechanism, so that each ingredient-dropping opening faces the opening of the wok to achieve feeding.

Preferably, two side walls of the shell forming the cooking cavity are each provided with an installing hole for installing the ingredient feeding device in the feeding area, and a sealing ring is arranged at a juncture of the ingredient feeding device and each installing hole.

Preferably, the system further comprises an ingredient feeding device working position conversion motor or/and an ingredient feeding device working position detection device arranged outside the cooking cavity, and the ingredient feeding device working position conversion motor or/and the ingredient feeding device station detection device is/are installed in a matched manner with the ingredient feeding device arranged in the cooking cavity via the installing holes, respectively.

Preferably, the system further comprises a wok lid driving device arranged outside the cooking cavity and adapted for controlling the wok lid to move up and down inside the cooking cavity, and the wok lid is moved directionally towards or away from the opening of the wok by the wok lid driving device so as to close or open the wok.

Preferably, the system further comprises a wok moving control device arranged outside the cooking cavity and adapted for driving the wok to move up and down inside the cooking area; the wok lid is fixed in the cooking cavity by a wok lid fixing device, and the opening of the wok is moved directionally towards or away from the wok lid by the wok moving control device so as to realize the closing or opening of the wok.

Preferably, an opening is formed in a side portion of the shell, the wok lid driving device is connected with the wok lid via the opening to drive the wok lid, and a juncture of the wok lid driving device and the opening in is provided with sealing member.

Preferably, two side walls of the shell are each provided with an installing groove for installing the wok device in the cooking area; and a sealing ring is arranged at a juncture of the wok device and each installing groove.

Preferably, the system further comprises a wok working position conversion motor or/and a wok working position detection device arranged outside the cooking cavity, and the wok working position conversion motor or/and the wok working position detection device is/are connected with the wok device via the installing grooves, respectively.

Preferably, each installing groove further serves as a wok moving installing groove for a connecting shaft of a wok moving control device, and the wok moving installing groove limits the movement range of the wok.

Preferably, a front side wall of the shell is provided with an observation opening corresponding to the cooking area, the observation opening is provided with a door plate capable of being opened and closed at the outer side, and a sealing strip is arranged at a juncture of the door plate and the shell.

Preferably, a front side wall of the shell is provided with a dish discharging outlet corresponding to the dish discharging area, the dish discharging outlet is provided with a door plate capable of being opened and closed at the outer side, and a juncture of the door plate and the shell is provided with a sealing strip.

Preferably, the feeding area, the cooking area and the dish discharging area are sequentially communicated; the ingredient feeding device, the wok device and the dish discharging device which are respectively arranged in the feeding area, the cooking area and the dish discharging area are arranged in a matched manner to complete feeding, cooking and dish discharging processes.

Preferably, a top wall of the shell is provided with a top cover opening for installing a top cover plate capable of being opened and closed, and a sealing strip is arranged at a juncture of the top cover plate and the shell.

Preferably, the interior of the cooking cavity is further adapted as a cooking fume exhaust gathering space, and cooking fume generated by the wok device in the cooking cavity during cooking is gathered in the cooking cavity.

Preferably, the system further comprises a cooking fume treatment device, a side wall of the shell is provided with a first exhaust port for connecting the cooking fume treatment device, and the cooking fume gathered in the cooking cavity is exhausted to the cooking fume treatment device from the first exhaust port to be treated.

Preferably, the wok lid is provided with a smoke outlet corresponding to the first exhaust port; the smoke outlet is communicated with a cooking fume inlet of the cooking fume treatment device via a cooking fume pipeline; the cooking fume generated in the cooking process with the wok being closed is discharged to the cooking fume treatment device from the smoke outlet to be treated; cooking fume escaping into the cooking cavity is exhausted to the cooking fume treatment device from the smoke outlet to be treated when the wok is opened.

Preferably, a side wall or bottom wall of the shell is provided with an exhaust gas return port communicated with a cooking fume outlet of the cooking fume treatment device, and cooking fume exhausted after being treated by the cooking fume treatment device enters the cooking cavity from the exhaust gas return port to be subjected to circulating cooking fume treatment so as to achieve zero emission of the cooking fume.

Preferably, a side wall of the shell is further provided with a second exhaust port communicated with the cooking fume treatment device; the cooking fume escaping into the cooking cavity and the cooking fume entering the cooking cavity from exhaust gas return port are exhausted to the cooking fume treatment device from the second exhaust port to be treated.

Therefore, according to the embodiment of the present invention, the cooking fume generated by the cooking fume generated in the cooking process of the cooking equipment is gathered in the cooking cavity so as to avoid environmental pollution caused by no cooking fume treatment and discharge, and in addition, the cooking fume treated by the cooking fume is returned to the interior of the cooking cavity for circulating cooking fume treatment so as to realize zero discharge of the cooking fume; therefore, the pollution of the cooking fume to the environment can be really avoided.

Preferably, the interior of the cooking cavity is further adapted as a cleaning space and provided with a spraying piece for washing the main cooking equipment, and an opening adapted for being connected with a water outlet is formed in a bottom portion of the cooking cavity so as to drain water generated after the main cooking equipment is washed by the spraying piece.

Preferably, the spraying piece comprises an ingredient feeding device spraying piece arranged at the top portion of the cooking cavity and faces the ingredient feeding device, and the ingredient feeding device is directly flushed by the ingredient feeding device spraying piece.

Preferably, a top portion and a bottom portion of the ingredient feeding device are each provided with an opening communicated with the interior of the ingredient feeding device; before the ingredient feeding device is flushed by the ingredient feeding device spraying piece, water sprayed by the ingredient feeding device spraying piece enters and flushes the interior of the ingredient feeding device from the opening at the top portion, and then flows out from the opening at the bottom portion.

Preferably, when the ingredient feeding device is flushed by the ingredient feeding device spraying piece, the opening of the wok is driven to face the ingredient feeding device spraying piece and the ingredient feeding device, and after the water flushes the interior of the ingredient feeding device, the water flows out from the opening at the bottom portion and falls into the wok from the opening of the wok, and therefore an interior of the wok is indirectly flushed.

Preferably, the spraying piece comprises a wok spraying piece arranged at a side portion or a bottom portion of the cooking cavity, and an interior of the wok is directly flushed by the wok spraying piece when the wok is driven to turn until the opening of the wok faces the wok spraying piece.

Preferably, the wok is driven by the wok rotating device to rotate around the central axis of the wok to be matched with flushing in the process of flushing the interior of the wok by the wok spraying piece.

Preferably, after the interior of the wok is flushed by the wok spraying piece, the wok is driven to turn to a position where the opening of the wok faces an opening at a bottom portion of the cooking cavity, so that flushed water falls into the opening at the bottom portion of the cooking cavity to be drained.

Preferably, the opening at the bottom portion of the cooking cavity is connected with the water outlet via a water draining device, and the opening at the bottom portion of the cooking cavity is in sealed connection with the water draining device.

Preferably, a draining guiding cavity is formed in the bottom of the cooking cavity, and an outlet of the draining guiding cavity is provided as the opening at the bottom portion of the cooking cavity to be connected with the water outlet.

Preferably, the outlet of the draining guiding cavity is connected with the water outlet via a garbage processor, and the outlet of the draining guide cavity is in sealed connection with an inlet of the garbage processor.

Preferably, the system further comprises accessory cooking equipment, and the accessory cooking equipment comprises a top spraying water pipe and a top spraying head switch; the ingredient feeding device spraying piece comprises a high-pressure spraying head, the high-pressure spraying head is connected to an external water source through the top spraying water pipe, and the top spraying head switch is adapted for controlling the opening and closing of the high-pressure spraying head.

Preferably, the system further comprises accessory cooking equipment, and the accessory cooking equipment comprises a side spraying water pipe and a side spraying head switch; the wok spraying piece comprises a high-pressure spray head, the wok spraying piece is connected with an external water source via the side spraying water pipe, and the side spraying header switch is adapted for controlling the opening and closing of the wok spraying piece.

Preferably, when the wok spraying piece is fixed to a side portion of the cooking cavity, the wok spraying piece is disposed above and proximate to the opening at the bottom portion of the cooking cavity.

Preferably, the bottom portion of the cooking cavity is provided with a dish discharging area drain outlet for discharging sewage falling into the dish discharging area; or, the bottom portion of the cooking cavity is provided with a dish discharging tray and a flushing piece, the flushing piece is arranged at one end of a top face of the dish discharging tray, the top face of the dish discharging tray gradually inclines downwards from the one end to the other end, and the other end of the top face of the dish discharging tray is connected with the opening at the bottom portion of the cooking cavity.

Therefore, according to the embodiment of the present invention, the cooking cavity arranged in a sealed manner is constructed as a closed cooking working space, the cooking equipment is arranged in the closed cooking space in the cooking cavity to realize the cooking function, and the spraying piece capable of washing the cooking equipment is arranged in the cooking cavity; an opening used for being connected with a water outlet is formed in the bottom of the cooking cavity so as to discharge water generated after the spraying piece washes the cooking equipment. The cooking equipment in the cooking cavity is washed by the spraying piece, washing is more comprehensive, the efficiency is higher, the washing effect is better, and the cleanness and sanitation of the working space in the cooking cavity can be effectively kept. In addition, under the airtight protection effect of the cooking cavity arranged in the sealed manner, water sprayed out by the spraying piece and water for washing the cooking equipment can be limited in the sealed cooking cavity, and the problems that the water splashes out of the cooking cavity to influence the cooking function inside the sealed cooking cavity are solved.

Preferably, the system further comprises a seasoning adding device arranged outside the cooking cavity, the seasoning adding device comprises seasoning bottles adapted for containing liquid seasoning, each of the seasoning bottles is communicated with the wok device via a seasoning pipe, and a seasoning pump is arranged at the seasoning pipe.

Preferably, the seasoning adding device further comprises a seasoning rack for accommodating the seasoning bottles, and the seasoning rack is arranged below the shell.

Preferably, each seasoning bottle is communicated with a seasoning adding channel arranged at a wok lid via the seasoning pipe.

Preferably, each seasoning bottle is communicated with a smoke outlet formed in a wok lid and a first exhaust port which is formed in the shell and corresponds to the smoke outlet via the seasoning pipe, and the seasoning adding device is adapted for adding seasoning in a cooking process with the wok closed.

Therefore, according to the embodiment, on the basis of the sealed cooking cavity constructed by the shell, the seasoning adding device is arranged outside the cooking cavity, the seasoning adding device comprises the seasoning bottles filled with the liquid seasoning, each seasoning bottle is connected with the wok device arranged inside the cooking cavity via the seasoning pipe and the seasoning pump, and therefore, seasonings can be added into the wok device at any time in the cooking process so as to complete the cooking processing of food.

The embodiment of the present invention correspondingly provides a full-closed cooking machine comprising the ingredient feeding, cooking and heating system in any embodiment.

According to the cooking machine provided by the embodiment of the present invention, the cooking cavity which is arranged in the sealed manner is constructed to serve as the sealed cooking working space, and the cooking equipment is arranged in the sealed cooking space in the cooking cavity to achieve the cooking function; therefore, the safety and sanitation of main cooking equipment which is in direct contact with food in the cooking cavity can be guaranteed, and the working space related to food safety, sanitation and environmental protection is guaranteed.

Preferably, the cooking machine comprises an outer shell and an inner shell arranged inside the outer shell, and the cooking cavity is formed inside the inner shell.

Preferably, the main cooking equipment comprising an ingredient feeding device, a wok device, a wok lid device and a dish discharging device is arranged in the cooking cavity; accessory cooking equipment for assisting the main cooking equipment in achieving cooking function is arranged outside the cooking cavity and placed in an area formed between the outer shell and the inner shell; the wok device comprises a wok, a furnace body device adapted for bearing and heating the wok, a wok rotating device adapted for controlling the wok to rotate and a wok working position controlling device adapted for driving the wok to turn.

Preferably, the accessory cooking equipment comprises a wok working position conversion motor and a wok working position detection device, and the wok working position conversion motor and the wok working position detection device are respectively arranged at middle portions of two side walls of the inner shell and installed in a matched manner with the wok device.

Preferably, the accessory cooking equipment comprises an ingredient feeding device working position conversion motor and an ingredient feeding device working position detection device, the ingredient feeding device working position conversion motor and the ingredient feeding device working position detection device are respectively arranged at upper positions of two side walls of the inner shell and installed in a matched manner with the ingredient feeding device.

Preferably, the accessory cooking equipment comprises a cooking fume treatment device, the cooking fume treatment device is located at an upper portion of the rear wall of the inner shell and connected with a first exhaust port which is formed in a position, corresponding to the wok lid, in the cooking cavity via a cooking fume pipeline.

Preferably, the accessory cooking equipment comprises a seasoning adding device, the seasoning adding device is arranged below the inner shell and far away from an opening at the bottom portion of the cooking cavity, the seasoning adding device comprises seasoning bottles, and each seasoning bottle is communicated with a smoke outlet of a wok lid via a seasoning pipe and a seasoning pump.

Preferably, the accessory cooking equipment device comprises a garbage processor disposed below the inner shell and in sealed connection with an opening at the bottom portion of the cooking cavity.

Preferably, the accessory cooking equipment device further comprises an electric member, a circuit member, a power supply, a transmission line and a pipeline component.

Preferably, the cooking machine further comprises a left rack and a right rack, and the left rack and the right rack are connected with the inner shell to fix the inner shell inside the outer shell.

Preferably, the tops of the two side walls of the inner shell are each provided with a connecting upper edge opening, and the tops of the left rack and the right rack are each provided with a first connecting hole position correspondingly connected with the connecting upper edge opening; the two side parts of the front side wall of the inner shell are each provided a connecting front edge opening, and the side portions of the left rack and the right rack are each provided with a second connecting hole position correspondingly connected with the connecting front edge opening.

Preferably, the outer shell comprises a bottom plate, a left side plate, a right side plate and a rear plate which are fixedly connected with the left rack and the right rack; the outer shell further comprises a middle door plate adapted for opening/closing an ingredient container guiding opening and a dish discharging outlet of the inner shell, a top cover door plate adapted for opening/closing a top cover opening of the inner shell, and a seasoning bin door plate adapted for opening/closing a seasoning area which is formed between the inner shell and the bottom plate and adapted for containing a seasoning adding device.

Preferably, the middle door plate and the seasoning bin door plate are integrally formed.

Preferably, the left and right racks are each provided with an ingredient feeding device installation position and a wok device installation position; the ingredient feeding device installation positions respectively correspond to ingredient feeding mechanism installation holes which are formed in the inner shell and used for installing the ingredient feeding device in the feeding area, and the wok device installation positions respectively correspond to installation grooves which are formed in the inner shell and used for installing the wok device in the cooking area.

Preferably, the accessory cooking equipment device further comprises a wok moving control device, and the wok moving control device is arranged on at least one of the wok device installation positions of the left and right racks.

Therefore, according to the cooking machine capable of achieving full-closed cooking provided by the embodiment of the present invention, all the functional components are combined into a whole with the sealed cooking cavity as the core, and main cooking equipment, such as the ingredient feeding device, the furnace body device and the wok lid device, making direct contact with food materials is arranged in the closed space of the cooking cavity; and the spraying piece is arranged in the cooking cavity to flush the cooking equipment, so that water and smoke are blocked in the sealed cooking cavity, the flushed water is discharged in a unified manner after being treated, and environmental pollution caused by cooking fume discharge is avoided. In addition, accessory cooking equipment (including an electric appliance, a circuit, a power supply, a transmission line, a pipeline part and the like which are arranged in a matched manner with the main cooking equipment to work) for assisting the main cooking equipment in realizing a cooking function is arranged outside the cooking cavity and is an area formed between the outer shell and the inner shell of the cooking machine; therefore, the working space, related to food safety, sanitation and environmental protection, in the cooking machine can be guaranteed.

DETAILED DESCRIPTION OF ILLUSTRATED EMBODIMENTS

Technical solutions in embodiments of the present invention will be described clearly and fully hereinafter in conjunction with the accompanying drawings in embodiments of the present invention, and obviously, the described embodiments are only a part of, and not all, embodiments of the present invention. Based on the embodiments of the present invention, all other embodiments obtained by one of ordinary skill in the art without creative work fall within the scope of the present invention.

Figure 1:
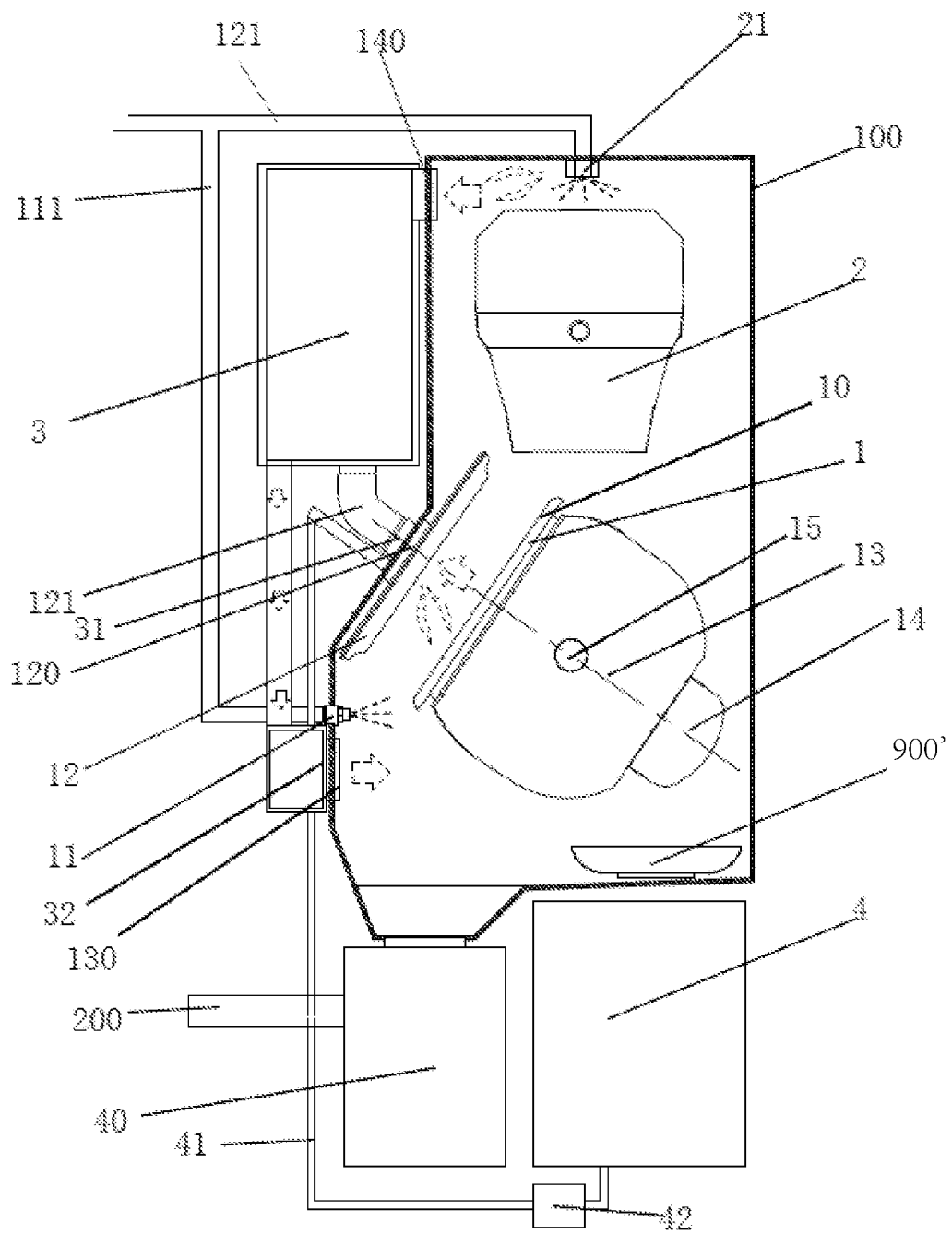
FIG. 1 is a block diagram of a structural assembly of a total cooking system of a cooking machine capable of achieving full-closed cooking according to an embodiment of the present invention.
Figure 2A:
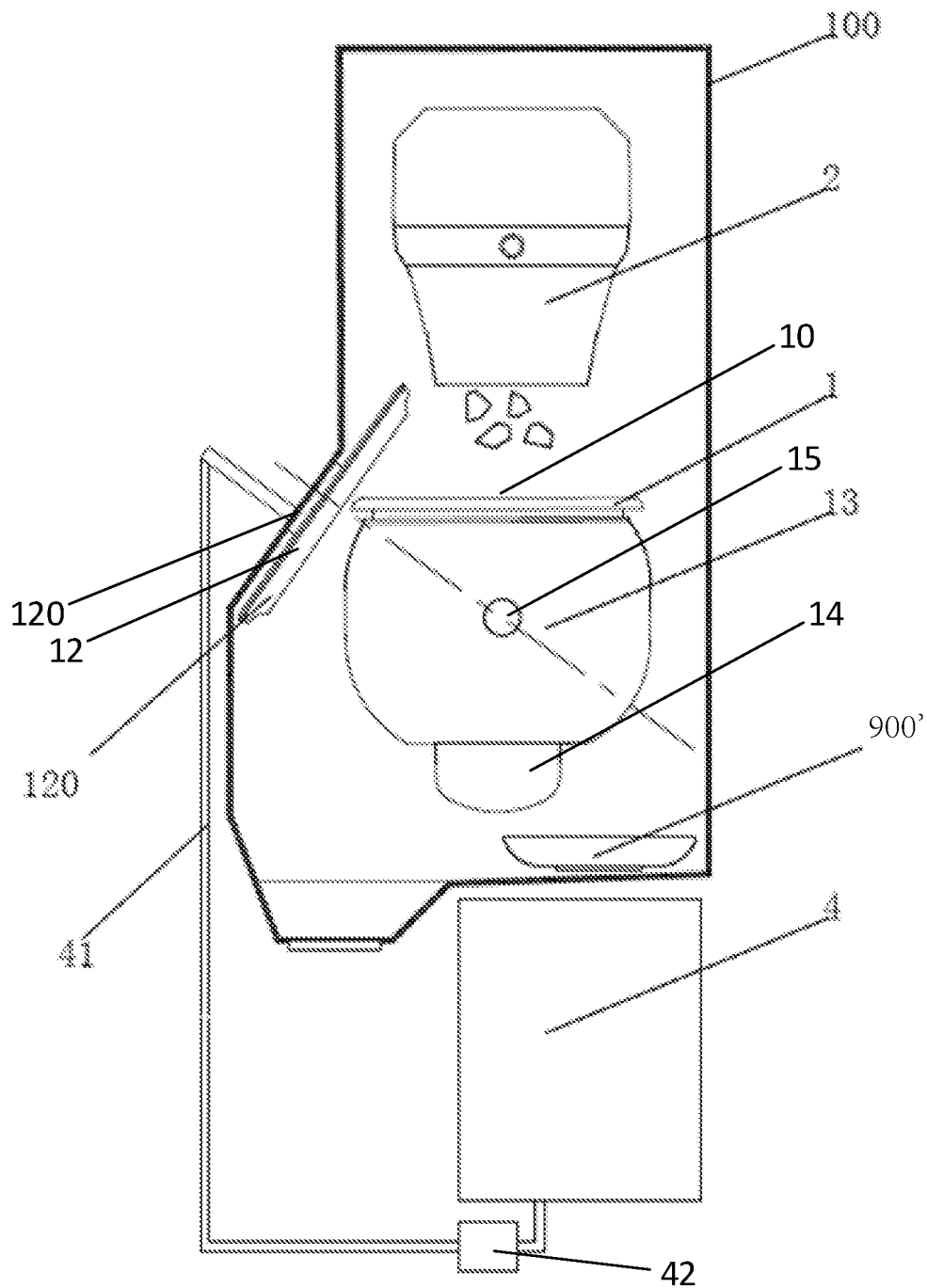
FIG. 2a is a structural block diagram of an ingredient feeding, cooking and heating system according to an embodiment of the present invention.

With reference to FIGS. 1 and 2a, the embodiment of the present invention provides an ingredient feeding, cooking and heating system which comprises a cooking cavity 100 and main cooking equipment, the cooking cavity 100 is formed by a hollow shell in a sealed manner, the main cooking equipment is arranged in the cooking cavity 100 and comprises a wok device and an ingredient feeding device 2. A cooking area for containing the wok device is arranged in the middle portion of the interior of the cooking cavity 100, and a feeding area for containing the ingredient feeding device 2 is arranged at the position, located above the cooking area, of the upper portion of the interior of the cooking cavity 100; the wok device comprises a wok 1, a furnace body device 13 used for bearing and heating the wok, and a wok rotating device 14 used for controlling the wok to rotate. The ingredient feeding device 2 guides in food materials and feeds the food materials into the wok 1, the furnace body device 13 heats the wok and the wok rotating device 14 rotates the wok, and thereby achieving cooking processing of the food materials in the wok 1.

Further, the wok device further comprises a wok working position controlling device 15 used for driving the wok to turn, and before the ingredient feeding device 2 feeds the food materials into the wok, the wok working position controlling device 15 drives the wok 1 to turn until the opening of the wok faces the ingredient feeding device 2.

Furthermore, the wok device further comprises a wok lid 12 used for closing or opening the wok 1, and after the ingredient feeding device 2 guides in food materials and feeds the food materials into the wok 1, the wok working position controlling device 15 drives the wok 1 to turn until the wok opening 10 faces the wok lid 12 so as to realize the closing of the wok 1. The furnace body device 13 heats the wok and the wok rotating device 14 rotates the wok, so that the cooking processing of the food materials in the wok is realized. Besides, after the wok lid 12 closes the wok 1, the wok lid 12 rotates along with the wok 1 when the wok 1 rotates, so that the sealing performance of the wok 1 in the closed heating cooking process is guaranteed, and the food cooking efficiency and effect are improved.

Furthermore, the main cooking equipment further comprises a dish discharging device, and a dish discharging area for containing the dish discharging device is arranged at the position, located below the cooking area, in the cooking cavity 100. After the food materials in the wok are cooked, the wok 1 is driven by the wok working position controlling device 15 to turn until the opening of the wok faces a dish plate 900' on the dish discharging area so as to realize dish discharging.

Further, the system further comprises a wok moving control device (arranged outside the cooking cavity and not shown) for controlling the wok 1 to move towards or away the wok lid 12 in a directional mode, and a feeding area for containing the ingredient feeding device 2, a cooking area for containing the wok device and a dish discharging area for containing the dish discharging device are sequentially arranged inside the cooking cavity 100 from top to bottom. When ingredient feeding are cooking are to be performed, food materials are guided in and fed into the wok 1 by the ingredient feeding device 2, and the wok 1 is turned to a feeding working position (the wok opening 10 faces the ingredient feeding device 2) under the action of the wok working position controlling device 15; and then the wok 1 is turned to a cooking working position (the opening of the wok faces the wok lid 12) and is closed under the action of the wok moving control device for heating and stir-frying. After cooking is finished, the wok 1 is turned to a dish discharging working position (the opening of the wok faces the dish plate 900' in the dish discharging area) to discharge dishes. It will be appreciated that as an alternative embodiment, in the ingredient feeding, cooking and heating system, the configuration and manner in which the wok lid 12 is movable in direction to close the wok 1 may be adopted. The feeding area, the cooking area and the dish discharging area are sequentially communicated, and the ingredient feeding device, the wok device and the dish discharging device which are respectively arranged in the feeding area, the cooking area and the dish discharging area are arranged in a matched manner to complete the processes of feeding, cooking and dish discharging.

Therefore, according to the ingredient feeding, cooking and heating system provided by the embodiment of the present invention, the cooking cavity arranged in the sealed manner is constructed to serve as a closed cooking working space, and the main cooking equipment is arranged in the closed cooking space in the cooking cavity, so that the cooking function is realized; therefore, the safety and sanitation of main cooking equipment which is in direct contact with food in the cooking cavity can be guaranteed, and the working space related to food safety, sanitation and environmental protection is guaranteed.

It can be understood that when the ingredient feeding, cooking and heating system provided by the embodiment of the present invention is applied to a specific implementation environment (such as an cooking machine), other functional systems of the cooking machine can be further added to perfect more functions of the cooking machine by utilizing the cooking cavity which is constructed by the ingredient feeding, cooking and heating system and is arranged in a sealed manner, and thereby obtaining a multifunctional cooking machine capable of achieving full-closed cooking. For example, a flushing system, a cooking fume treatment system, and a seasoning adding system may be added based on the sealed cooking cavity.

Figure 2B:
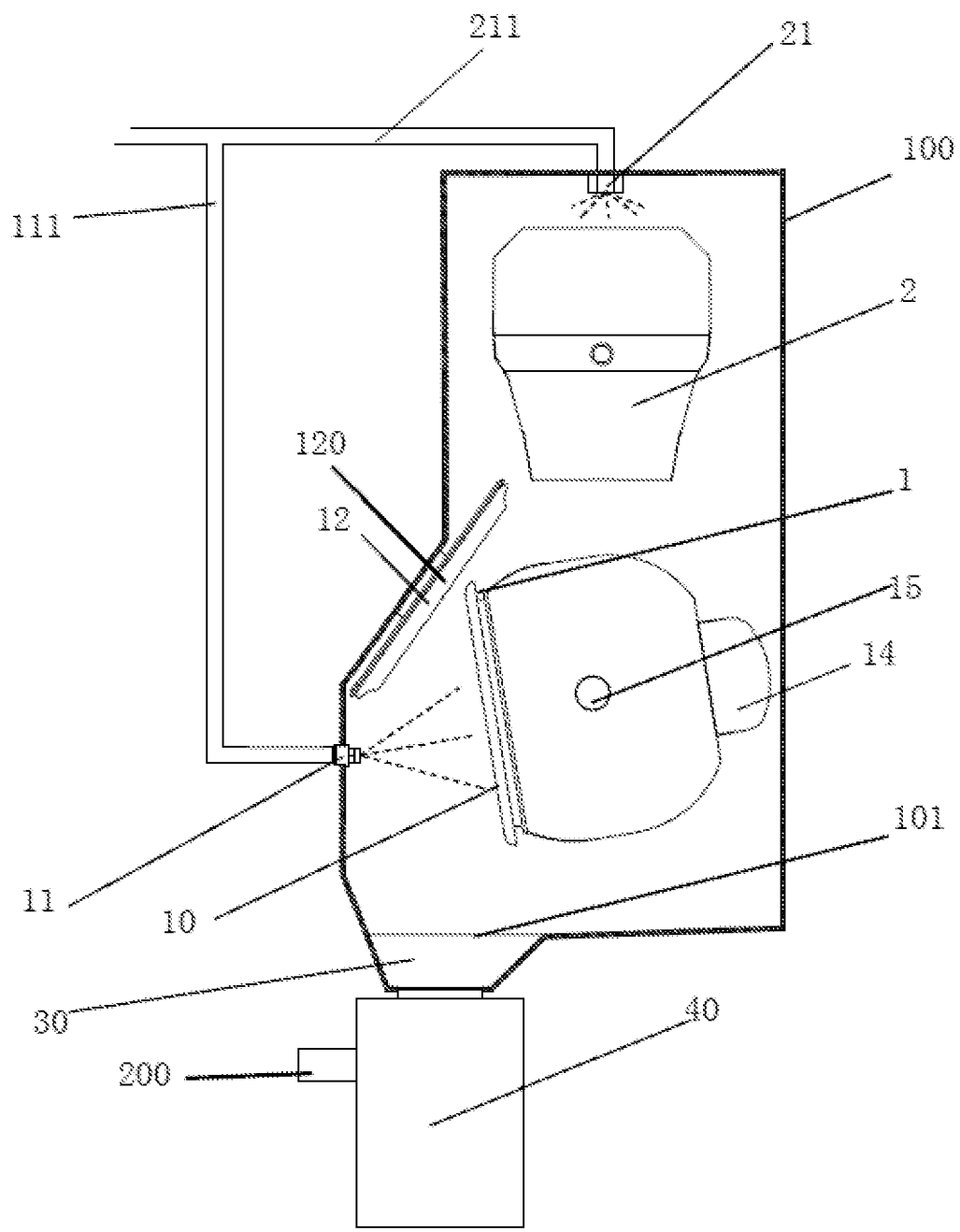
FIG. 2b is a structural block diagram of a flushing system of the total cooking system shown in FIG. 1.

With reference to FIGS. 1 and 2b, the flushing system comprises cooking equipment arranged in the cooking cavity 100 and further comprises a spraying piece arranged in the cooking cavity 100 to flush the cooking equipment. An opening 101 used for being connected with the draining opening 200 is formed in the bottom of the cooking cavity 100, so that water generated after the spraying piece washes the cooking equipment can be drained. The cooking equipment comprises a wok 1, and when the wok 1 is driven by a wok working position controlling device 15 to turn until the wok opening 10 faces to a spraying piece, the interior of the wok 1 is flushed by the spraying piece.

In an embodiment of the flushing system, the cooking equipment further comprises an ingredient feeding device 2 arranged above the wok 1; a cooking area used for containing the wok 1 is arranged in the middle portion of the interior of the cooking cavity 100, a feeding area used for containing the ingredient feeding device 2 is arranged at the position, located above the cooking area, of the interior of the cooking cavity 100, and the feeding area is communicated with the cooking area. The spraying piece comprises an ingredient feeding device spraying piece 21 which is arranged on the top portion of the cooking cavity 100 and faces the ingredient feeding device 2, and the ingredient feeding device is directly flushed by the ingredient feeding device spraying piece 21. Specifically, openings communicating with the interior of the ingredient feeding device 2 are formed in the top portion and the bottom portion thereof correspondingly; when the ingredient feeding device 2 is flushed by the ingredient feeding device spraying piece 21, water sprayed out of the discharging device spraying piece 21 flushes the interior of a cavity of the ingredient feeding device 2 from the top openings of the ingredient feeding device 2, and then the water flows out from the bottom openings of the ingredient feeding device 2. Before the ingredient feeding device 2 is flushed by the ingredient feeding device spraying piece 21, the wok 1 is driven by the wok working position controlling device 5 to be turned till the wok opening 10 faces the ingredient feeding device spraying piece 21 and the ingredient feeding device 2, and then the ingredient feeding device 2 is flushed by the ingredient feeding device spraying piece 21; water sprayed by the ingredient feeding device spraying piece 21 enters and flushes the interior of the ingredient feeding device 2 from a top opening of the ingredient feeding device 2, and the water flows out from a bottom opening of the ingredient feeding device 2 and falls into the wok 1 from the wok opening 10, and therefore the interior of the wok 1 is indirectly flushed. After the interior of the ingredient feeding device 2 and the interior of the wok are flushed by the ingredient feeding device spraying piece 21, the wok 1 is driven by the wok working position controlling device 15 to be turned to the position where the wok opening 10 faces the bottom opening of the cooking cavity 100, and therefore washed water is poured out and falls into the bottom opening 101 of the cooking cavity 100 to be drained. Preferably, when the ingredient feeding device 2 is flushed by the ingredient feeding device spraying piece 21, the water outlet center axis of the ingredient feeding device spraying piece 21 coincides with the center axis of the ingredient feeding device 2 and the center axis of the wok opening 10. The ingredient feeding device spraying piece 21 is fixed to the top portion of the cooking cavity 100, and the included angle between the water outlet center axis of the ingredient feeding device spraying piece 21 and the horizontal plane is 90 degrees.

In another embodiment or as an improvement on the above embodiment, the spraying piece comprises a wok spraying piece 11 arranged on a side portion or the bottom portion of the cooking cavity 100, and when the wok 1 is driven by the wok working position controlling device 5 to be turned to the wok opening 10 faces the wok spraying piece 11, the wok spraying piece 11 sprays water to directly flush the inner cavity of the wok 1. Preferably, when the wok spraying piece 11 is fixed to the side portion of the cooking cavity 100, the included angle between the water outlet center axis of the wok spraying piece 11 and the horizontal plane is 0-45 degrees; and when the wok spraying piece 11 is fixed at the bottom of the cooking cavity 100, the included angle between the water outlet central axis of the wok spraying piece 11 and the horizontal plane is 45-90 degrees. In addition, when the wok spraying piece 11 is fixed to the side portion of the cooking cavity 100, the bottom opening 101 of the cooking cavity 100 is close to the side portion where the wok spraying piece 11 is arranged, and the wok spraying piece 11 is arranged above the bottom opening 101 of the cooking cavity 100. Thus, when the inner cavity of the wok 1 is directly flushed by the wok spraying piece 11, the wok opening 10 simultaneously faces the wok spraying piece 11 and the bottom opening 101 of the cooking cavity 100, so that the sewage after flushing the interior of the wok can be drained in the flushing process, and the flushing effect and efficiency are further improved.

As a further improvement of the above two embodiments, in the process that the interior of the wok 1 is indirectly flushed by the ingredient feeding device spraying piece 21 or the interior of the wok 1 is directly flushed by the wok spraying piece 11, the wok 1 is driven by the wok rotating device 14 to rotate around the central axis of the wok 1 so as to be washed in a matched mode, so that the flushing effect and efficiency are further improved.

Further, the ingredient feeding device spraying piece 21 comprises a high-pressure spraying head, the flushing system further comprises a top spraying water pipe 211 and a top spraying head switch (not shown) which are arranged outside the cooking cavity 100, and the ingredient feeding device spraying piece 21 is connected with an external water source via the top spraying water pipe 211; the top spray header switch is used for controlling the opening and closing of the ingredient feeding device spraying piece 21.

Furthermore, the wok spraying piece 11 comprises a high-pressure spraying head, the flushing system further comprises a side spraying water pipe 111 and a side spraying head switch (not shown) which are arranged outside the cooking cavity 100, and the wok spraying piece 11 is connected with an external water source via the side spraying water pipe 111; the side spray header switch is used for controlling the opening and closing of the wok spraying piece 11.

It will be appreciated that top spraying head switch of the ingredient feeding device spraying piece 21 and the side spraying water pipe of the wok spraying piece 11 described above may be the same switch, for example employing a multi-way valve to achieve simultaneous control of opening and closing of the ingredient feeding device spraying piece 21 and the wok spraying piece 11.

Therefore, according to the flushing system provided by the embodiment of the present invention, the sealed cooking cavity is used as the sealed cooking working space, the cooking equipment is arranged in the sealed cooking space in the cooking cavity to realize the cooking function, the spraying piece capable of flushing the cooking equipment is arranged in the cooking cavity, and an opening used for being connected with a water outlet is formed in the bottom of the cooking cavity so as to discharge water generated after the spraying piece flushes the cooking equipment. The cooking equipment in the cooking cavity is flushed by the spraying piece, washing is more comprehensive, the efficiency is higher, the washing effect is better, and the cleanness and sanitation of the working space in the cooking cavity can be effectively kept. In addition, under the airtight protection effect of the cooking cavity arranged in the sealed manner, water sprayed out by the spraying piece and water for washing the cooking equipment can be limited in the sealed cooking cavity, and the problems that the water splashes out of the cooking cavity to influence the cooking function inside the sealed cooking cavity are solved.

Figure 2C:
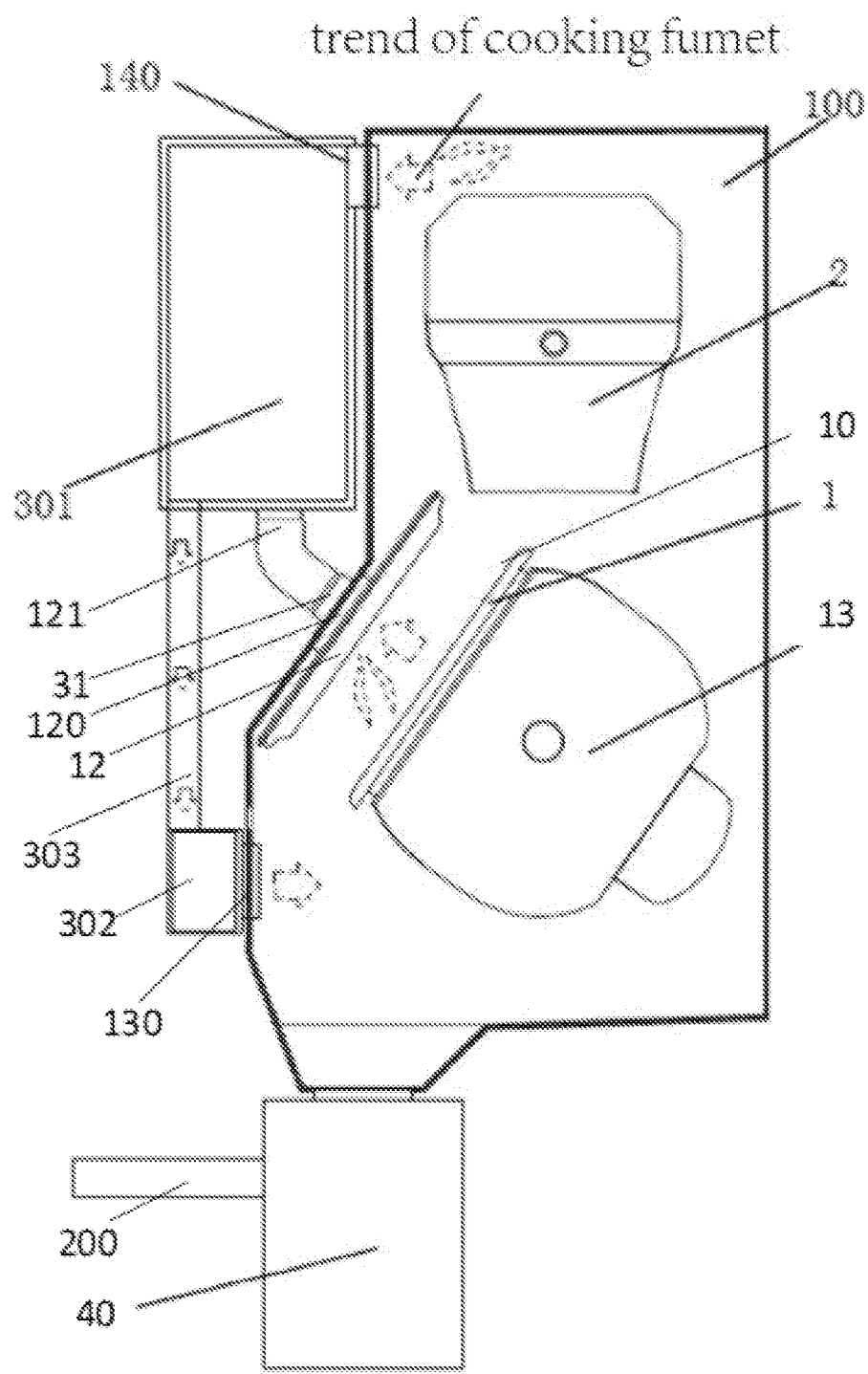
FIG. 2c is a structural block diagram of a cooking fume treatment system of the total cooking system shown in FIG. 1.

As shown in FIG. 2c, the cooking fume treatment system comprises a wok device (comprising a wok 1) arranged in the cooking cavity 100 and a wok lid 12 used for being matched with the wok opening 10 to open or close the wok 1, the wok lid 12 is provided with an exhaust port 120, and the exhaust port 120 is communicated with a cooking fume inlet 31 of a cooking fume treatment device 3 arranged outside the cooking cavity 100 via a cooking fume pipeline 121.

The wok device further comprises a furnace body device 51 used for bearing and heating the wok 1, the cooking fume generated in the closed cooking process of the wok 1 is discharged to the cooking fume treatment device 3 from the exhaust port 120 for cooking fume treatment, and the cooking fume escaping into the cooking cavity 100 is discharged to the cooking fume treatment device 3 from the exhaust port 120 for cooking fume treatment when the wok 1 is opened.

Preferably, an cooking fume outlet 32 of the cooking fume treatment device 3 is communicated with the interior of the cooking cavity 100 (the cavity is provided with an exhaust gas return port 130), and cooking fume discharged after being treated by the cooking fume treatment device 3 enters the cooking cavity 100 from the cooking fume outlet 32 to be subjected to circulating cooking fume treatment so as to achieve zero emission of the cooking fume. Preferably, a cooking fume inlet 31 of the cooking fume treatment device 3 is further directly communicated with the interior of the cooking cavity 100 (the cavity is provided with an exhaust port 140), and cooking fume in the cooking cavity 100 is exhausted to the cooking fume treatment device 3 from the exhaust port for cooking fume treatment. Thus, cooking fume escaping into the cooking cavity 100 in the cooking process and cooking fume flowing back into the cooking cavity 100 after being treated by the cooking fume treatment device 3 can be exhausted to the cooking fume treatment device 3 from the exhaust port for cooking fume treatment.

Preferably, the cooking fume treatment device 3 comprises a first cooking fume treatment device 301 and a second cooking fume treatment device 302, the cooking fume inlet 31 of the first cooking fume treatment device 301 is communicated with the exhaust port 120 formed in the wok lid and directly communicated with the interior of the cooking cavity 100 (the cavity is provided with an exhaust port 140), a cooking fume outlet of the first cooking fume treatment device 301 is communicated with a cooking fume inlet of the second cooking fume treatment device 302 via an cooking fume pipeline 303, and the cooking fume outlet 32 of the second cooking fume treatment device 302 is communicated with the interior of the cooking cavity 100 (the cavity is provided with an exhaust gas return port 130). Therefore, after the cooking fume in the cooking cavity is treated by the first cooking fume treatment device 301, the cooking fume continues to be treated by the second cooking fume treatment device 302 and then returns to the interior of the cooking cavity, cooking fume is not discharged outwards, so that the cooking fume treatment effect and efficiency are improved, and zero emission of cooking fume in a real sense is realized. In addition, oil, water and gas condensed and collected by the first cooking fume treatment device and the secondary cooking fume treatment device are discharged out by the garbage treater 40 along with water from the draining cavity.

As shown in the FIG. 2b, the seasoning adding system comprises an seasoning device 4 arranged outside the cooking cavity 100 (preferably arranged below the cooking cavity 100 and far away from the bottom opening 101 of the cooking cavity 100), and the seasoning device 4 comprises seasoning bottles (not shown) and a seasoning rank 401 used for containing the seasoning bottles; each seasoning bottle is communicated with the exhaust port 120 of the wok lid 12 via an a seasoning pipe 41 (and a seasoning pump 42) so as to realize automatic addition of seasonings (liquid seasonings) in the whole cooking process.

Therefore, when the ingredient feeding, cooking and heating system provided by the embodiment of the present invention is applied to a specific implementation environment (such as a cooking machine), all the functional components are combined into a whole by taking the sealed cooking cavity as a core; main cooking equipment such as the ingredient feeding device, the furnace body device and the wok lid device which is in direct contact with food materials are arranged in the closed space of the cooking cavity to achieve the cooking functions of feeding, cooking, heating, dish discharging and the like, and the spraying piece is arranged in the cooking cavity to flush the cooking equipment, so that water and cooking fume are blocked in the sealed cooking cavity, and the flushed water is treated and then discharged in a unified manner, so that the environmental pollution caused by cooking fume discharge is avoided. In addition, accessory cooking equipment (including an electric appliance, a circuit, a power supply, a transmission line, a pipeline part and the like which are arranged in a matched manner with the main cooking equipment to work) for assisting the main cooking equipment in realizing a cooking function is arranged outside the cooking cavity, and therefore, the working space, related to food safety, sanitation and environmental protection, in the cooking machine can be guaranteed.

In the following, specific implementation structures, specific implementation modes and working principles of the ingredient feeding, cooking and heating system provided by the embodiment of the present invention applied to a specific implementation environment (such as a cooking machine) are described and explained in detail in combination with a plurality of specific embodiments.

Embodiment 1

Figure 3:
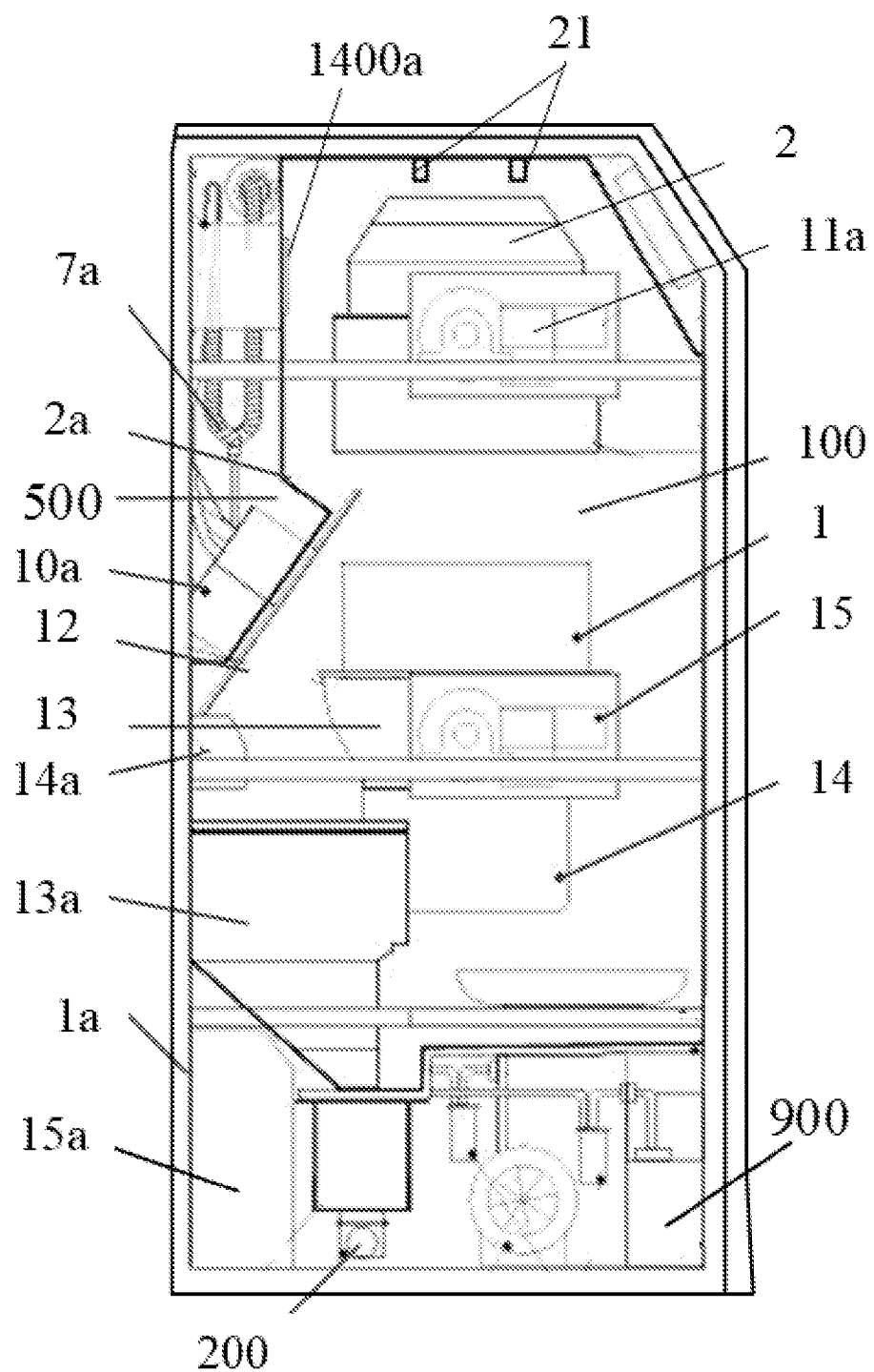
FIG. 3 is a structural schematic diagram of the cooking machine provided by the first embodiment of the present invention.

Referring to FIG. 3, an intelligent cooking machine for realizing full-closed cooking provided by the embodiment of the present invention comprises an outer shell 1a, an inner shell 2a arranged inside the outer shell 1a, a wok 1, a wok device 13, a wok working position controlling device 15, a wok rotating device 14, a first cooking fume treatment device 7a and a main control device 900. The inner shell 2a is provided with a cooking cavity 100 which is arranged in a sealed manner, and the wok 1, the wok device 13, the wok working position controlling device 15 and the wok rotating device 14 are arranged in the cooking cavity 100. A cooking fume treatment area 500 is formed between the inner shell 2a and the outer shell 1a, the first cooking fume treatment device 7a is arranged at the cooking fume treatment area 500, and the first cooking fume treatment device 7a is provided with a cooking fume inlet end communicated with the interior of the cooking cavity 100 so as to be used for treating cooking fume in the cooking cavity 100. The wok device 13 is used for carrying and heating the wok 1; the wok working position controlling device 15 is used for driving the wok 1 to turn up and down; and the wok rotating device 14 is used for controlling the wok 1 to rotate around the central axis of the wok 1 to cook. The wok device 13, the wok working position controlling device 15, the wok rotating device 14 and the first cooking fume treatment device 7 are electrically connected with the main control device 900 so as to receive a control command sent by the main control device 900 according to a preset recipe program and perform corresponding operation according to the control command.

In the embodiment of the present invention, the specific structures of the wok device 13, the wok working position controlling device 15 and the wok rotating device 14 may be referred to the prior art (for example, a patent application with the patent publication number of CN103126515A, entitled "Programmable Controlled Intelligent Cooking Machine"; or a patent application with the patent publication number CN103110339A, entitled "Wok Device For A Full-automatic Cooking Machine", etc.), and are not specifically limited and described herein.

In the embodiment of the present invention, the cooking process of the intelligent cooking machine is as follows: during cooking, the wok device 13 heats the wok 1 according to the control command of the main control device 900, the wok working position controlling device 15 controls the wok 1 to turn according to the control command of the main control device 900, and the wok rotating device 14 drives the wok 1 to rotate according to a control command of the main control device 900, so that food materials in the wok 1 are stir-fried.

In the embodiment of the present invention, the intelligent cooking machine can be controlled through the human-computer interaction interface 8a arranged on the outer side of the outer shell 1a, and the human-computer interaction interface 8a is electrically connected with the main control device 900.

In the embodiment of the present invention, preferably, the outer shell 1a and the inner shell 2a form a box shape structure, the lower half part of the outer shell 1a is a square structure, the upper half part of the outer shell 1a is of a halfpace-shaped structure, and the human-computer interaction interface 8a is arranged on the inclined plane of the halfpace-shaped structure. In this way, a user can operate the human-computer interaction interface 8a conveniently.

In the embodiments of the present invention described above, it should be noted that an automatic seasoning adding device (not shown) used for adding various seasoning into the wok 1 according to a control command of the main control device 900, an automatic ingredient feeding device (not shown) used for automatically feeding main food ingredients into the wok 1 according to a control command of the main control device 900 and the like can be further arranged in the intelligent cooking machine. The structures of the devices may be referred to the prior art (the patent application with the patent publication number of CN103126515A, entitled "Programmable Controlled Intelligent Cooking Machine", etc.) and are not specifically limited here. The ingredient feeding device 2 is arranged in the cooking cavity and located above the wok 1, and the ingredient feeding device spraying piece 21 of the spray washing device is arranged in the cooking cavity and located light above the ingredient feeding device 2. In addition, a dish discharging area is arranged in the cooking cavity 100 and located below the wok 1, a dish discharging device is arranged in the dish discharging area, and a seasoning box (seasoning adding device) for containing various seasoning containers is further arranged in the outer shell 1a and located outside the cooking cavity 100 (preferably below the cooking cavity).

In the embodiment of the present invention, the first cooking fume treatment device 7a is arranged in the cooking fume treatment area 500 formed between the outer shell 1a and the inner shell 2a, and the wok 1, the wok device 13, the wok working position controlling device 15 and the wok rotating device 14 are arranged in the cooking cavity 100; therefore, when the intelligent cooking machine is used for cooking, due to the fact that the interior of the inner shell 2a is a closed cooking area, cooking fume generated by the wok 1 can only be gathered in the cooking area and cannot diffuse to other places in the outer shell 1a, meanwhile, the first cooking fume treatment device 7a can perform cooking fume treatment on the cooking fume in the cooking area (even directly on the cooking fume in the wok 1), so that the cooking fume generated in the cooking area can be effectively isolated from other places in the outer shell, and the cooking fume in the outer shell can be treated in time. Therefore, the interior of the outer shell can be kept clean, cooking fume can be prevented from polluting related devices in the cooking machine, and the normal work of the related devices in the cooking machine can be guaranteed.

In the embodiment of the present invention, further referring to FIG. 1, the intelligent cooking machine further includes a wok lid 12 and a wok lid driving device 10aa used for driving the wok lid 12 to cover/leave the opening of the wok 1, the wok lid 12 is arranged in the cooking cavity 100, and the wok lid driving device 10aa is arranged in the outer shell 1a and electrically connected with the main control device 900. The specific working principle that the wok lid 12 covers/leaves the opening of the wok 1 is as follows: when the wok lid 12 is required to cover the opening of the wok 1, the wok working position controlling device 15 drives the wok 1 to turn according to related control commands of the main control device 900, so that the opening of the wok 1 faces the wok lid 12, and at the moment, the wok lid driving device 10aa drives the wok lid 12 to move towards the direction of the opening of the wok 1 according to the control commands of the main control device 900, so that the wok lid 12 covers the opening of the wok 1; when the wok lid 12 is required to leave the opening of the frying pot 1, the wok lid driving device 10aa drives the wok lid 12 to move in the direction away from the opening of the wok 1 according to the control commands of the main control device 900, so that the wok lid 12 leaves the opening of the wok 1.

In the embodiment of the present invention, referring to FIGS. 4-10, the ingredient feeding device spraying piece 21 is communicated with a water source via a top spraying water pipe 211 and a top spraying head switch 9b, the ingredient feeding device spraying piece 21 is arranged on the inner side wall of the top of the inner shell 1a and aligned with the ingredient feeding device 2 located right below it; the wok 1 is arranged right below the ingredient feeding device 2, and a draining device 13a is arranged below the wok 1. The ingredient feeding device 2 comprises an ingredient-containing chamber 40b used for containing food ingredients, the top wall of the ingredient-containing chamber 40b is provided with water spraying openings 401b allowing water sprayed by the ingredient feeding device spraying piece 21 to fall in, the bottom wall of the ingredient-containing chamber 40b is provided with ingredient-dropping openings 402b allowing the food ingredients/water to fall in the wok 1, and each of the ingredient-dropping opening 402b is provided with a corresponding compartment door 403b; the ingredient feeding device 2 further comprises compartment door driving mechanisms 41b used for correspondingly controlling the opening and closing of the compartment doors 403b. A wok working position conversion motor 6b, a wok working position detection device 7b, the compartment door driving mechanisms 41b and the top spraying head switch 9b are electrically connected with the main control device 900 so as to receive control commands sent by the main control device 900 according to a preset recipe program and perform corresponding operations according to the control commands.

Figure 5:
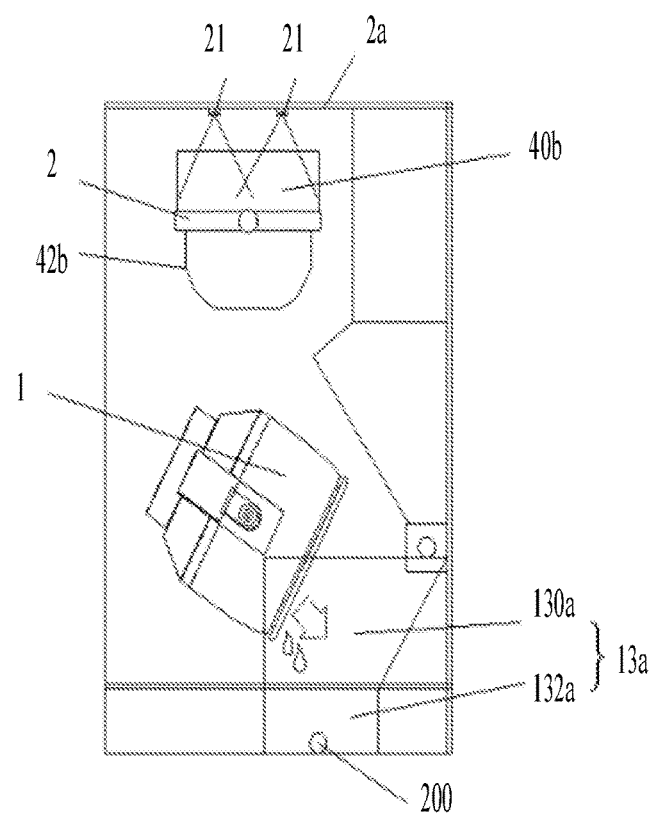
FIG. 5 is another angular configuration diagram of the cooking machine provided in FIG. 4.
Figure 9:
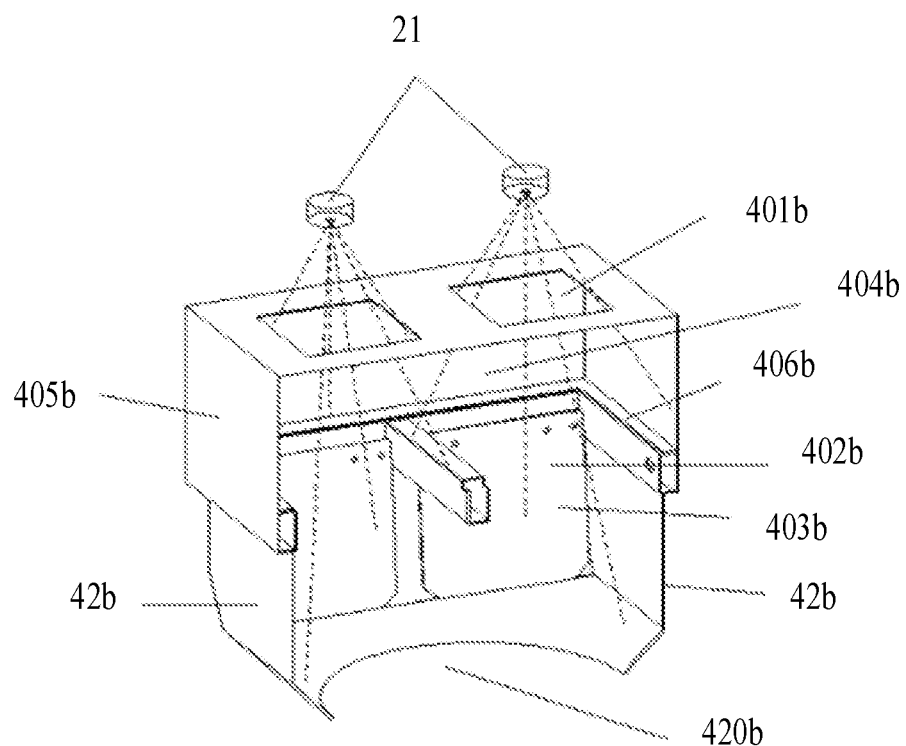
Figure 10:
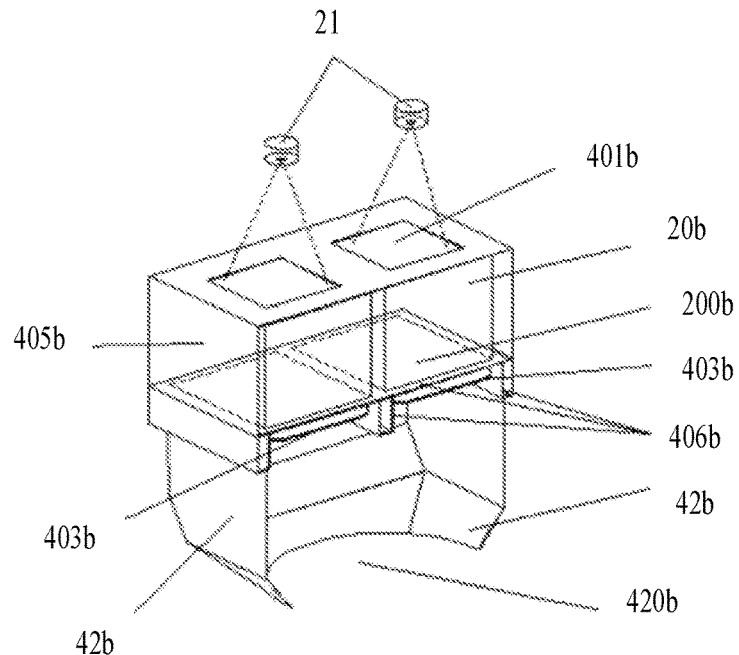
FIG. 10 is a schematic view of the ingredient feeding device in FIG. 7 contained with a multi-compartment container.

The working principle of the embodiment of the present invention is as follows: after the full-automatic cooking machine finishes a dish discharging process, the wok working position detection device 7b sends detected turning angle data of the wok 1 to the main control device 900, the main control device 900 controls the wok working position conversion motor 6b to drive the wok 1 to turn according to the turning angle data received at the moment, so that the opening of the wok 1 is aligned with the ingredient-dropping opening 402b of the ingredient feeding device 2, and the main control device 900 sends corresponding operation commands to the compartment door driving mechanisms 41b to control it open the compartment doors 403b according to the operation command (as shown in FIG. 9), and at the moment, the main control device 900 controls the top spraying head switch 9b to be opened so as to supply high-pressure water to the ingredient feeding device spraying piece 21, so that the ingredient feeding device spraying piece 21 sprays and washes the ingredient feeding device 2 below it, water sprayed by the ingredient feeding device spraying piece 21 fall into the ingredient-containing chamber 40b from the water spraying openings 401b, ingredient residues in the ingredient-containing chamber 40b are washed down from the ingredient-dropping openings 402b, the ingredient residues attached to the compartment doors 403b can be washed down by the water from the ingredient-dropping openings 402b, and the flushed ingredient residues and water fall into the wok 1 located right below the ingredient-containing chamber 40b. After the ingredient feeding device spraying piece 21 stops spraying water, the main control device 900 controls the wok working position conversion motor 6b to drive the wok 1 to turn according to the turning angle data received at the moment, so that the opening of the wok 1 faces the draining device 13a (as shown in FIG. 5), water and ingredient residues in the wok 1 fall into the water draining device 13a to be filtered, and finally, drained out from the draining opening 200, and thereby completing the washing of the ingredient feeding device 2. As can be seen from the above analysis, referring to FIG. 11, which is a schematic diagram showing the water flow of the cooking machine when washing the ingredient feeding device 2 as follows: the ingredient feeding device spraying piece 21-the ingredient feeding device 2-the wok 1-the draining device 13a-the draining opening 200.

It will be appreciated that the cooking machine may also wash the ingredient feeding device 2 before placing food ingredients into the ingredient-containing chamber 40b, the washing process may be referred to the above, and will not be described in detail herein.

It should be noted that the top spraying head switch 9b is connected with the ingredient feeding device spraying piece 21 via a water pipe. Preferably, the top spraying head switch 9b is a water pump arranged inside or outside the inner shell 1a, and the water pump can suck in cleaning fluid from a cleaning fluid supply device (not shown) arranged outside or inside the inner shell 1a of the full-automatic cooking machine and supply the cleaning fluid to the spraying pieces 21, so that the ingredient feeding device 2 can be flushed by the cleaning liquid sprayed by the spraying piece 21. It will be appreciated that the top showerhead switch 9b may also be an electrically operated valve provided inside or outside the inner shell 1a.

In the embodiment of the present invention, the specific structure of the wok working position conversion motor 6b refers to the prior art (for example, a patent application with the patent publication number of CN103126515A, entitled "Programmable Controlled Intelligent Cooking Machine"; or a patent application with the publication number CN103110339A, entitled "Wok Device For A Full-Automatic Cooking Machine", etc.), the structure of which is not specifically limited and described herein.

As can be seen from the analysis, the full-automatic cooking machine provided by the embodiment of the present invention has a function of washing the ingredient feeding device 2, so that the ingredient feeding device 2 can be kept clean and sanitary.

Figure 4:
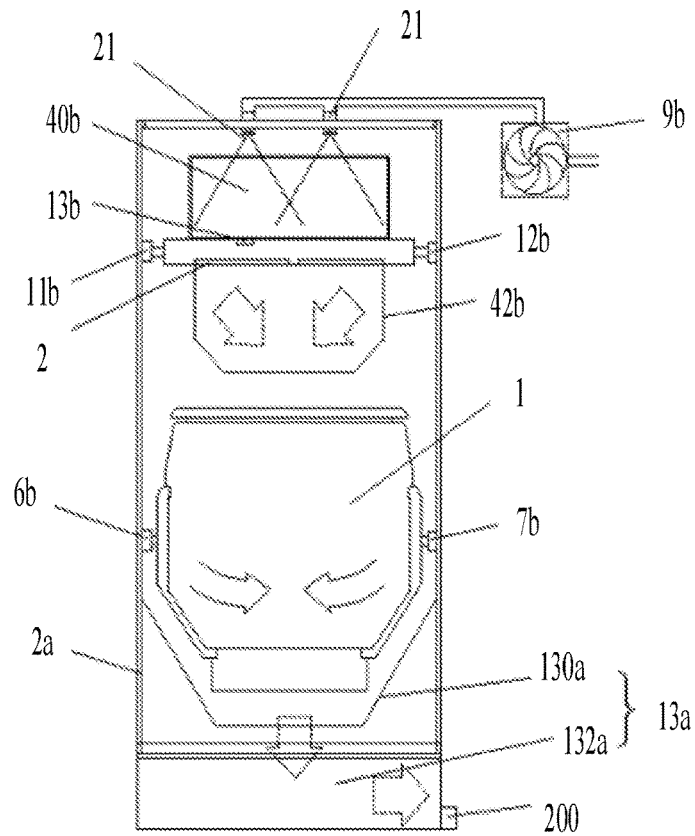
FIG. 4 is a structural schematic diagram of the cooking machine provided by the first embodiment of the present invention and shows the state of spraying the ingredient feeding device and the wok by adopting the ingredient feeding device spraying piece.
Figure 26:
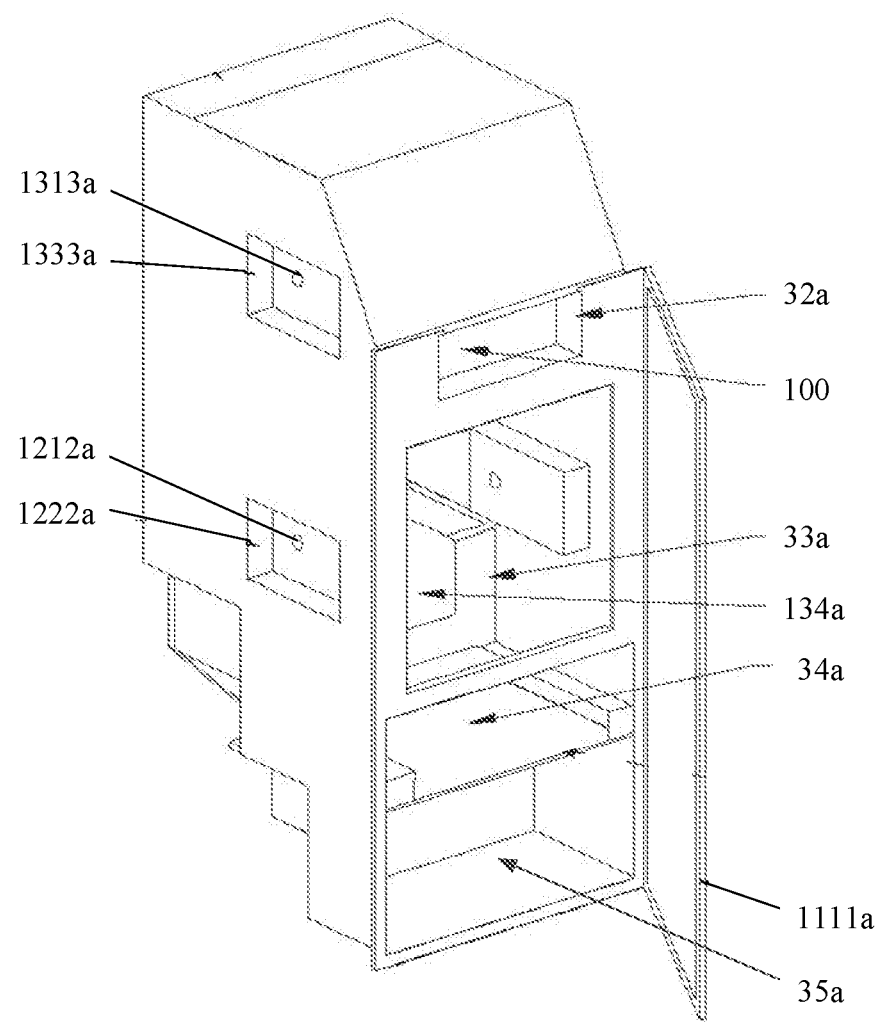
FIG. 26 is a front view of the inner shell shown in FIG. 3.

The embodiment of the present invention will be further described below with reference to FIGS. 4-10, the automatic cooking machine provided by the embodiment of the present invention further includes a flipping mechanism 11a electrically connected with the main control device 900, and the ingredient-containing chamber 40b provided by the embodiment of the present invention is provided with a receiving space 404b; the receiving space 404b is used for receiving a multi-compartment ingredient container 20b containing food ingredients, each compartment of the multi-compartment ingredient container 20b is provided with compartment openings 200b corresponding to the ingredient-dropping openings 402b in a one-to-one mode, and each compartment is used for containing the same or different food ingredients. When the multi-compartment ingredient container 20b is received in the receiving space 404b, the compartment openings 200b of the multi-compartment ingredient container 20b are aligned with the water spraying openings 401b of the ingredient-containing chamber 40b in a one-to-one mode, and the multiple ingredient-dropping openings 402b, the multiple compartment doors 403b and the multiple compartments correspond to one another in a one-to-one mode. When the multi-compartment ingredient container 20b is contained in the receiving space 404b (as shown in FIG. 4), the automatic cooking machine is in a feeding procedure, the flipping mechanism 11a controls the ingredient feeding device 2 to achieve upwards overturning, so that the multi-compartment ingredient container 20b in the ingredient-containing chamber 40b is inverted, therefore, the food ingredients in the multi-compartment ingredient container 20b are dropped onto the compartment doors 403b (the compartment doors 403b are in a closed state at the moment, as shown in FIGS. 10-13), and the ingredient-dropping openings 402b are aligned with the wok 1; in this way, in the feeding procedure of the full-automatic cooking machine, the compartment door driving mechanisms 41b controls the corresponding compartment doors 403b to be opened, so that food ingredients in the inverted multi-compartment ingredient container 20b are dropped into the wok 1 from the corresponding ingredient-dropping openings 402b. When the multi-compartment ingredient container 20b is taken out of the ingredient-containing chamber 40b (at the moment, the full-automatic cooking machine completes the dish discharging procedure), the main control device 900 sends a turning control command to the flipping mechanism 11a according to a recipe program command, so that the flipping mechanism 11a controls the ingredient feeding device 2 to achieve upwards overturning, the ingredient-dropping openings 402b are aligned with the wok 1 and the water spraying openings 401b are aligned with the spraying pieces 21 (as shown in FIG. 9). Thus, in the process of washing the ingredient feeding device 2, water sprayed by the ingredient feeding device spraying piece 21 can fall into the ingredient-containing chamber 40b from the water spraying openings 401b and fall into the wok 1 from the ingredient-dropping openings 402b, so that the food ingredient residues in the ingredient-containing chamber 40b can be flushed down into the wok 1. When the top spray head switch 9b stops supplying water, the wok 1 is turned over, so that all accumulated water and food ingredient residues in the wok 1 are dropped into the draining device 13a, and sewage is discharged from the draining opening 200 after being filtered by the draining device 13a. In addition, one side face of the inner shell 1a is provided with an ingredient container guiding opening 32a (as shown in FIG. 26) for the multi-compartment ingredient container 20b to go in and out of the ingredient-containing chamber 40b, and the ingredient-containing chamber 40b is provided with an ingredient-receiving opening 407b for the multi-compartment ingredient container 20b to go in and out of the receiving space 404b. The process that the multi-compartment ingredient container 20b received in or taken out of the receiving space 404b is as follows with reference to FIG. 12: the main control device 900 controls the ingredient feeding device 2 to overturn downwards to enable the ingredient-receiving opening 407b to be aligned with the ingredient container guiding opening 32a, and at the moment, the multi-compartment ingredient container 20b can be put into or taken out of the receiving space 404b from the ingredient container guiding opening 32a and the ingredient-receiving opening 407b.

It should be noted that the position relation (such as the top wall and the bottom wall of the ingredient-containing chamber 40b) of the components of the ingredient feeding device 2 will be changed along with overturning of the ingredient-receiving opening.

In addition, the flipping mechanism 11a and the compartment door driving mechanism 41b refer to an existing compartment door driving technology (for example, a patent with a patent publication number of CN103126515A, entitled "Programmable Controlled Intelligent Cooking Machine", etc.), and description is not carried out here. Exemplarily, the compartment door driving mechanisms 41b include motors (not shown) correspondingly connected to the compartment doors 403b in a one-to-one mode, the motors are fixed to the bottom of the ingredient-containing chamber 40b, and the motors are electrically connected with the main control device 900 and correspondingly drive the doors 403b in a one-to-one mode.

In the embodiment of the present invention, preferably, the receiving space 404b is used for receiving a four-compartment ingredient container 20b (i.e., the multi-compartment ingredient container 20b with four individual compartments), and the number of the ingredient-dropping opening 402b and the number of the compartment doors 403b are four. Thus, a user can match main ingredients and accessory ingredients according to different dishes and stock the main ingredients and accessory ingredients in individual compartments (compartment A, compartment B, compartment C and compartment D) of a four-compartment ingredient container. Based on a preset recipe program, the ingredient feeding device 2 puts into the wok the food ingredients in different individual compartments at a predetermined time in a predetermined sequence. In this embodiment, the four individual compartments allow up to 24 combinations of putting sequence. A Chinese dish usually consists of one to three main ingredients and several accessory ingredients. For example, the dish "stir-fried Shredded Cabbage" has cabbage as a main ingredient, and chili and garlic as two accessory ingredients. The dish "Shredded Meat with Dry Tofu and Green Pepper" has shredded meat, dry tofu and green pepper as three main ingredients, and garlic and red pepper as two accessory ingredients. The raw ingredients are stocked in different individual compartments. Those raw ingredients that will be put into the wok at the same time can be stocked in a same individual compartment. In this embodiment, the raw ingredients are contained in four individual compartments, which means the raw ingredients can be put into the wok at four different moments, thus there are at most 24 combinations (ABCD, ABDC, ACBD, ACDB, ADBC, ADCB, BACD, BADC, BDAC, BDCA, BCAD, BCDA, CABD, CADB, CBAD, CBDA, CDAB, CDBA, DABC, DACB, DBAC, DBCA, DCAB, DCBA). A four-compartment container is already enough for most of the dishes. However, an over-four-compartment container, such as six-compartment container or eight-compartment container can be used to meet the requirement of some more complex dishes. It should be understood that the multi-compartment ingredient container 20b can comprise four individual compartments, six individual compartments or eight individual compartments, while the corresponding multi-compartment ingredient-containing chamber 40b should accordingly comprise four individual compartments, six individual compartments or individual eight compartments. In the present invention, all the raw ingredients for one dish, including the main ingredients and the accessory ingredients, are packaged and stocked in the individual compartments of the multi-compartment container. Therefore, the industrialization of the cooking machine is expectable. As a result, an industrial chain, including the production of agricultural products, pretreatment (cleaning and cutting etc.), package, delivery, distribution and consumption, can thus be established. This also leads to a new life style, since people no longer need to buy agricultural products in vegetable markets and thus less garbage will be produced. In addition, adopting a standard package helps guarantee food security.

Figure 14:
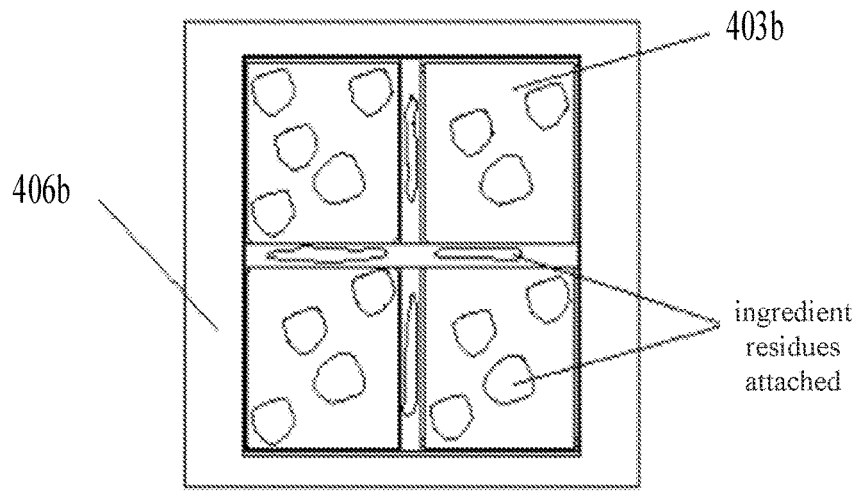
FIGS. 14-16 illustrate the location of the ingredient feeding device shown in FIG. 13 with food ingredient debris adhered thereto.
Figure 15:
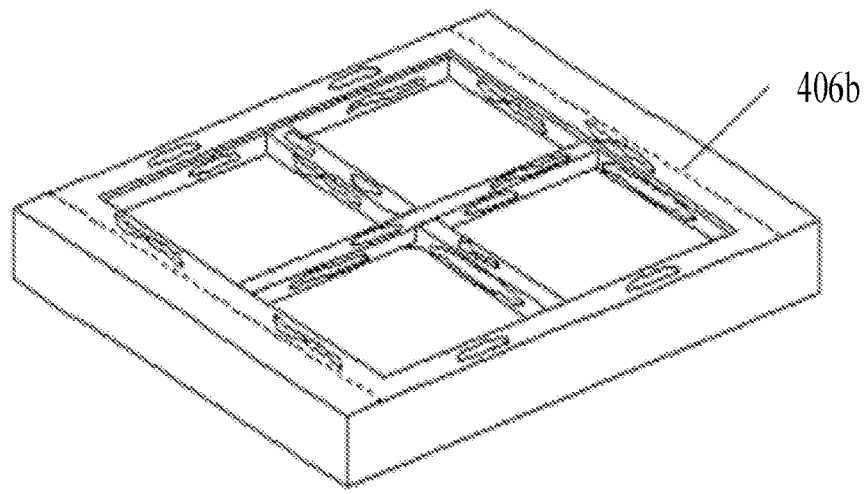

Referring to FIGS. 7-10, as a further improved embodiment, the ingredient-containing chamber 40b includes a hollow square ingredient-feeding shell 405b and a supporting frame 406b, and the supporting frame 406b is used for supporting the inverted multi-compartment ingredient container 20b. The supporting frame 406b is provided with a transverse bar 4060b, a longitudinal bar 4061b and four side bars 4062b, the side bars 4062b are sequentially connected end to end to form a rectangular frame, the transverse bar 4060b is arranged between the middles of two opposite side bars 4062b by the two ends thereof connected with the two side bars 4062b in a one-to-one correspondence mode; the longitudinal bar 4061b is arranged between the middles of the other two opposite side bars 4062b of the rectangular frame by the two ends thereof connected with the other two side bars 406b2 in a one-to-one correspondence mode. In addition, the middle of the transverse bar 4060b is connected with the middle of the longitudinal bar 4061b in a crossed mode, namely, the supporting frame 406b is a framework shaped like a Chinese character 'tian'. Thus, the transverse bar 4060b and the longitudinal bar 4061b divide a rectangular hollow area defined by the rectangular frame into the four rectangular ingredient-dropping openings 402b. Besides, one side face of the ingredient-feeding shell 405b is provided with the ingredient-receiving opening 407b, the bottom wall of the ingredient-feeding shell 405b is in an opening shape, and the top wall of the ingredient-feeding shell 405b is provided with the four water spraying openings 401b corresponding to the ingredient-dropping openings 402b in a one-to-one mode. Therefore, in the process that the ingredient feeding device 2 is washed by the spraying pieces 21, the compartment doors 403b which is arranged at the ingredient-dropping openings 402b and is in an open state can be washed by each of the water spraying openings 401b. The edges of the side end faces which are close to the bottom end faces of the ingredient-feeding shell 405b are connected with the side bars 4062b in a one-to-one correspondence mode, and in other words, the ingredient-feeding shell 405b and the supporting frame 406b are connected to each other to form the receiving space 404b, and the ingredient-receiving opening 407b is formed in one side wall of the ingredient-feeding shell 405b. In the embodiment of the present invention, when the multi-compartment ingredient container 20b is received in the receiving space 404b (that the full-automatic cooking machine is in a feeding process at the moment), with reference to FIGS. 10-13, the flipping mechanism 11a controls the ingredient feeding device 2 to flip, so that the multi-compartment ingredient container 20b in the ingredient-containing chamber 40b is inverted, the multi-compartment ingredient container 20b is inverted on the supporting frame 406b, food ingredients in the multi-compartment ingredient container 20b are dropped on the compartment doors 403b, and then the food ingredients in the multi-compartment ingredient container 20b can be dropped into the wok 1 by controlling the compartment doors 403b to be opened. Besides, after the multi-compartment ingredient container 20b is taken out of the material ingredient-containing chamber 40b (that the full-automatic cooking machine is running at a washing working position at the moment), the flipping mechanism 11a controls the ingredient feeding device 2 to flip, so that the ingredient-dropping opening 402b is aligned with the opening of the wok 1, and the water spraying openings 401b is aligned with the ingredient feeding device spraying piece 21. Referring now to FIGS. 14 and 15, when the multi-compartment ingredient container 20b is inverted on the supporting frame 406b, the food ingredient residues may adhere to the supporting frame 406b and the compartment doors 403b, so that the ingredient feeding device 2 is required to be washed, and the washing process can be referred to the embodiment described above and is not repeated here.

It should be noted that the material ingredient-containing chamber 40b can also be of other structure, for example, the material ingredient-containing chamber 40b can be of a hollow cylindrical structure with a plurality of water spraying openings 401b formed in the top wall and a plurality of ingredient-dropping openings 402b formed in the bottom end face, or the material ingredient-containing chamber 40b can be of a circular truncated cone structure with a plurality of water spraying openings 401b on the top wall and a plurality of ingredient-dropping openings 402b on the bottom end face, and specific limitation is not conducted here.

Figure 16:
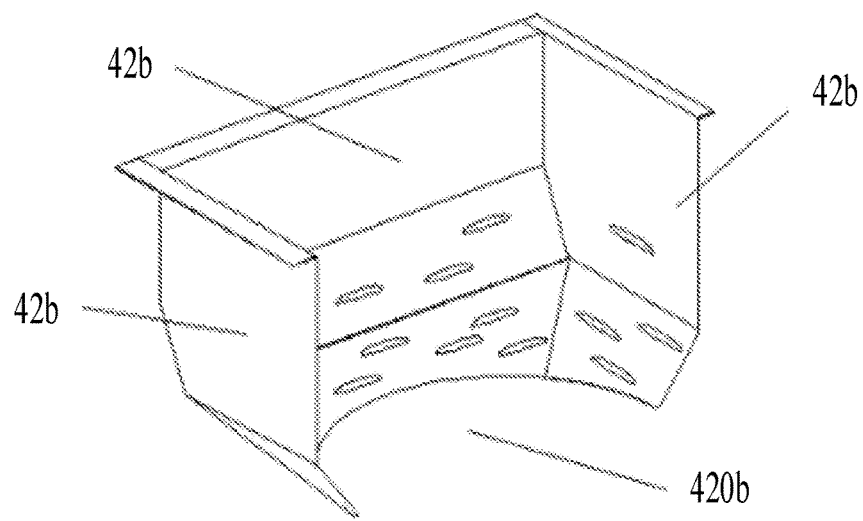

Referring now to FIGS. 7-10, in the embodiment described above, preferably the ingredient feeding device 2 further includes an ingredient-guiding shell of a hollow structure; the top of the ingredient-guiding shell is in an opening shape and is fixedly connected with the bottom of the supporting frame 406b, an ingredient-guiding opening 420b is formed in the bottom of the ingredient-guiding shell, the bottom of the ingredient-guiding shell is narrowed relative to the top of the ingredient-guiding shell, and therefore food ingredients and water can be conveniently guided into the wok 1 below the ingredient-guiding shell. Exemplarily, the ingredient-guiding shell comprises four ingredient-guiding plates 42*b*, the first ends of the four ingredient-guiding plates 42*b* are connected with the four side bars 4062*b* in a one-to-one correspondence mode, and the second ends opposite to the first ends of the ingredient-guiding plates 42*b* are bent towards the central axis of the rectangular frame (the central axis is perpendicular to the plane defined by the rectangular frame). The side edges of every two adjacent ingredient-guiding plates 42*b* are connected with each other, so that the ingredient-guiding plates 42*b* are connected with each other to form a cavity of an inverted halfpace-shaped structure, and the second ends of the ingredient-guiding plates 42*b* define the ingredient-guiding opening 420*b* for food ingredients/water falling from the ingredient-dropping opening 402*b* to fall into the wok 1. When the compartment doors 403*b* are opened, food ingredients dropped on the compartment doors 403*b* or water falling into the ingredient-containing chamber can fall into the cavity formed by the ingredient-guiding plates 42*b* from the ingredient-dropping openings 402*b*, and due to the fact that the second ends of the ingredient-guiding plates 42*b* are bent towards the central axis of the rectangular frame, namely the cavity is of an inverted halfpace-shaped structure, the food ingredients or water falling into the cavity can fall towards the ingredient-guiding opening 420*b* along the ingredient-guiding plates 42*b*, and therefore the food ingredients or water can fall into the wok 1 under the ingredient-guiding opening 420*b* in a more concentrated mode. When the full-automatic cooking machine is in a feeding process, namely the multi-compartment ingredient container 20*b* is inverted on the supporting frame 406 and the compartment doors 403*b* are opened, food ingredients will fall into the cavity formed by the ingredient-guiding plates 42*b* from the ingredient-dropping openings 402*b* and be guided to the ingredient-guiding opening 420*b* by the ingredient-guiding plates 42*b*, and then fall into the wok 1 from the ingredient-guiding opening 420*b*. With reference to FIG. 16, as food ingredients are in contact with the ingredient-guiding plates 42*b*, food ingredient residues may be adhered to the ingredient-guiding plates 42*b*, and the ingredient-guiding plates 42*b* are also required to be flushed. The process of flushing the ingredient-guiding plates 42*b* is as follows: the water falling from the ingredient-containing chamber 40*b* can be guided to the ingredient-guiding opening 420*b* along the ingredient-guiding plates 42*b*, and then fall into the wok 1 from the ingredient-guiding opening 420*b*, so that the ingredient-guiding plates 42*b* can be flushed.

Preferably, when the ingredient feeding device 2 is required to be flushed by the ingredient feeding device spraying piece 21, firstly, the compartment doors 403*b* are closed by the compartment door driving mechanisms 41*b*, the compartment doors 403*b* and the supporting frame 406*b* of the ingredient feeding device 2 are directly flushed by the ingredient feeding device spraying piece 21, and the flushed water flows out by the ingredient-guiding plates 42*b* of the ingredient-guiding shell; and then the compartment doors 403*b* are opened by the compartment door driving mechanisms 41*b*, and the compartment doors 403*b*, the supporting frame 406*b* and the ingredient-guiding plates 42*b* of the ingredient feeding device 2 are directly washed by the ingredient feeding device spraying piece 21.

Figure 6:
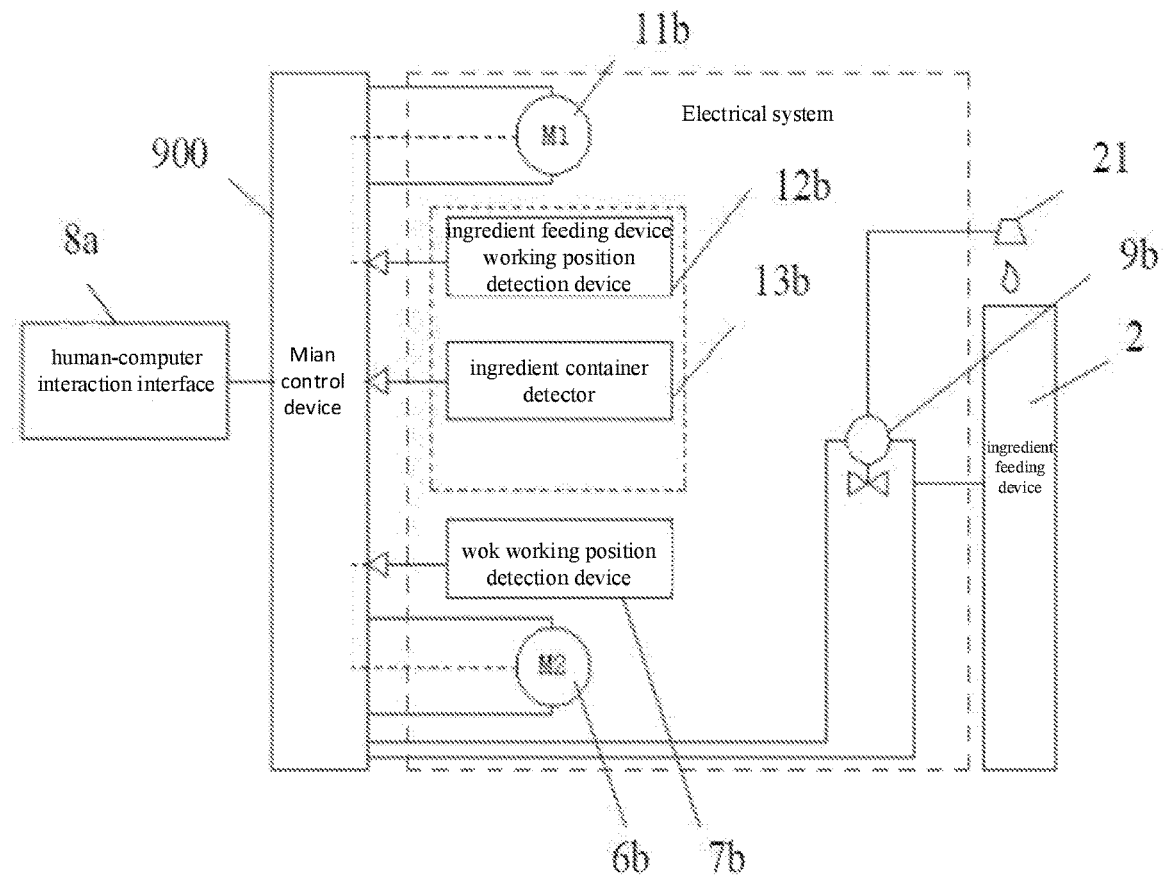
FIG. 6 is an electrical structure block diagram of the cooking machine provided by the first embodiment of the present invention.
Figure 7:
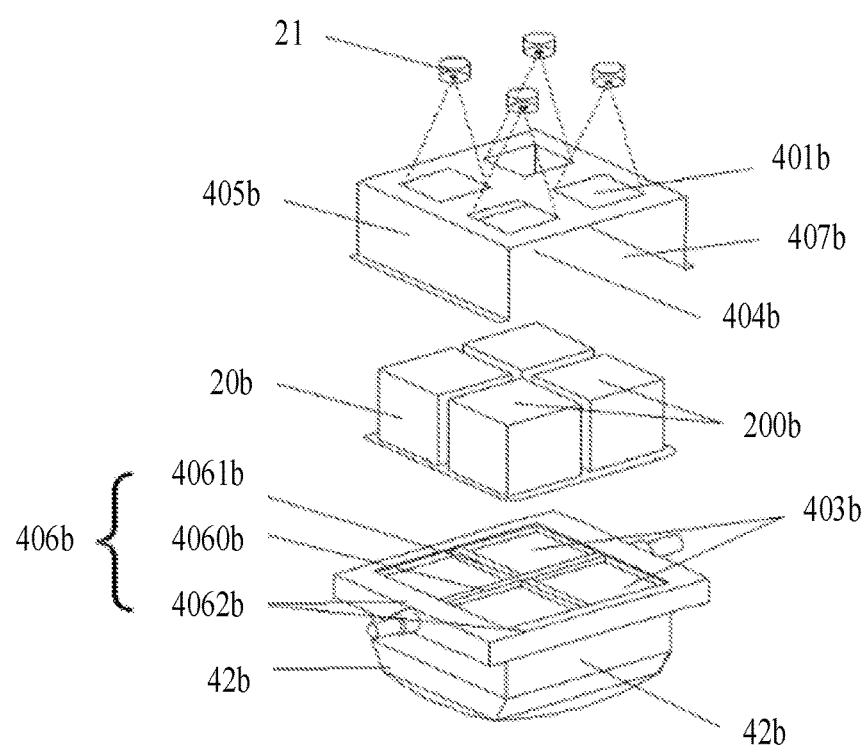
FIG. 7 is a schematic diagram of the structure of the ingredient feeding device shown in FIGS. 4-6.
Figure 8:
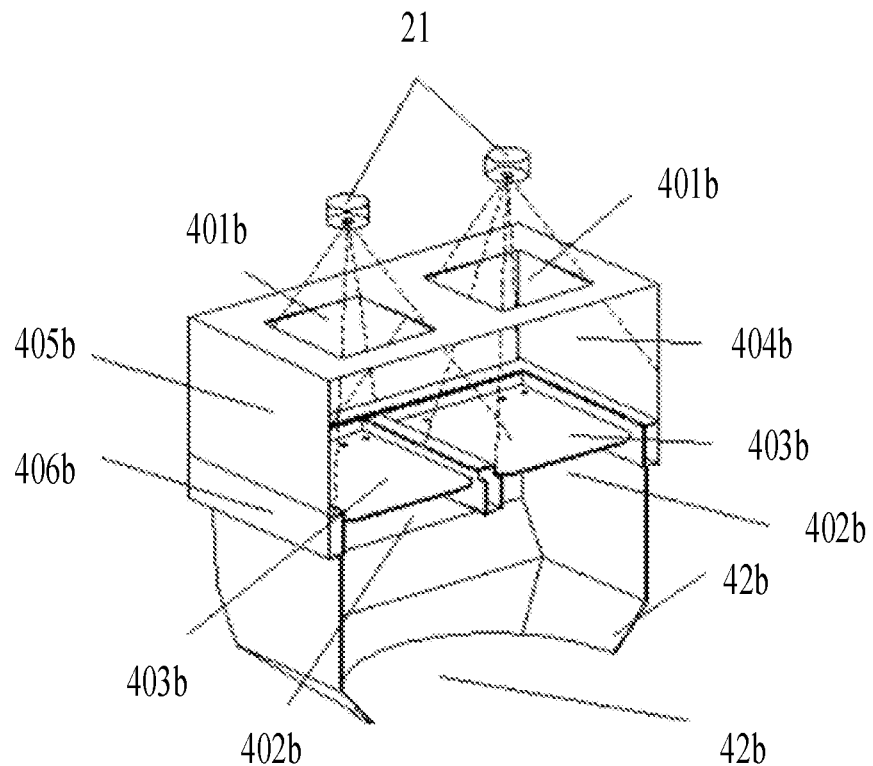
FIGS. 8 and 9 illustrate the opening and closing state of the compartment door of the ingredient feeding device shown in FIG. 7 when the ingredient feeding device is cleaned.

In the embodiment of the present invention, referring to FIGS. 4 and 6, the automatic cooking machine further includes a working position detection device 12*b* electrically connected with the main control device 900, and the working position detection device 12*b* is used for detecting the rotation angle of the ingredient feeding device 2 and sending a detected rotation angle data to the main control device 900. Thus, when the multi-compartment ingredient container 20*b* needs to be received in or taken out of the receiving space 404*b*, the working position detection device 12*b* sends a detected rotation angle data at the moment of the ingredient feeding device 2 to the main control device 900, and the main control device 900 controls the flipping mechanism 11*a* to drive the ingredient feeding device 2 to turn according to the received rotation angle data, so that the ingredient-dropping opening 402*b* is aligned with the wok 1, the water spraying openings 401*b* is aligned with the ingredient feeding device spraying piece 21, and the ingredient-receiving opening 407*b* is aligned with the ingredient container guiding opening 32*a*; at the moment, the multi-compartment ingredient container 20*b* can be put into/taken out of the receiving space 404*b* from ingredient container guiding opening 32*a* and the ingredient-receiving opening 407*b*. When the ingredient feeding device 2 needs to perform a feeding process, the working position detection device 12*b* sends a detected rotation angle data at the moment of the ingredient feeding device 2 to the main control device 900, and the main control device 900 controls the flipping mechanism 11*a* to drive the ingredient feeding device 2 to turn according to the received rotation angle data, so that the multi-compartment ingredient container 20*b* in the ingredient-containing chamber 40*b* is inverted, the food ingredients in the multi-compartment ingredient container 20*b* fall on the compartment doors 403*b*, and the ingredient-dropping openings 402*b* is aligned with the wok 1.

It will be appreciated that when the ingredient feeding device 2 (i.e., the ingredient-containing chamber 40*b*) is stationary, the embodiment does not require the flipping mechanism 11*a*, for example, when the ingredient-containing chamber 40*b* is of a compartment structure, namely the ingredient-containing chamber 40*b* has a plurality of ingredient-containing compartment for stocking food ingredients, the top of each compartment is correspondingly provided with one of the water spraying openings 401*b* which are aligned with the ingredient feeding device spraying piece 21 and allowed external food ingredients to be put into the compartment, the bottom of each compartment is correspondingly provided with an ingredient-dropping opening 402*b* aligned with the wok 1, and each ingredient-dropping opening 402*b* is correspondingly provided with a compartment door 403*b* which is controlled by a corresponding compartment door driving mechanism 41*b* to be open or closed. In this way, a user can directly spray water to each compartment from the inlets/outlets each is aligned with the water spraying openings 401*b* and formed in the inner shell 1*a* and the water spraying openings 401*b*, and in the cleaning process by the ingredient feeding device spraying piece 21, the compartment doors 403*b* can be directly opened without flipping the ingredient feeding device 2.

In the embodiment of the present invention, referring to FIGS. 4 and 6, the automatic cooking machine further includes an ingredient container detector 13*b* electrically connected with the main control device 900, and the ingredient container detector 13*b* is used for detecting whether the multi-compartment ingredient container 20*b* has been taken out of the material ingredient-containing chamber 40*b* and sending detection data to the main control device 900. In a washing process of the full-automatic cooking machine, when the ingredient container detector 13*b* detects that the multi-compartment ingredient container 20*b* has been taken out of the receiving space 404*b*, the main control device 900 sends compartment door opening commands to the compartment door driving mechanisms 41b, and the compartment door driving mechanisms 41b control the compartment doors 403b to be opened according to the commands; and the wok working position conversion motor 6b is controlled to drive the wok 1 to turn, so that the opening of the wok 1 is aligned with the ingredient-dropping openings 402b (or the ingredient-guiding openings 420b), and then the top spraying head switch 9b is controlled to supply water to the ingredient feeding device spraying piece 21, so that the ingredient feeding device spraying piece 21 sprays water to clean the ingredient feeding device 2. It should be appreciated that whether the multi-compartment ingredient container 20b is taken out of the ingredient-containing chamber 40b or not can be confirmed in a manual confirmation mode by a user, and after the user confirms that the multi-compartment ingredient container 20b is taken out of the ingredient-containing chamber 40b, the user can input a corresponding washing control command through the human-computer interaction interface 8a arranged on the automatic cooking machine to wash the ingredient feeding device 2, and the human-computer interaction interface 8a is electrically connected with the main control device 900.

Figure 17:
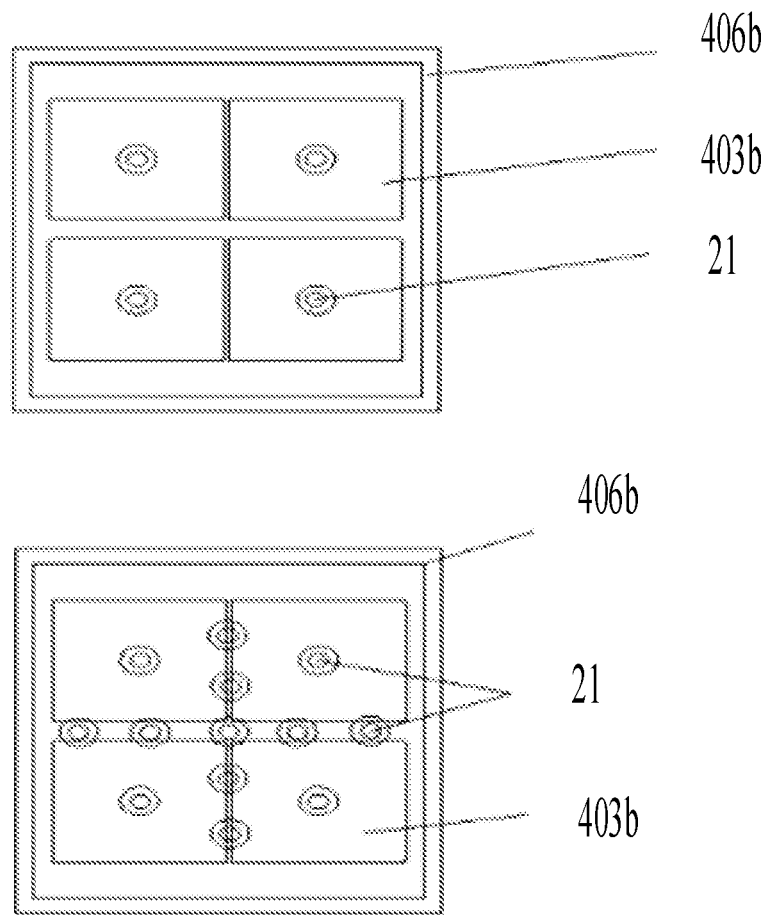
FIGS. 17-20 illustrate different types and arrangements of the ingredient feeding device spraying piece shown in FIG. 4.
Figure 18:
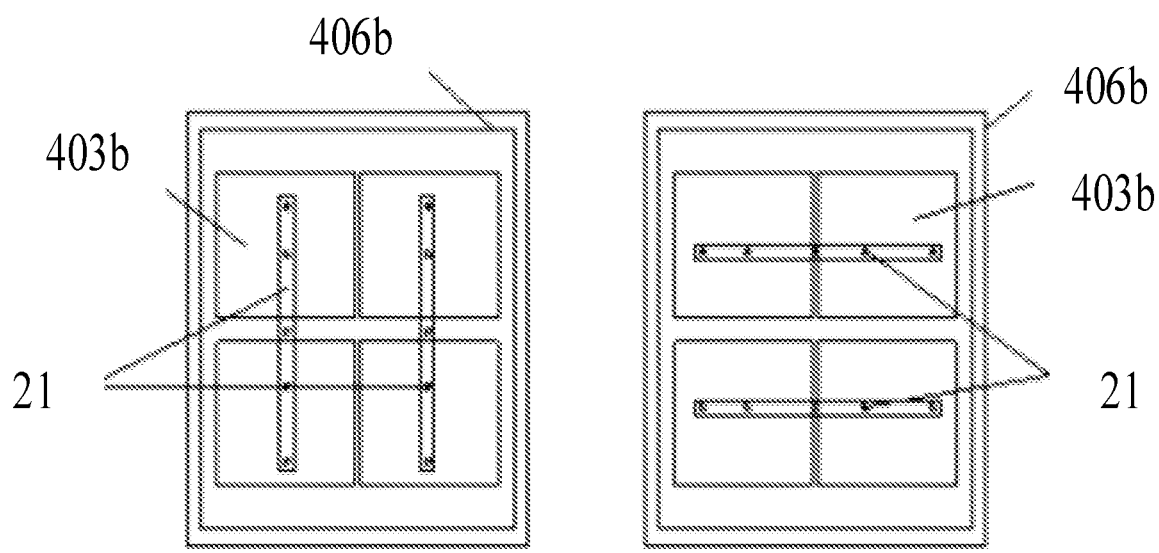
Figure 19:
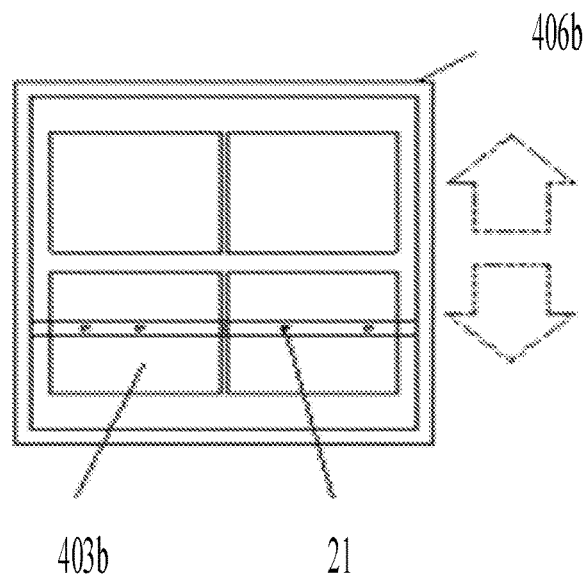
Figure 20:
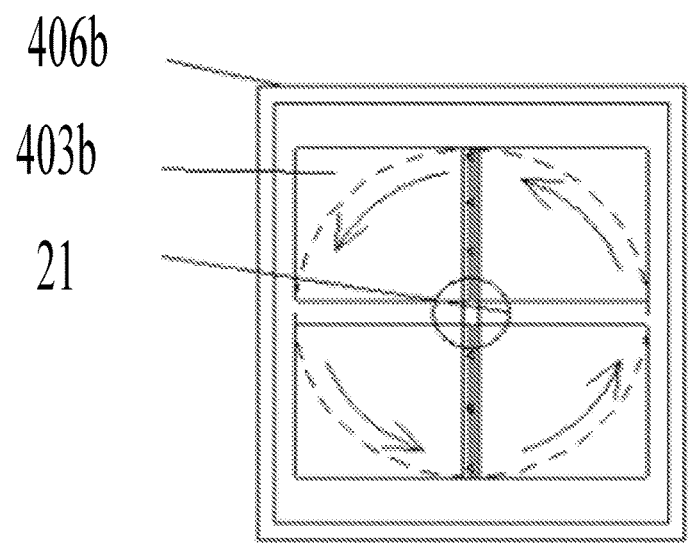
Figure 21:
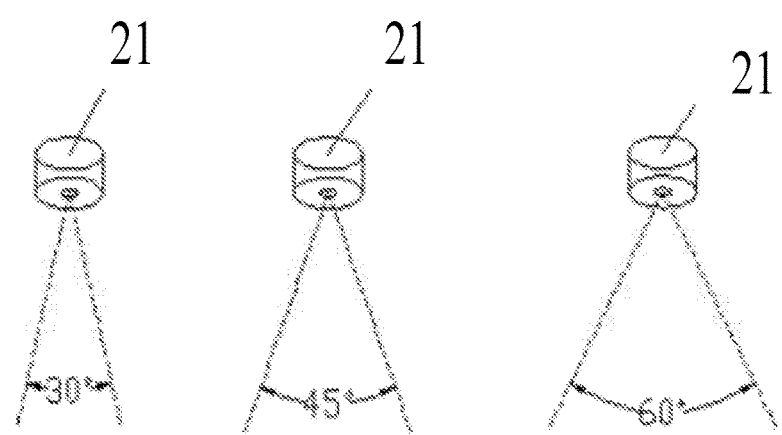
FIG. 21 illustrates the spray angle of the ingredient feeding device spraying pieces shown in FIG. 4.
Figure 22:
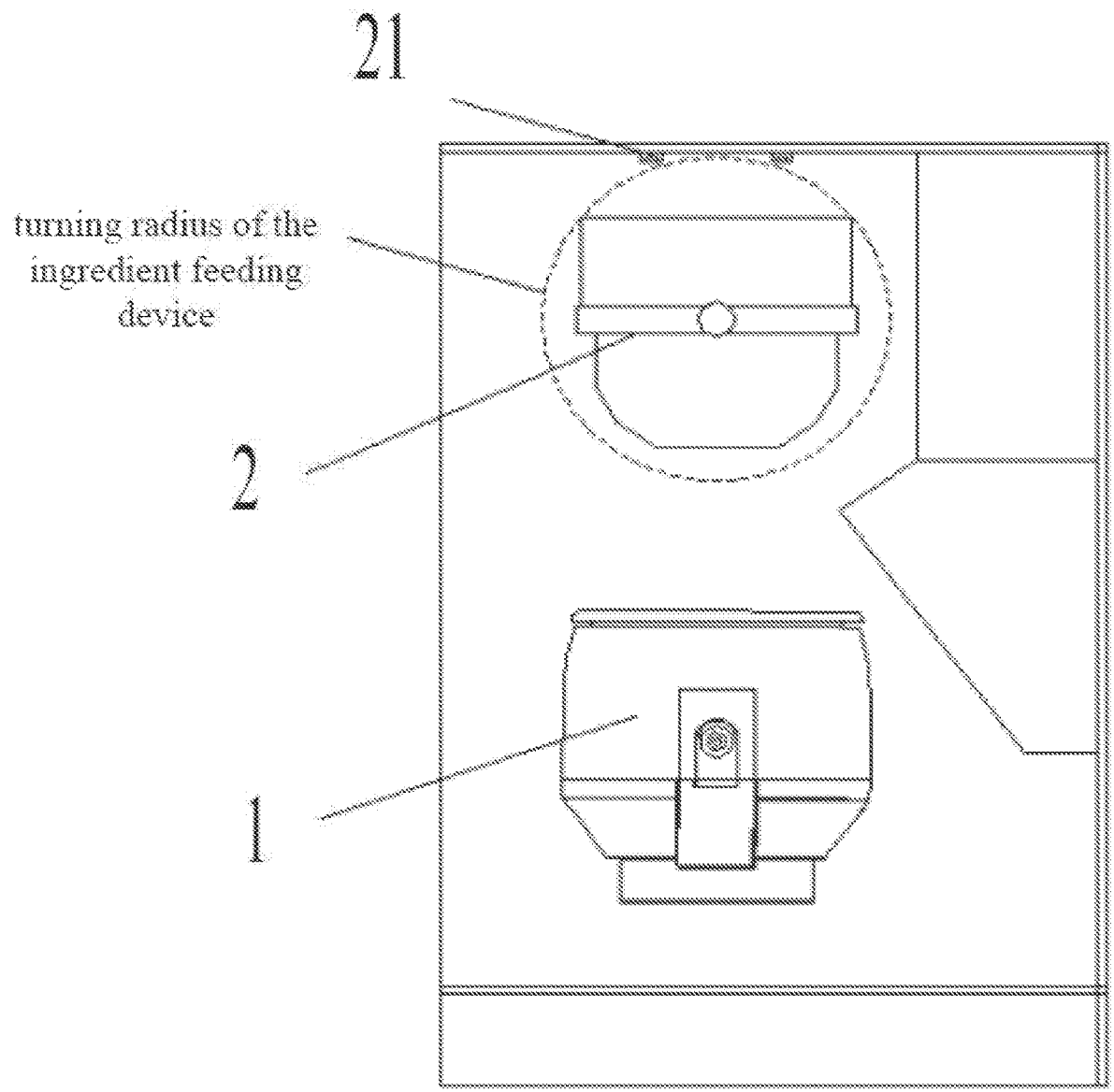
FIGS. 22-23 illustrate the positional relationship of the ingredient feeding device and the ingredient feeding device spraying piece shown in FIG. 4 with respect to each other.

In the embodiment of the present invention, preferably, as shown in FIG. 17, the ingredient feeding device spraying piece 21 can be a fixed independent spraying head or has a plurality of independent spraying heads, and when the plurality of independent spraying heads are adopted, the plurality of independent spraying heads are arranged at the top in the inner shell 1a in a matrix manner, and each of the independent spraying heads is corresponding to one or more water spraying openings 401b, so that the ingredient feeding device spraying piece 21 can have a better flushing effect on the ingredient feeding device 2. Alternatively, referring to FIG. 18, the ingredient feeding device spraying piece 21 may have pipe type showerheads the number of which can be one or more. When one of the hole pipe type showerheads is adopted, each row or each column of spray-heads on the orifice tube showerhead are aligned with each row or each column of water spraying openings 401b. When a plurality of the hole pipe type showerheads are adopted, the hole pipe type showerheads are arranged at the top in the inner shell 1a in rows or columns, each row or column of the hole pipe type showerheads are correspondingly aligned with each row or column of water spraying openings 401b, and therefore the ingredient feeding device spraying piece 21 can also have a better flushing effect on the ingredient feeding device 2. It should be noted that with reference to FIG. 19, the hole pipe type showerheads may have a reciprocating motion function, and the hole pipe type showerheads enable the spray-heads to spray corresponding to the water spray openings 401b in the process of moving back and forth, and at the moment, only one of the hole pipe type showerheads is needed. Alternatively, referring to FIG. 20, the ingredient feeding device spraying piece 21 may have rotary showerheads, the water flow of the rotary showerheads is more concentrated and the water spray pressure is generally higher than the water spray pressure of the independent spraying heads, so that the rotary showerheads have a better flushing effect. When the number of the rotary showerheads is one, the rotary ingredient feeding device spraying piece 21 is arranged at the top in the inner shell 1a and is suspended in the geometric center of the multiple water spraying openings 401b. In the embodiment, preferably, referring to the FIG. 21, the spraying angle of the ingredient feeding device spraying piece 21 is selected to be 30 degrees or 45 degrees or 60 degrees, and it should be noted that the spraying angle of the ingredient feeding device spraying piece 21 can be other degrees. The spraying angle of the ingredient feeding device spraying piece 21 is determined by the vertical distance between the ingredient feeding device spraying piece 21 and the ingredient feeding device 2. It will be appreciated that, referring to FIG. 22, the setting positions of the ingredient feeding device spraying piece 21 and the ingredient feeding device 2 should take into consideration the turning radius of the ingredient feeding device 2, that is, the ingredient feeding device 2 cannot touch the ingredient feeding device spraying piece 21 during turning.

Figure 23:
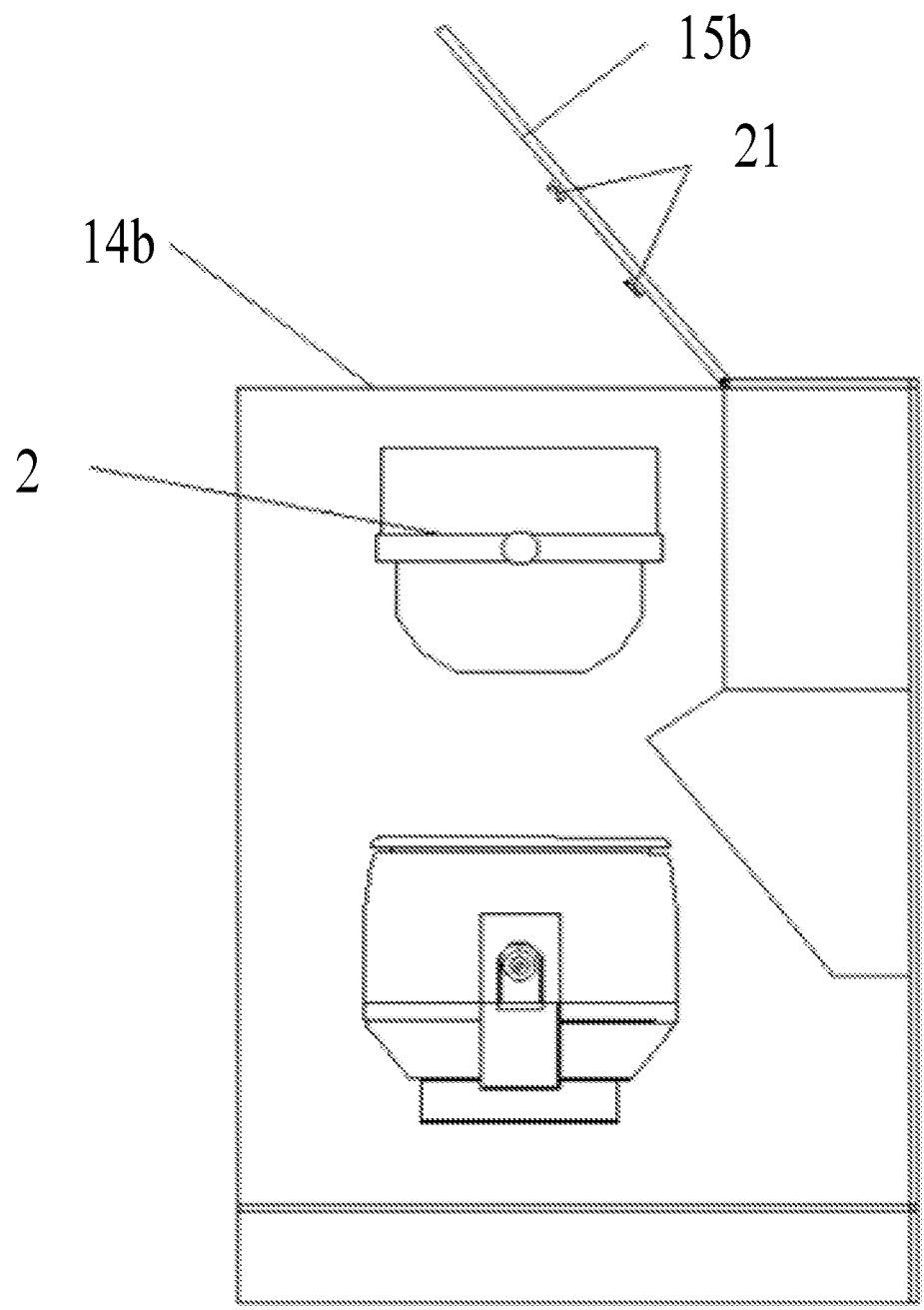

In the embodiment of the present invention, preferably, referring to FIG. 23, a top cover opening 14b is formed in the top of the inner shell 1a, a top cover door plate 15b capable of being opened and closed is arranged at the top cover opening 14b, and the top cover door plate 15b is provided with the ingredient feeding device spraying piece 21 the inner side wall located in the inner shell 1a. The ingredient feeding device spraying piece 21 is communicated with the top spraying head switch 9b via a hose arranged outside the inner shell 1a, the ingredient feeding device spraying piece 21 can be communicated with the top spraying head switch 9b via the hose, and meanwhile the top cover door plate 15b can be conveniently opened and closed. Thus, when a user needs to manually wash the ingredient feeding device 2, the user can open the top cover door plate 15b, and then wash the ingredient feeding device 2. When the full-automatic cooking machine needs to automatically wash the ingredient feeding device 2, the top cover door plate 15b can be closed, and the ingredient feeding device 2 can be washed by the ingredient feeding device spraying piece 21 arranged on the inner side wall of the top cover door plate 15b.

In the embodiment of the present invention, preferably, referring to FIGS. 25, 27, 28 and 29, the wok lid driving device 10a includes a wok lid rotating mechanism 100a and a wok lid push-pull mechanism 101a which are both arranged in the cooking fume treatment area 500, and an opening 11a' is formed in the inner shell 2a. The wok lid rotating mechanism 100a comprises a wok lid shaft core 1000a and a bearing 1001a. The wok lid push-pull mechanism 101a comprises a sliding piece 1010a, a driving motor 1011a electrically connected with the main control device 900 and a base 1012a fixed to the inner side of the outer shell 1a. An inner ring of the bearing 1001a is fixedly connected with an outer ring of the wok lid shaft core 1000a, an outer ring of the bearing 1001a is fixedly connected with the middle portion of the wok lid 12, and when the wok lid 12 rotates, the outer ring of the bearing 1001a rotates in the same direction, the inner ring of the bearing 1001a does not move, and the wok lid shaft core 1000a does not move either. The sliding piece 1010a comprises a fixing part 10102a and a rack 10101a connected with the fixing part 10102a, and the fixing part 10102a is fixedly connected with the wok lid shaft core 1000a; the base 1012a is provided with a sliding groove 100120a for the rack 10101a to slide, and the rack 10101a is arranged in the sliding groove 10120a. A rotating shaft of the driving motor 1011a is provided with a driving gear 10110a, and the driving gear 10110a is engaged with the rack 10101a, so that the driving motor 1011a drives the rack 10101a in the sliding groove 10120a through the driving gear 10110a, and the rack 10101a moves back and forth between the cooking cavity 100 and the cooking fume treatment area 500 from the opening 11a; and the rack 10101a can drive the wok lid 12 to move through the wok lid shaft core 1000a and the bearing 1001a during moving.

Specifically, the working process that the wok lid 12 covers or leaves the opening of the wok 1 is as follows: when the wok lid 12 is required to cover the opening of the work 1, the driving motor 1011a drives the driving gear 10110a according to a control command of the main control device 900, and the rack 10101a will also be driven by the driving gear 10110a to move in the sliding groove 10120a; the rack 10101a drives the wok lid shaft core 1000a and the bearing 1001a to move through the fixing part 10102a, the wok lid 12 fixedly connected with the bearing 1001a is made to move towards the opening of the wok 1, and therefore the wok 1 covers the opening of the wok 1, and at the moment, in the stir-frying process, the wok rotating device 14 can drive the wok 1 to rotate according to a control command of the main control device 900, and the center of the wok lid 12 is connected with the wok lid shaft core 1000a via the bearing 1001a, so that the wok lid 12 covering the opening of the wok 1 can also rotate around the center of the wok lid 12, and normal rotation of the wok 1 can be guaranteed. When the wok lid 12 is required to leave the opening of the wok 1, the driving motor 1011a reversely drives the driving gear 10110a according to the main control device 900, so that the rack 10101a reversely moves in the sliding groove 10120a, and meanwhile, the rack 10101a drives the wok lid shaft core 1000a and the bearing 1001a to reversely move through the fixing part 10102a; and the wok lid 12 fixedly connected with the bearing 1001a moves in the direction far away from the opening of the wok 1, so that the wok lid 12 leaves the opening of the wok 1.

Figure 27:
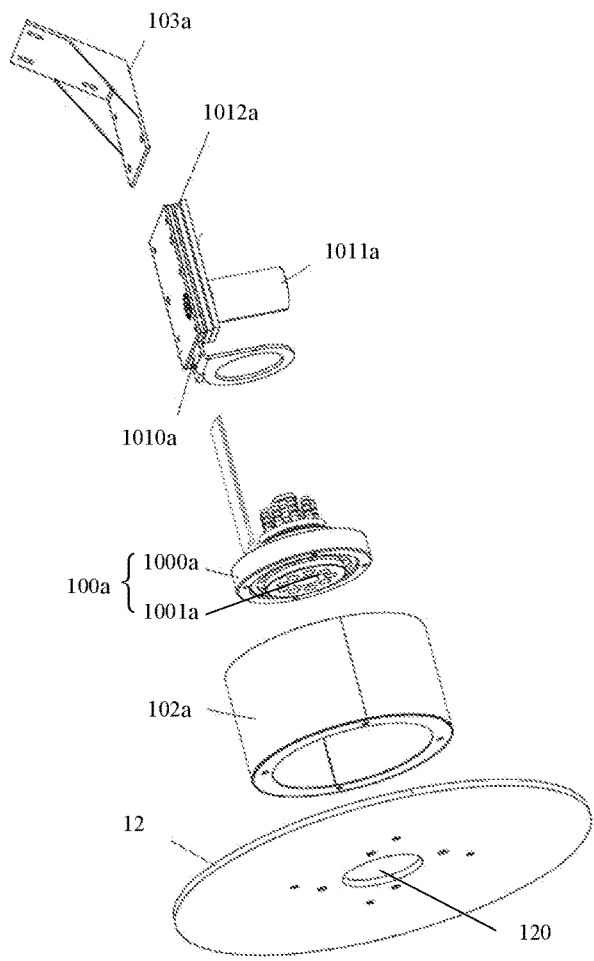
FIG. 27 is a structural schematic view of the wok lid driving device shown in FIG. 3.
Figure 28:
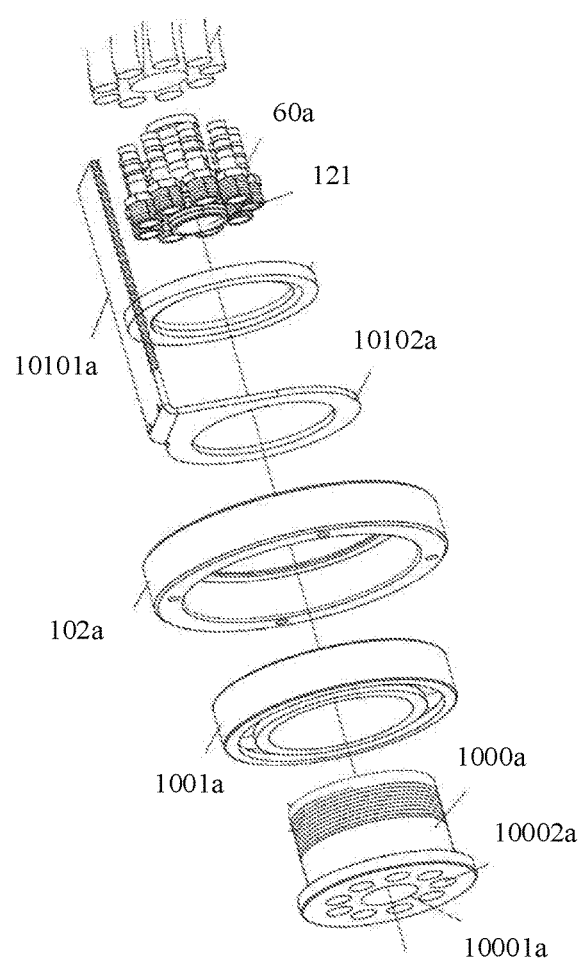
FIG. 28 is a schematic diagram of a connection structure of the wok lid driving device shown in FIG. 27.
Figure 29:
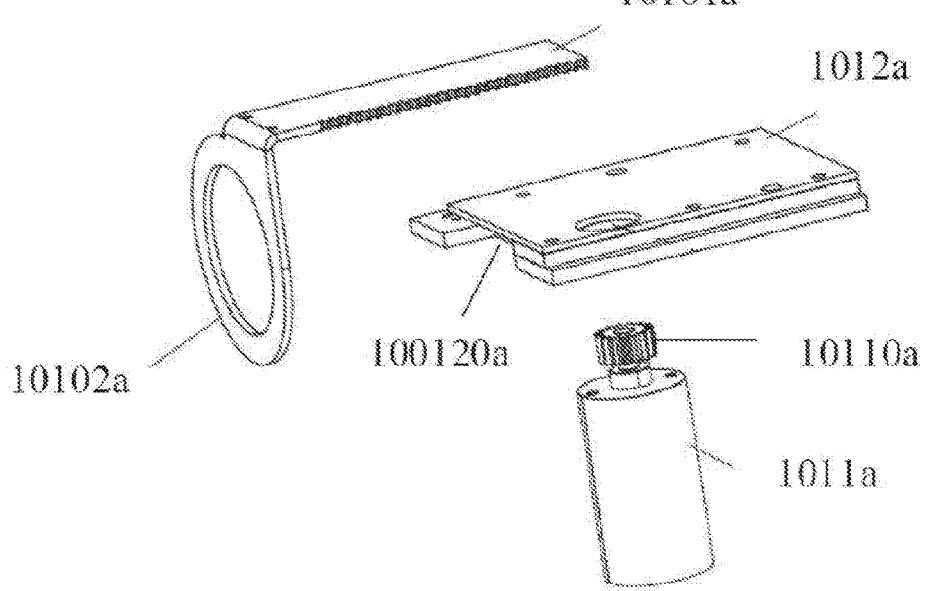
FIG. 29 is a partially exploded structural schematic view of the wok lid driving device shown in FIGS. 27 and 28.

Preferably, referring to FIGS. 27 and 28, an exhaust port 120 is formed in the center of the wok lid 12; the wok lid shaft core 1000a is of a hollow structure with an opening in one end, the other end of the wok lid shaft core 1000a is provided with a cooking fume opening 10001a communicated with the cooking fume inlet end of a cooking fume pipeline 121, the wok lid shaft core 1000a is arranged at the exhaust port 120 and does not make contact with the wok lid 12, the inner ring of the bearing 1001a is connected with the outer ring of the wok lid shaft core 1000a, and the outer ring of the bearing 1001a is fixedly connected with the wok lid 12.

More preferably, referring to FIGS. 27 and 28, the other end of the wok lid shaft core 1000a is further provided with a plurality of seasoning injection openings 10002a communicated with the seasoning injection pipes 60a, so that when the automatic seasoning adding device supplies certain seasoning to the corresponding seasoning injection pipes 60a according to the control command of the main control device 900, the seasoning injection pipe 60a can inject seasoning into the wok 1 covered by the wok lid 12 from the corresponding seasoning injection opening 10002a.

Preferably, the cooking fume opening 10001a is formed in the center of the other end of the wok lid shaft core 1000a, and the seasoning injection openings 10002a surround the cooking fume opening 10001a.

More preferably, referring to FIGS. 27 and 28, the wok lid driving device 10a further comprises the annular fastener 102a, the center of the annular fastener 102a is aligned with the exhaust port 120, the inner ring of the annular fastener 102a is fixedly connected to the outer ring of the bearing 1001, the bottom of the annular fastener 102a is connected to the wok lid 12, that is, the bearing 11001a is used for fixing the wok lid 12 through the annular fastener 102a, and meanwhile, the annular fastener 102a can surround the bearing 1001a and the wok lid shaft core 1000a, so that the bearing 1001a and the wok lid shaft core 1000a can be protected.

In the embodiment of the present invention described above, further referring to FIG. 27, the wok lid driving device 10a further comprises a base install piece 103a by means of which the base 1012a is installed on the inside of the outer shell 1a.

Figure 30:
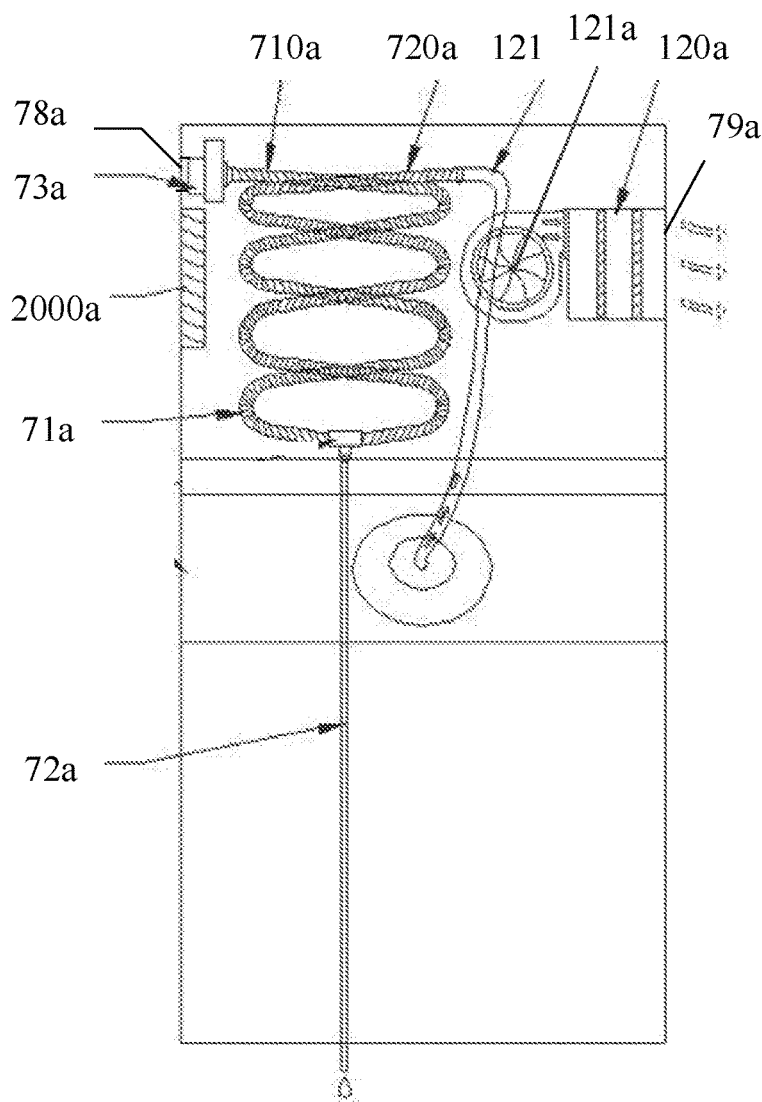
FIG. 30 is a schematic structure diagram of the first cooking fume treatment device and the second cooking fume treatment device provided by the embodiment of the present invention.

As a further improved embodiment, referring to FIG. 30, the first cooking fume treatment device 7a comprises a cooking fume pipeline 121, a condensation pipe 71a, a condensate collector 72a and a pipeline fan 73a electrically connected with the main control device 900. A cooking fume inlet end of the cooking fume pipeline 121 is arranged at the exhaust port 120 formed in the wok lid 12, an cooking fume outlet end of the cooking fume pipeline 121 is connected with a cooking fume inlet end of the condensation pipe 71a, a cooking fume outlet end of the condensation pipe 71a is connected with a cooking fume exhaust end of the pipeline fan 73a, and a cooking fume exhaust end of the pipeline fan 73a is arranged at a first cooking fume exhaust port 78a formed in the outer shell 1a. The pipe section of the condensation pipe 71a is distributed up and down, the condensate collector 72a is communicated with the lowest part of the condensation pipe 71a, and the condensate collector 72a is arranged below the condensation pipe 71a. The pipeline fan 73a works according to a control command of the main control device 900, so that negative pressure is formed at the first exhaust port 78a, and cooking fume in the wok 1 is discharged from the cooking fume pipeline 121, the condensation pipe 71a and the first exhaust port 78a in sequence; due to the fact that the temperature of the cooking fume directly coming out of the wok 1 is high, the high-temperature cooking fume can be cooled by the condensation pipe 71a and then discharged, the high-temperature cooking fume is prevented from damaging the pipeline fan 73a, and the phenomenon that the discharged high-temperature cooking fume possibly hurts people is avoided. Condensate in the condensation pipe 71a is collected by the condensate collector 72a and discharged out. It should be noted that the cooking fume pipeline 121 is made of a material (such as metal or alloy) with a high temperature resistance characteristic; the condensation pipe 71a can be made of metal materials and can cool rapidly with the characteristics of metal, so that the condensation efficiency is high, and the effect is good.

Specifically, the condensate collector 72a is connected to a break or an open hole in the middle portion of the condensation pipe 71a. Preferably, the condensate collector 72 may comprise a reservoir (not shown) and a drain control valve (not shown).

Further, the first cooking fume treatment device 7a further comprises a cooling device for cooling the condensation pipe 71a. Preferably, referring to the FIG. 8, the cooling device comprises a cooling fan 2000a, the cooling fan 2000a is arranged in a fan opening formed in the outer shell, and the fan opening is aligned with the condensation pipe 71a and communicated with the cooking fume treatment area 500. It should be noted that the cooling device can also be a cooling water tank (not shown) arranged in the cooking fume treatment area 500, and the condensation pipe 71a is arranged in the cooling water tank.

Preferably, referring to FIG. 30, the condensation pipe 71a comprises a first condensation pipe 710a and a second condensation pipe 720a which are arranged in the vertical direction, the cooking fume inlet end of the first condensation pipe 710a is connected with the cooking fume outlet end of the cooking fume pipeline 121, and the cooking fume outlet end of the first condensation pipe 710a is connected with the cooking fume inlet end of the second condensation pipe 720a. The cooking fume outlet end of the second condensation pipe 720a is connected with the cooking fume inlet of the pipeline fan 73a, and the condensate collector 72a is arranged at the juncture of the first condensation pipe 710a and the second condensation pipe 720a.

Preferably, the first condensation pipe 710a and the second condensation pipe 720a are serpentine condensation pipes. Preferably, the first condensation pipe 710a and the second condensation pipe 720a are symmetrically distributed in a mutually crossed manner. The first condensation pipe 710a and the second condensation pipe 720a joint at a condensate collector 72a, and the condensate collector 72a is connected with a liquid discharge pipe. The liquid discharging pipe vertically extends downwards and is used for discharging the condensed liquid collected by the condensate collector 72a out of the outer shell 1a for treatment. In the using process, negative pressure is generated in the first condensation pipe 710a and the second condensation pipe 720a by the pipeline fan 73a, cooking fume enters the first condensation pipe 710a from the cooking fume pipeline 121, part of cooking fume is condensed into liquid to flow into the condensate collector 72a, and the other part of cooking fume continues to enter the second condensation pipe 720a to be condensed under negative pressure. Therefore, the condensation efficiency can be greatly improved by the design of the double condensation pipes 71a.

In the embodiment of the present invention, further referring to FIG. 30, the cooking machine further comprises a second cooking fume treatment device 12a arranged in the outer shell 1a, the second cooking fume treatment device 12a comprises a cooking fume filter 120a and an exhaust fan 121a electrically connected with the main control device 900. An exhaust opening of the exhaust fan 121a is communicated with the cooking cavity 100 (a cavity cooking fume outlet 1400a is formed in the inner shell 2a and correspondingly communicated with the exhaust opening), a cooking fume outlet of the exhaust fan 121a is communicated with a cooking fume inlet of the cooking fume filter 120a, and a cooking fume outlet of the cooking fume filter 120a is formed in a second exhaust port 79a formed in the outer shell 1a. The exhaust fan 121a can be used for pumping cooking fume in the cooking cavity 100 into the cooking fume filter 120a, and the cooking fume is discharged after being treated by the cooking fume filter 120a. Therefore, the cooking fume leaking from the wok 1 into the cooking area can be treated, and it is further guaranteed that the cooking fume is prevented from polluting the interior of the intelligent cooking machine.

Figure 37:
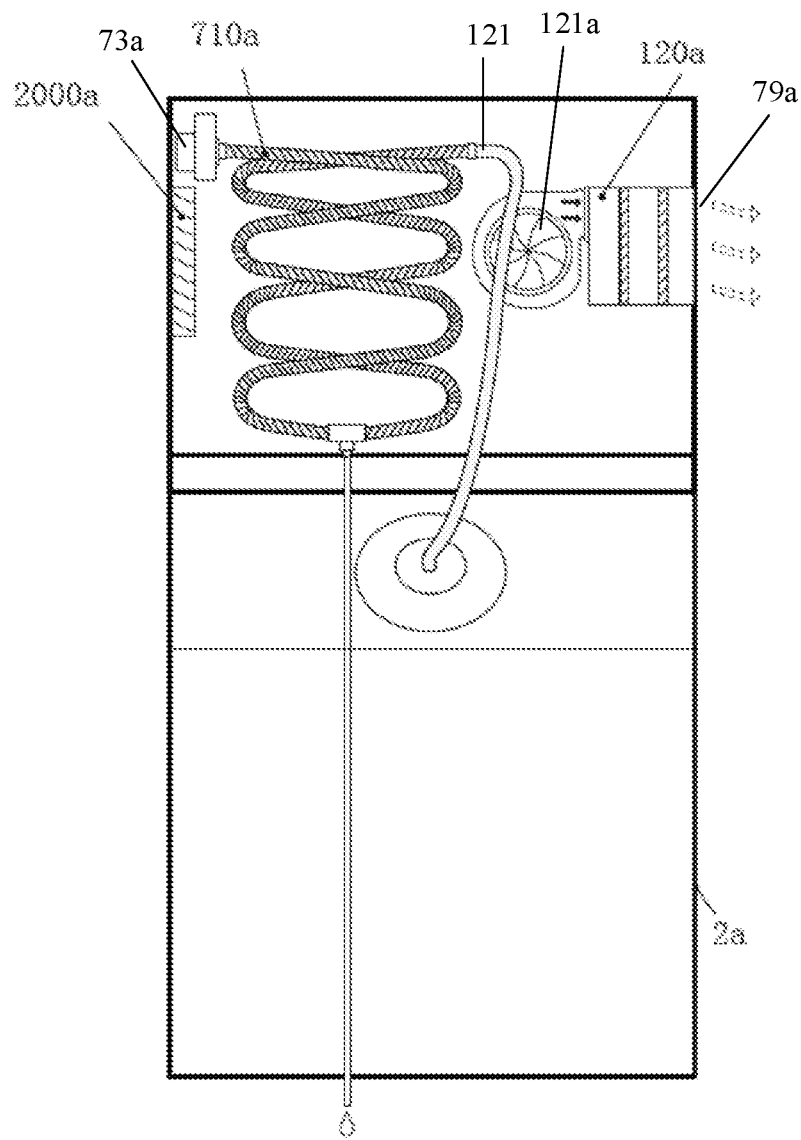
FIGS. 37-38 are schematic diagrams of structures of another cooking fume treatment system provided by the present embodiment.
Figure 38:
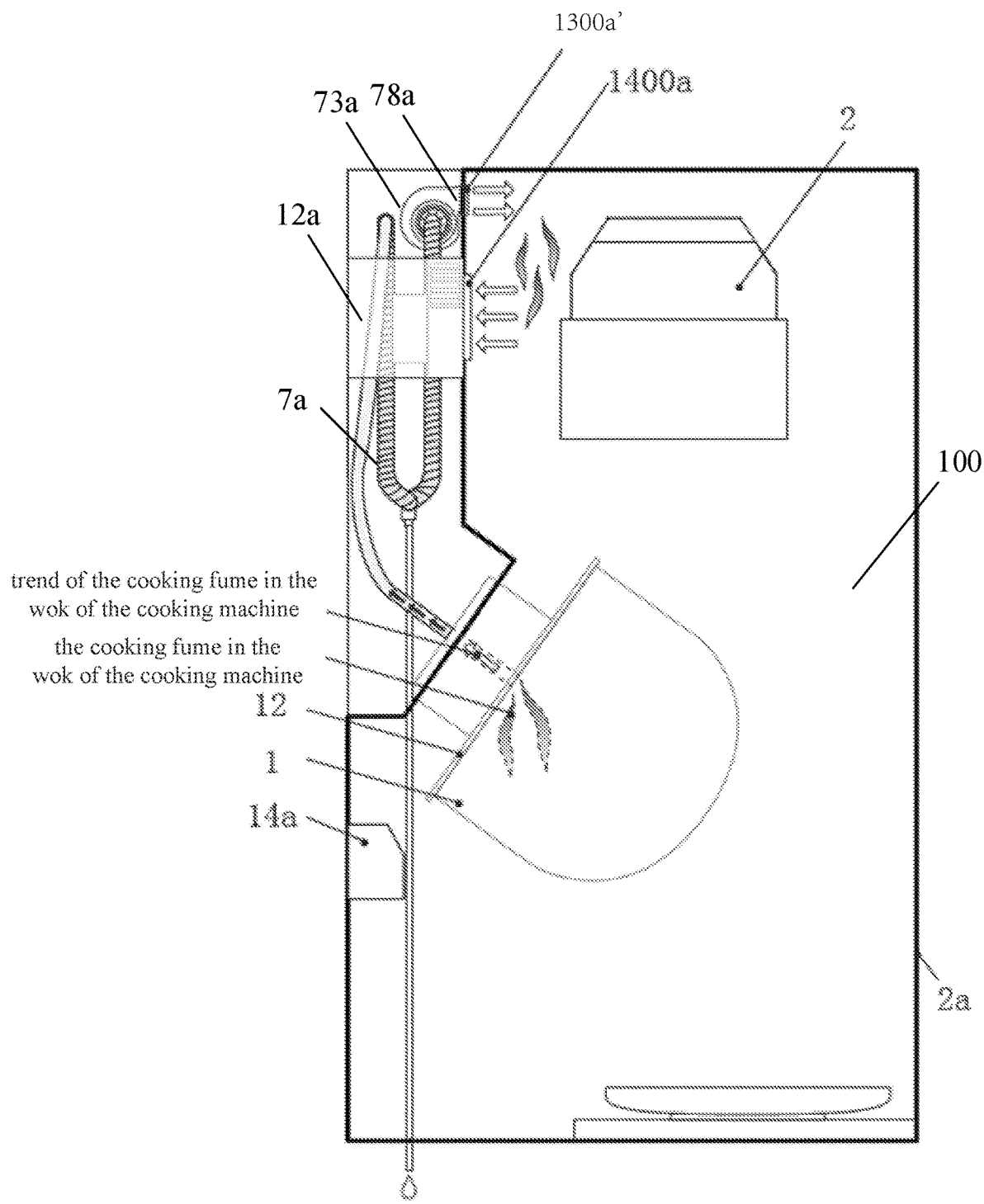

As a further improved embodiment of the cooking fume treatment system, referring to FIGS. 37 and 38, a first exhaust port 78a of the first cooking fume treatment device 7a is improved to be communicated with a closed cooking cavity 100 in the inner shell 2a (an exhaust gas return port 1300a' correspondingly communicated with the first exhaust port 78a in a sealed manner is formed in the inner shell 2a), the cooking fume treated by the first cooking fume treatment device 7a is not directly discharged to the outside, but is discharged back into the cooking cavity 100 from the first exhaust port 78a; then, the second cooking fume treatment device 12a performs secondary purification treatment on cooking fume waste gas (including cooking fume gas escaping from the wok and cooking fume gas treated by the first cooking fume treatment device 7a and discharged to the cooking cavity 100) in the cooking cavity 100, and then the cooking fume waste gas is discharged to the outside only from a second exhaust port 79a of the second cooking fume treatment device 12a.

Therefore, according to the cooking fume treatment system disclosed by the embodiment of the present invention, the closed cooking cavity 100 is formed in the inner cavity of the inner shell 2a, the wok device (comprising the wok and the wok lid) is arranged in the closed cooking cavity 100, and the wok is closed by the wok lid during cooking, so that a first-layer closed cooking space is formed in the inner cavity of the wok; cooking fume generated during closed cooking of the wok 1 is discharged to the first cooking fume treatment device 7a for treatment from the exhaust port 120 of the wok lid 12; in addition, under a second-layer of closed cooking space of the sealed cooking cavity 100, even if the cooking fume gas escaping from the wok 1 in the cooking process is limited in the cooking cavity and is exhausted after being purified, and the situation that the cooking fume generated in the cooking process is directly exhausted outwards to pollute the surrounding environment is avoided. In addition, compared with the kitchen space, the volume of the cooking area is small, so that the cooking fume purification treatment efficiency can be greatly improved. As a further improvement scheme, a cooking fume outlet of a pipeline fan of the first cooking fume treatment device 7a is communicated with the cooking cavity 100, that is, waste gas exhausted from the cooking fume treatment area is exhausted into the cooking cavity 100, and the second cooking fume treatment device can perform secondary purification treatment on cooking fume gas escaping from the cooking equipment and cooking fume gas exhausted from the first cooking fume treatment device 7a, therefore, the purification efficiency is high, and the purification effect is better.

Referring to FIG. 3, the automatic cooking machine further comprises the draining device 13a and an automatic wok washing device 14a used for washing the wok 1. A draining area 15a is additionally formed between the bottom of the outer shell 1a and the bottom of the inner shell 2a; the automatic wok washing device 14a is arranged in the cooking cavity 100; the draining device 13a is arranged at the draining area 15a and located below the wok 1, a wok washing liquid collecting opening 1301a communicated with the cooking cavity 100 is formed in the top of the draining device 13a, and the bottom of the draining device 13a is communicated with a draining opening 200 formed in the outer shell 1a; the automatic wok washing device 14a is electrically connected with the main control device 900 so as to receive a control command sent by the main control device 900 according to a preset recipe program and perform corresponding operation according to the control command.

Specifically, the working process of washing the wok 1 is as follows: after the intelligent cooking machine finishes a dish discharging process, the wok working position controlling device drives the wok 1 to turn according to a control command of the main control device 900, so that the opening of the wok 1 faces the automatic wok washing device 14a, and the automatic wok washing device 14a is used for washing the wok 1; the automatic wok washing device 14a sprays water to the wok 1 according to a control command of the main control device 900 to wash the wok 1, wok washing liquid in the wok 1 can be poured into the wok washing liquid collecting opening 1301a to enter the draining device 13a, and then the wok washing liquid in the draining device 13a is drained out from the draining opening 200.

Figure 31:
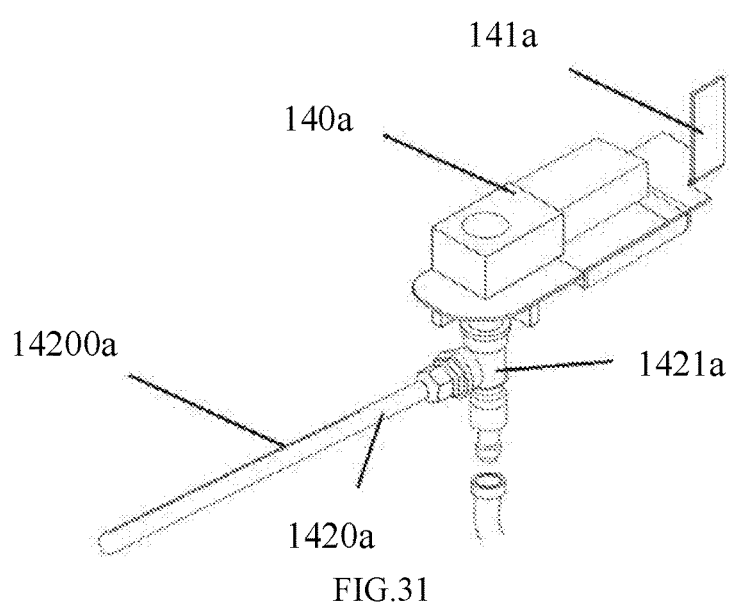
FIG. 31 is a perspective view of the automatic wok washing device shown in FIG. 3.
Figure 32:
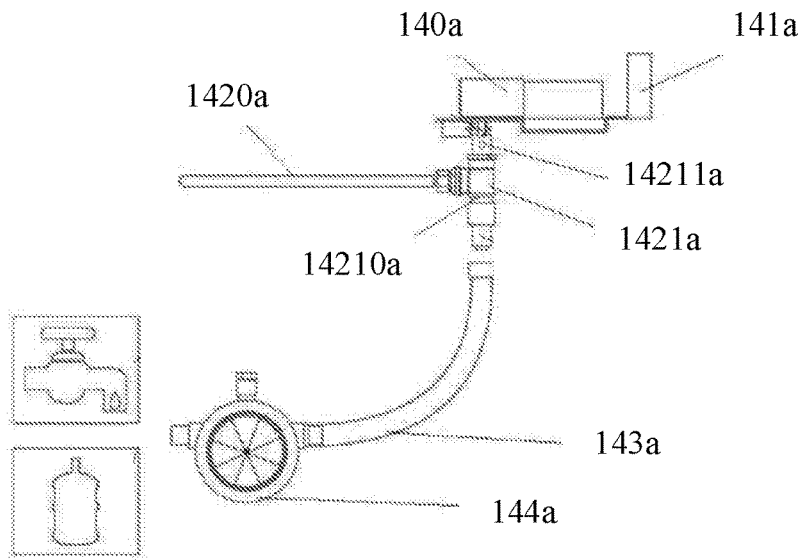
FIG. 32 is a schematic diagram of the structure of the automatic wok washing device shown in FIG. 3.
Figure 33:
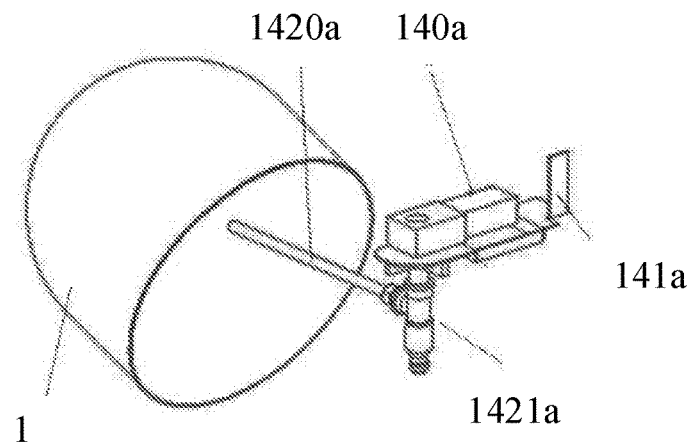
FIG. 33 is a state diagram of the automatic wok washing device shown in FIGS. 31 and 32 for washing the wok.

Preferably, referring to FIGS. 31 and 32, a placement opening 17a communicated with the cooking cavity 100 is formed in a position of a side portion of the inner shell 2a close to the wok 1, and the automatic wok washing device 14a is arranged at the placement opening 17a; the automatic wok washing device 14a comprises a first driving unit 140a, a fixing frame 141a and a wok spraying piece 11; the first driving unit 140a is electrically connected with the main control device 900 and installed on the fixing frame 141a; the fixing frame 141a is arranged at the position of the placement opening 17a. The wok spraying piece 11 comprises a cleaning pipe 1420a and a rotatable pipe joint 1421a; the cleaning pipe 1420a is connected with the first driving unit 140a via the pipe joint 1421a, and the first driving unit 140a drives the pipe joint 1421a to rotate, so as to drive the cleaning pipe 1420a to rotate into the wok 1 or rotate out of the wok 1; one end of the cleaning pipe 1420a is communicated with the pipe joint 1421a, and the other end of the cleaning pipe 1420a is closed; and a plurality of water outlet holes 14200a for washing the inner wall of the wok 1 are formed in the cleaning pipe 1420a.

Figure 11:
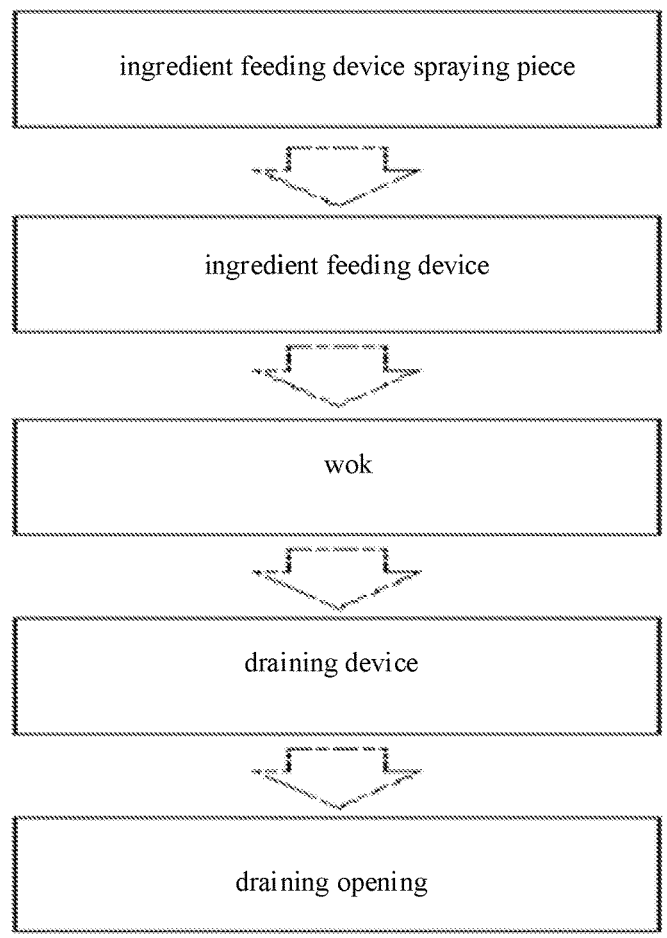
FIG. 11 is a water flow schematic diagram of the cooking machine provided by the embodiment of the present invention when the ingredient feeding device in the cooking machine is cleaned.
Figure 12:
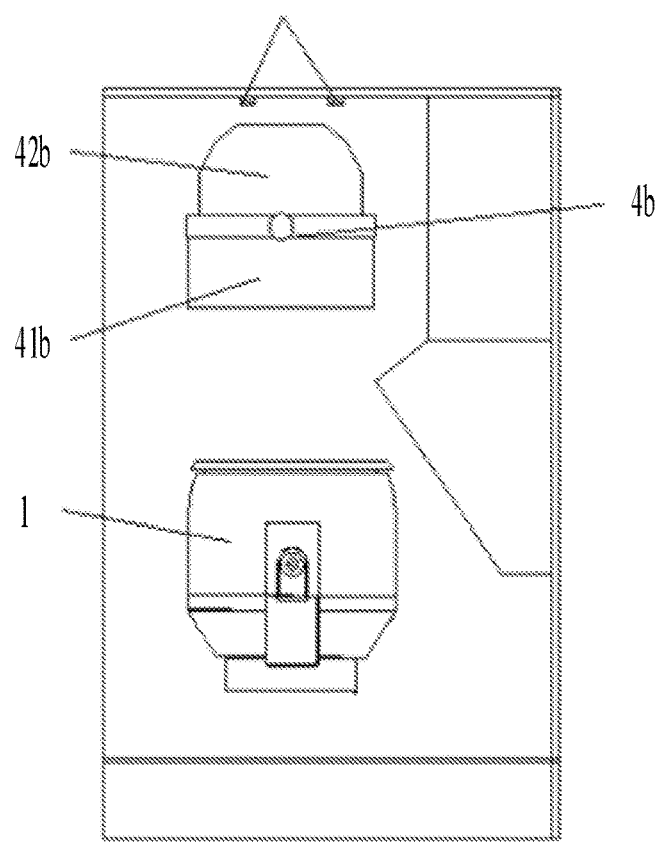
FIG. 12 is a schematic view of the multi-compartment container shown in FIG. 10 being placed into or removed from an ingredient-dropping chamber.
Figure 13:
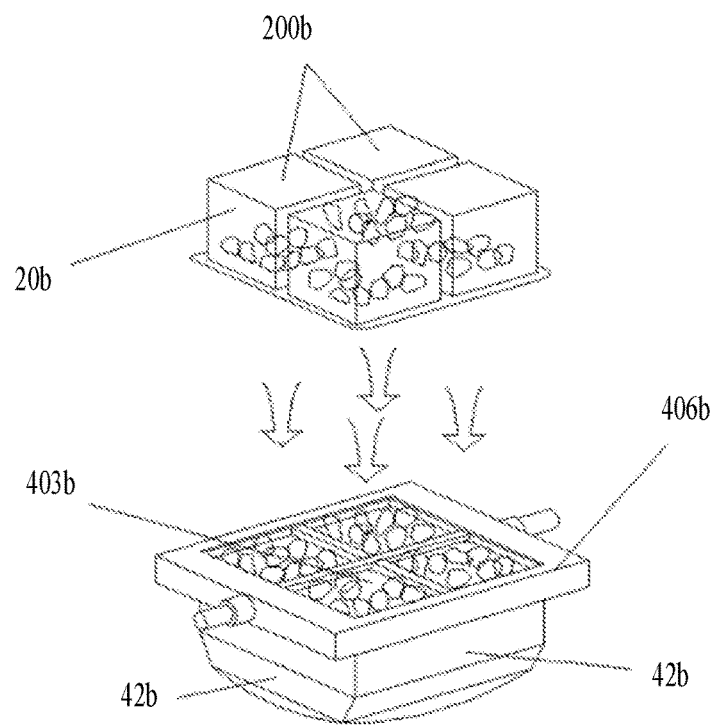
FIG. 13 is a schematic view of the multi-compartment container shown in FIG. 10 when inverted.

Based on the technical scheme, the washing work process of the automatic wok washing device 14a on the wok 1 is specifically as follows: when the wok 1 needs to be washed, the wok working position controlling device drives the wok 1 to urn according to the control command of the main control device 900, so that the opening of the wok 1 faces the automatic wok washing device 14a, and the wok 1 is automatically washed. At the moment, the main control device 900 controls the first driving unit 140a to rotate the cleaning pipe 1420a of the wok spraying piece 11 into the wok 1 (as shown in FIG. 11, the preferable scheme is that the cleaning pipe 1420a rotates to be close to the inner side wall of the wok of the wok 1 and the water outlet holes 14200a are aligned with the inner side wall of the wok 1). At the moment, external cleaning liquid such as water enters the cleaning pipe 1420a from the water inlet and then is sprayed to the inner wall of the wok from the water outlet holes 14200a of the cleaning pipe 1420a to complete washing of the inner wall of the wok. After the washing process of the wok 1 is completed, the main control device 900 controls the first driving unit 140a to rotate the cleaning pipe 1420a to be away from the wok 1, namely the cleaning pipe 1420a is withdrawn, and therefore the whole washing process is completed. Therefore, the automatic wok washing device 14a for the cooking machine not only can be matched with the automatic cooking machine to achieve the automatic washing function on the wok 1, but also is simple in structure, very convenient to use and high in automation degree, and is an important auxiliary device capable of continuously working of the cooking machine.

Further, referring to FIG. 32, in a preferred embodiment, the automatic wok washing device 14a further includes a pipeline 143a and a second driving unit 144a (e.g., a water pump or a water valve) electrically connected to the main control device 900, a water inlet of the pipe joint 1421a is connected to the external water supply end via the pipe 143a, and the second driving unit 144a is installed on the pipeline 143a.

Further, in this embodiment, referring to FIGS. 31 and 32, the pipe joint 1421a comprises an adapter 14210a and a linkage joint 14211a rotatably connected with the adapter 14210a, the water outlet and the water inlet are both formed in the adapter 14210a, the first driving unit 140a is connected with the linkage joint 14211a, and the opening and closing state between the first driving unit 140a and the pipe joint 1421a is further optimized; when the main control device 900 sends control command of putting down the cleaning pipe 1420a and judges that the cleaning pipe 1420a reaches the corresponding putting-down state, the main control device 900 controls the second driving unit 144a arranged on the pipeline 143a to be opened and makes the cleaning pipe 1420a start to work by spraying water to carry out the cleaning work. Therefore, the first driving unit 140a can more flexibly control the opening or closing of the pipe joint 1421a through the connecting joint and the adapter 14210a; the water inlet of the pipe joint 1421a is provided with a rotatable sealing connector which is connected with the pipeline 143a and realizes opening or closing of the pipeline 143a through rotation, so that water in the pipeline 143a is mainly prevented from leaking at the water inlet and the like; the sealing connector is preferably a rotatable sealing connector, so that the pipeline 143a is more conveniently connected with the water inlet.

Figure 34:
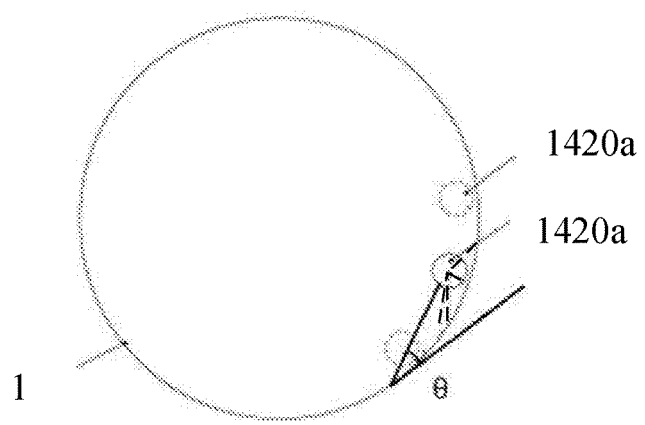
FIG. 34 shows the specific positional relationship of the cleaning tube in FIGS. 31 and 32 with the inner side wall of the wok.

Further, in this embodiment, as shown in FIG. 31, a plurality of the water outlet holes 14200a are uniformly arranged in at least one column in the direction in which one end of the cleaning pipe 1420a extends toward the other end thereof, mainly for uniform spraying of water at the water outlet holes 14200a during cleaning; meanwhile, a water curtain spray head is further arranged at each of the water outlet holes 14200a of the cleaning pipe 1420a, so that the water in the pipeline 143a is buffered, the water is not prone to splashing, and more importantly, the water can form a divergent water curtain similar to a watering sprinkler after passing through the water curtain spray head, so that the cleaning effect is better; further, the water outlet holes 14200a are evenly distributed in a side, close to the inner wall of the wok, of the cleaning pipe 1420a when the cleaning pipe 1420a is in the working state; when the cleaning pipe 1420a is put down, the water valve is controlled to be opened by the main control device 900, the cleaning pipe 1420a is started to work, water is sprayed, and washing work is performed, so that a more obvious cleaning effect is achieved. Referring to FIG. 34, further, the water spraying holes are evenly distributed towards the front lower portion of one side of the inner wall of the wok, an included angle formed between the water outlet direction of each of the water outlet holes 14200a or the straight line where the axis direction of each of the water outlet holes 14200a is located and the tangent line of the inner wall of the wok is θ (0°<θ<90°), and a certain tangent angle is maintained with the wok inner wall. Thus, the residues in the wok can be combined together along water flow sprayed from the cleaning pipe 1420a to be washed consistently, and the optimal flushing effect is achieved. One end, close to the water outlet, of the cleaning pipe 1420a is not provided with the water outlet holes 14200a, so that the cleaning pipe 1420a is mainly prevented from spraying water out of the wok during cleaning, meanwhile, in the embodiment, the adapter 14210a can only change the angle of the cleaning pipe 1420a in the horizontal direction, and if the position of the cleaning pipe 1420a is changed to be adjusted up and down, left and right according to the wok, an additional position adjusting device is required to adjust the whole support to change the position.

As shown in FIG. 32, further, in the present embodiment, the second driving unit 144a is preferably a high-pressure pump, and since it is laborious to clean food residue, the high-pressure pump is used to pressurize the water in the pipeline 143a during cleaning, and the water is ejected from high-pressure water ejection holes of the cleaning pipe 1420a to form a high-pressure water curtain. Residues adhered to the inner wall of the wok are washed at high pressure by utilizing the high-pressure water curtain forming a tangent angle with the inner wall of the wok, so that the automatic cooking machine can be quickly cleaned; further, the first driving unit 140a is preferably a motor; the pipe joint 1421a is preferably a T-shaped pipe joint 1421a, so that the pipe joint 1421a can perform both a water passing function and a rotating function; the wok spraying piece 11 can further comprise a liquid inlet pipe and a liquid inlet pipe switch, the liquid inlet pipe switch is electrically connected with the main control device 900 and controls the liquid inlet pipe to be opened according to a control command of the main control device 900 so as to inject washing liquid into the wok, and the wok spraying piece 11 is mainly used for washing residues which are difficult to clean and can only be cleaned by the washing liquid.

In the embodiments of the present embodiment described above, preferably, referring to FIGS. 35 and 36, the draining device 13a includes a diversion trench 130a, a water storage trench 131a, a filtering device 132a and a draining pipe 133a; the diversion trench 130a is arranged above the water storage trench 131a, the top of the diversion trench 130a is provided with the wok washing liquid collecting opening 1301a, and the bottom of the diversion trench 130a is provided with a diversion outlet 1300a leading to the water storage trench 131b; the filtering device 132a is arranged between the top portion and the bottom portion in the water storage trench 131a and is positioned below the diversion outlet 1300a; one end of the draining pipe 133a is communicated with the bottom in the water storage trench 131a, and the other end of the draining pipe 133a is communicated with the draining opening 200. On the basis of the structure, waste water discharged during wok washing and water discharging of the cooking machine can enter the water storage trench 131a from the wok washing liquid collecting opening 1301a by guiding of the flow diversion trench 130a and then is filtered in the water storage trench 131a by the filtering device 132a, and filtered water is discharged from the draining pipe 133a; therefore, the filtering device 132a can avoid arbitrary discharge of waste water, and then can avoid the pollution to the environment. Moreover, by arranging the water storage trench 131a and arranging the filtering device 132a in the water storage trench 131a, the filtering capacity can be increased, and the filtering efficiency can be improved.

Figure 35:
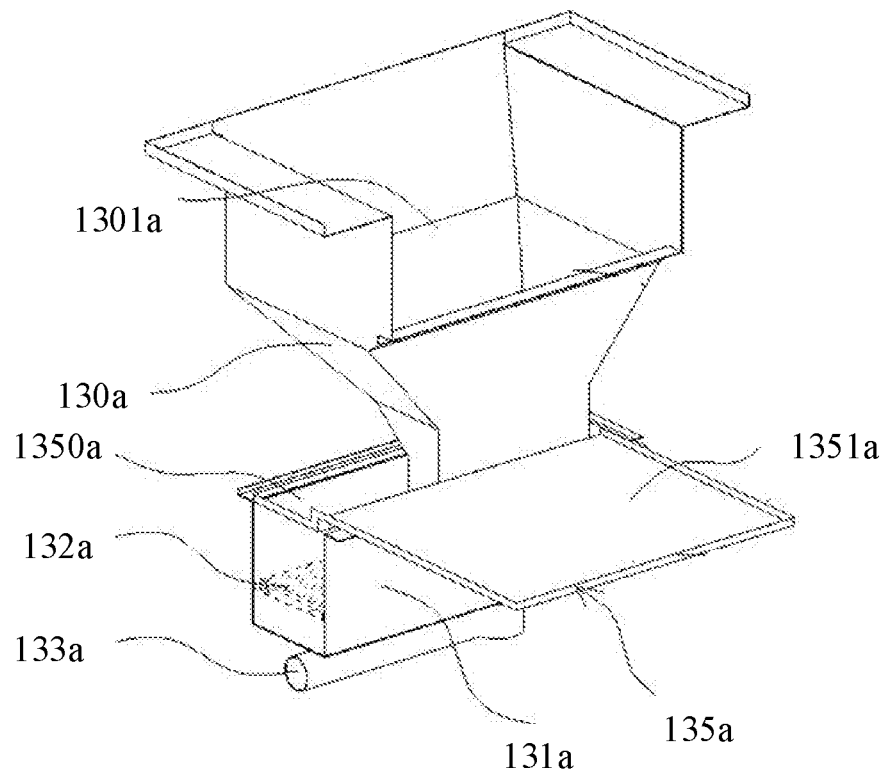
FIG. 35 is a schematic diagram of the structure of the draining device shown in FIG. 3.
Figure 36:
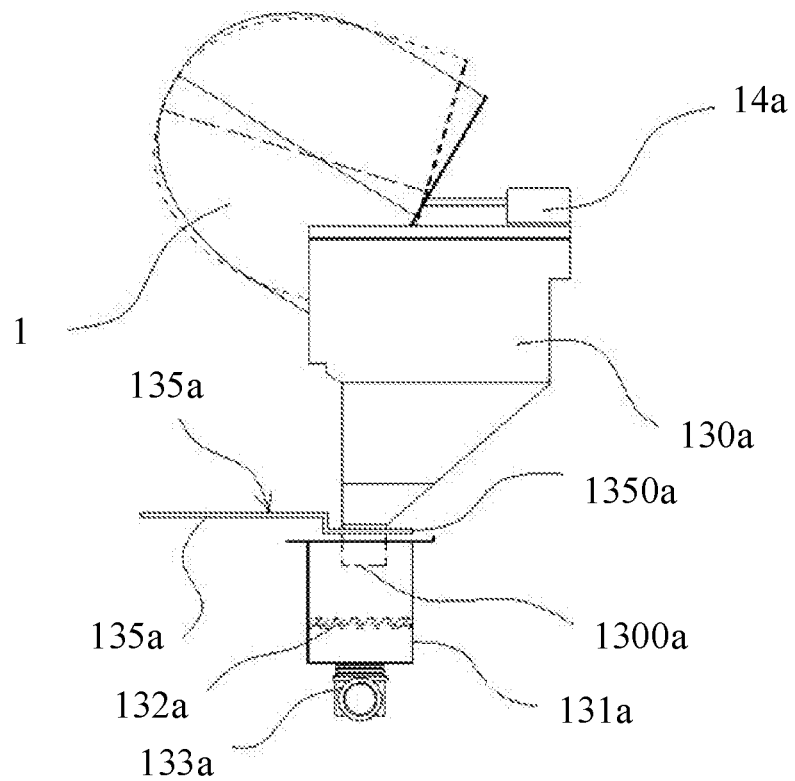
FIG. 36 is a state diagram of the wok shown in FIG. 3 in a pouring working position.

With reference to FIGS. 35 and 36, the diversion trench 130a of the present embodiment is provided with an installing recess 134a at the wok wash liquid collecting opening 1301a, and the installing recess 134a can be used to install the wok 1, as can be seen in the drawings in particular. In the embodiment, the filtering device 132a divides the water storage trench 131a into an upper-layer space and a bottom-layer space, the bottom of the diversion trench 130a extends into the opening of the water storage trench 131a, the diversion outlet 1300a is arranged in the upper-layer space, and the draining pipe 133a is communicated with the bottom-layer space, so that water from the diversion outlet 1300a of the diversion trench 130a firstly enters the upper-layer space of the water storage trench 131a; and then the water is filtered by the filtering device 132a to enter the bottom-layer space of the water storage trench 131a, and then the water is discharged by the draining pipe 133a, so that the filtering capacity is favorably increased by using the water storage trench 131a. Specifically, the filtering device 132a of the embodiment is a mesh filtering device 132a, while the diversion trench 130a is a funnel-shaped diversion trench 130a; it is to be noted that in the present invention, the construction and materials of the filtering device 132a and the shape of the diversion trench 130a may not be limited by the present embodiment, and in other embodiments, may be reasonably selected according to actual needs.

Further, referring to FIGS. 35 and 36, the filtering device 132a of the present embodiment further includes a splash guard 135a disposed on a bottom side of the diversion trench 130a, and a bottom portion of the diversion trench 130a penetrates through the splash guard 135a. Specifically, the splash guard 135a comprises a connecting plate part 1350a and an extending plate part 1351a, the extending plate part 1351a extends out of the side, provided with the installing recess 134a, of the diversion trench 130a, the connecting plate part 1350a is arranged over an opening of the water storage trench 131a, and the bottom portion of the diversion trench 130a penetrates through the connecting plate part 1350a; moreover, the extending plate part 1351a is higher than the connecting plate part 1350a, so that a step is formed between the connecting plate part 1350a and the extending plate part 1351a, the step is positioned above the opening of the water storage trench 131a, and the splash guard 135a is provided with a through opening at the step, and the through opening is positioned at or close to the diversion outlet 1300a; the edge of the splash guard 135a of the embodiment is also provided with a baffle plate. Therefore, the water splashed out by the wok of the automatic cooking machine in the process of turning from the wok washing working position to the water discharging working position can be received by the splash guard 135a, and is guided to the through opening to enter the water storage trench 131a to be filtered, so that waste water can be prevented from being sprayed outside to pollute the kitchen and bath environment. The extending plate part 1351a extends out from the side, provided with the installing recess 134a, of the diversion trench 130a, is arranged according to the main direction of water splashing, and can receive splashed water in a larger range; and the baffle plate is arranged to prevent water received by the splash guard 135a from flowing out the splash guard 135a, and the water received by the splash guard 135a is favorably guided to the through opening to enter the water storage trench 131a.

According to the filtering device 132a of the embodiment, the wok 1 may be install at the installing recess 134a of the diversion trench 130a; the cooking machine of the embodiment can be configured with a wok washing working position (specifically, the position of the wok 1 indicated by dotted lines in the drawings) and a water discharging working position (specifically, the position of the wok 1 indicated by solid lines in the drawings) for the wok 1, the wok 1 can be washed by high pressure at the wok washing working position, and water in the wok 1 can be completely poured out at the water discharging working position. In the embodiment of the present invention, when the cooking machine performs a wok washing procedure, the wok is turned to the wok washing working position firstly, then the water curtain brush is put down by the wok washing device of the cooking machine to wash the wok 1, and the washed water is guided into the water storage trench 131a by the diversion trench 130a to be filtered and then discharged; after the cooking machine performs the wok washing procedure, the wok is turned to the water discharging working position to pour out all the water in the wok, and the water poured out of the wok is also guided into the water storage trench 131a by the diversion trench 130a to be filtered and then discharged. Thus, the filtering device 132a of the present embodiment can avoid arbitrary discharge of wastewater and the pollution to the environment, and the filtering capacity can be increased, so that the filtering efficiency can be improved.

Figure 24:
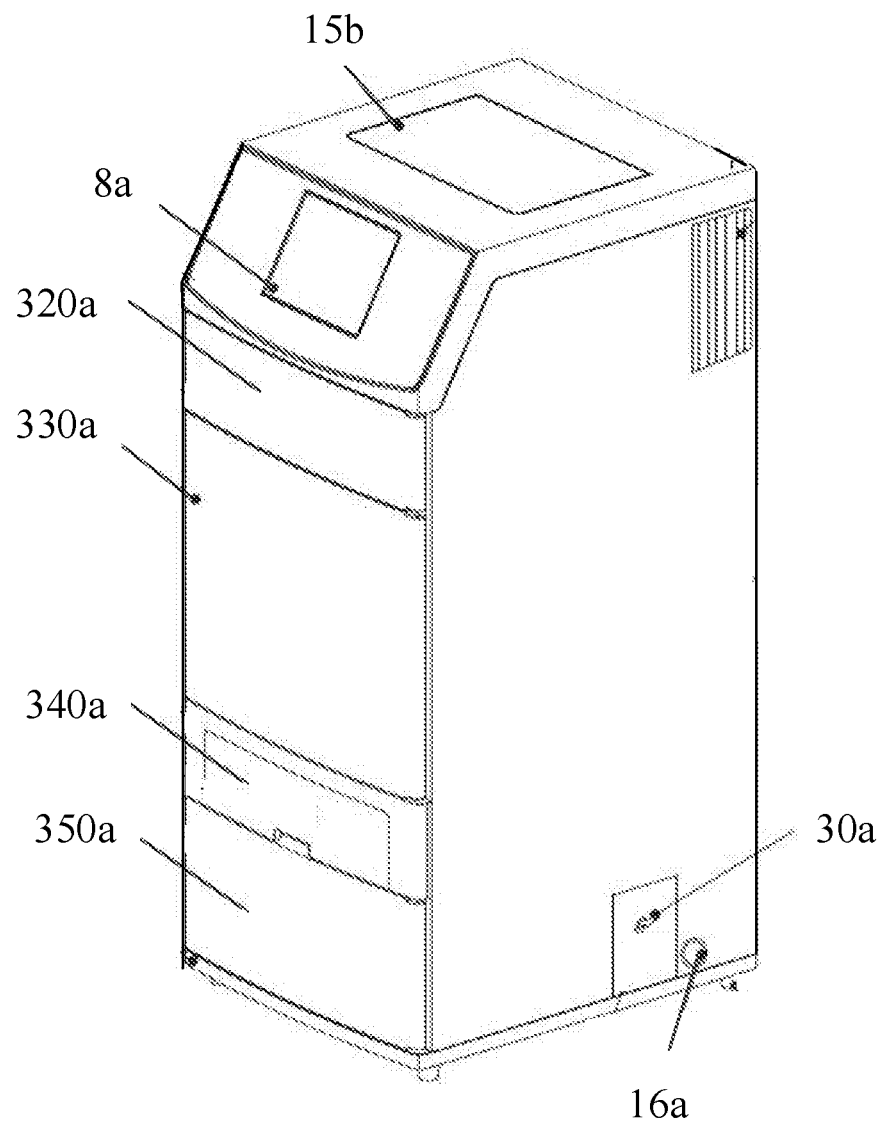
FIG. 24 is a perspective view of an intelligent cooking machine according to an embodiment of the present invention.
Figure 25:
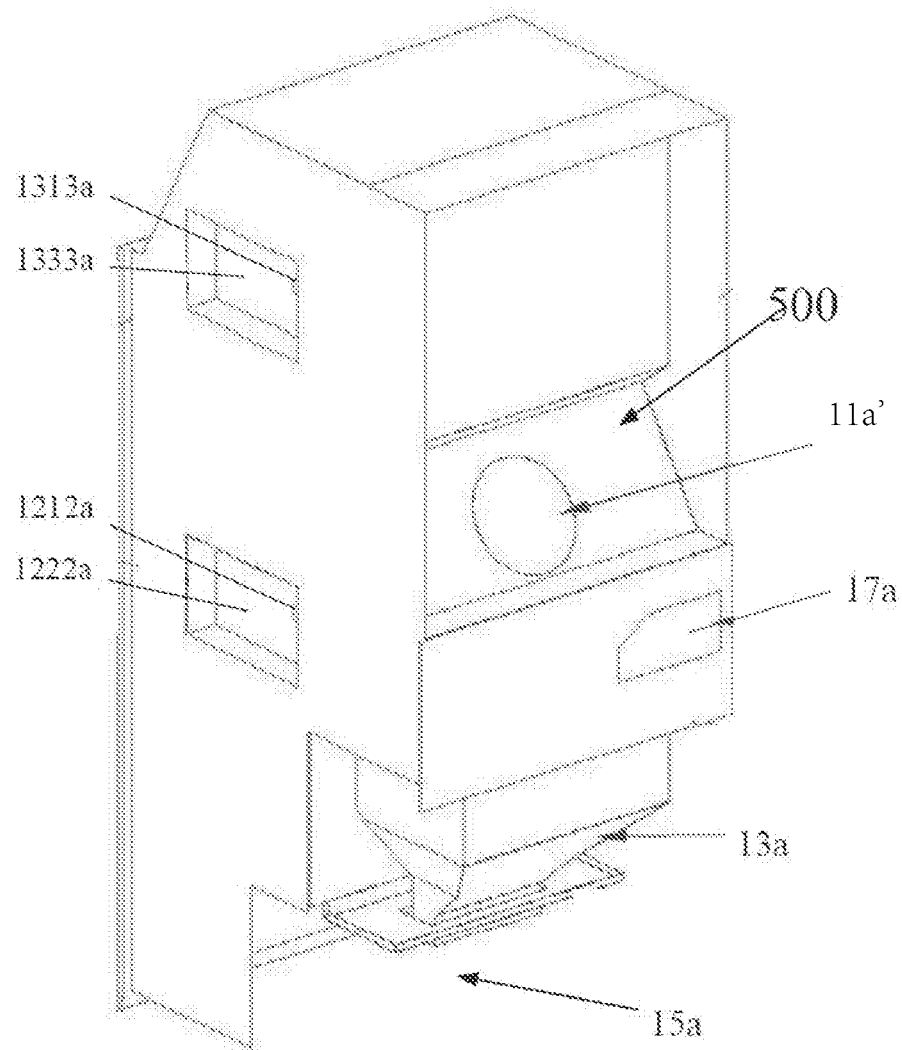
FIG. 25 is a rear view of the inner shell shown in FIG. 3.

In the embodiment of the present invention described above, further referring to FIG. 24, a cleaning opening is formed in the outer shell 1a close to the draining area 15a, and an openable-and-closable cleaning door 30a is arranged at the cleaning opening. Thus, when each component in the draining device 13a is required to be cleaned, the cleaning door 30a can be opened to clean the corresponding component, and at the same time, the cleaning door 30a can also be opened to repair and replace the corresponding component in the draining device 13a.

In the embodiment of the present invention described above, further referring to FIGS. 24 and 26, a top cover opening is formed in the same position of the top portion of the inner shell 2a and the top portion of the outer shell 1a, a top cover door plate 15b capable of being opened and closed is arranged at the top cover opening, and when the interior of the automatic cooking machine needs to be repaired, the top cover door plate 15b can be opened for such repairing; one side of the inner shell 2a is sequentially provided with an ingredient container guiding opening 32a, an observation opening 33a, a dish discharging outlet 34a and a seasoning inlet 35a from top to bottom, and the same side of the outer shell 1a is in opening shape and is sequentially provided with an openable-and-closable ingredient feeding door 320a, an openable-and-closable observation door 330a, an openable-and-closable dish discharging door 340a and an openable-and-closable seasoning door 350a. The ingredient feeding door 320a is used for closing and sealing the ingredient container guiding opening 32a, the observation door 330a is used for closing and sealing the observation opening 33a, the dish discharging door 340a is used for closing and sealing the dish discharging outlet 34a, and the seasoning door 350a is used for closing and sealing the seasoning inlet 35a. It needs to be noted that the openable-and-closable ingredient feeding door 320a, the openable-and-closable observation door 330a, the openable-and-closable dish discharging door 340a and the openable-and-closable seasoning door 350a can be integrally formed into a main door plate 1111a as shown in FIG. 26.

It can be understood that the internal working space of an intelligent cooking machine is a high-temperature, high-humidity and high-acidity-alkalinity environment, the working structure and electrical components which are matched with the internal working space of an intelligent cooking machine are difficult to work effectively for a long time under such environment, in addition, food safety, sanitation and environmental protection are involved in the internal working space of an intelligent cooking machine, but according to the embodiment of the present invention, a closed cooking machine working space (cooking cavity) is constructed in the inner shell 2a, main cooking equipment in contact with food materials is placed in the closed space of the cooking cavity to achieve the main cooking function such as feeding, cooking, heating and dish discharging, and the spraying piece is arranged in the cooking cavity to wash the cooking devices; and meanwhile, accessory cooking equipment (including an electric appliance, a circuit, a power supply, a transmission line, a pipeline components that cooperated with the main cooking equipment to work) for assisting the main cooking equipment in realizing a cooking function is arranged outside the cooking cavity.

FIGS. 26-27 show specific structures of the cooking cavity 100 of the present embodiment. A feeding area for containing the ingredient feeding device, a cooking area for containing the wok device and a dish discharging area for containing the dish discharging device are sequentially arranged in the cooking cavity 100 from top to bottom. The interior of the cooking cavity 100 can be divided into the multiple areas by partition plates, and the interior of the cooking cavity 100 is divided into the different functional areas by the partition plates, so that devices with different functions applied to the cooking process can be distributed in order and do not interfere with one another, and maintenance of all the devices is facilitated. According to the embodiment, the feeding area, the cooking area and the dish discharging area are preferably arranged to communicate with one another, that is, no partition plate exists among the feeding area, the cooking area and the dish discharging area, so that the feeding device, the wok device and the dish discharging device can perform in a matched mode, the cooking processes of feeding, cooking and dish discharging are automatic and orderly, and thus the cooking efficiency and effect are effectively improved, the internal structure of the cooking cavity can be simplified, the space size of the cooking cavity is effectively reduced, and therefore miniaturization of the cooking machine is achieved. The feeding area is arranged at the upper part in the cooking cavity 100, the cooking area is arranged at the middle part in the cooking cavity 100, and the dish discharging area is arranged at the lower part in the cooking cavity 100. The cooking cavity 100 is applied in the interior of the cooking machine so as to accommodate the feeding device, the wok device, the dish discharging device and the washing devices thereof, so that the working processes of feeding, cooking, dish discharging, washing and the like can be achieved in the closed cooking cavity, and the food safety and sanitation are ensured. In the processes described above, cooking fume generated by the cooking machine can be limited in the cooking cavity and purified by the cooking fume treatment device outside the cavity, and pollution caused by the fact that the cooking fume is leaked to the environment outside the structure is reduced. The side portion of the inner shell 2a provided with the ingredient container guiding opening 32a, the observation opening 33a, the dish discharging 34a and the seasoning inlet 35a is provided with a main door plate 1111a capable of being opened and closed, and the juncture of the main door plate 1111a and the inner shell 2a is provided with a self-suction type sealing strip so as to avoid leakage of cooking fume and water vapor. When feeding of dish discharging is required, a user can open the main door plate 1111a, a feeding or dish discharging operation is performed from the ingredient container guiding opening 32a or the observation opening 33a, the dish discharging outlet 34a, and after the feeding or dish discharging operation is completed, the main door plate 1111a is closed to enable the cooking cavity to be in a closed state. The ingredient feeding device 2 comprises an ingredient-containing chamber with a flipping mechanism, and the flipping mechanism comprises ingredient-containing chamber supporting frames located on the two side parts of the ingredient-containing chamber. The inner shell 2a is provided with installing holes 1313a and installing positions 1333a in the feeding area, the installing holes 1313a are used for installing a flipping mechanism for controlling the turning of the ingredient feeding device, the installing positions 1333a are used for respectively accommodating a working position detection device 12b for detecting the working position of the ingredient feeding device and a driving motor 11b of the flipping mechanism 11a, and the installing hole utilizes sealing ring to enhance the sealing effect. The two sides, located in the cooking area, of the inner shell 2a are each provided with an installation hole 1212a and an installation position 1222a in the cooking area, the installation holes 1212a are used for installing a wok working position controlling device for controlling the wok to be turned, the installation positions 1222a are used for containing a wok working position conversion motor 6b and a wok working position detection device 7b respectively, and the sealing effect of the installation holes is enhanced with sealing rings. According to the structure provided by the embodiment, a closed cooking area is formed by utilizing the inner shell, the sealing effect is enhanced with the sealing ring, and the interior of the cooking cavity is sequentially provided with a plurality of functional areas, so that the whole cooking process is orderly and the space is fully utilized, and the volume of the cooking area is greatly reduced. Due to the reasonable distribution of the functional areas, when the structure is applied to the automatic cooking equipment, the automation performance can be fully realized, the whole cooking process is highly automatic, and the labor investment is saved.

Embodiment 2

Figure 39:
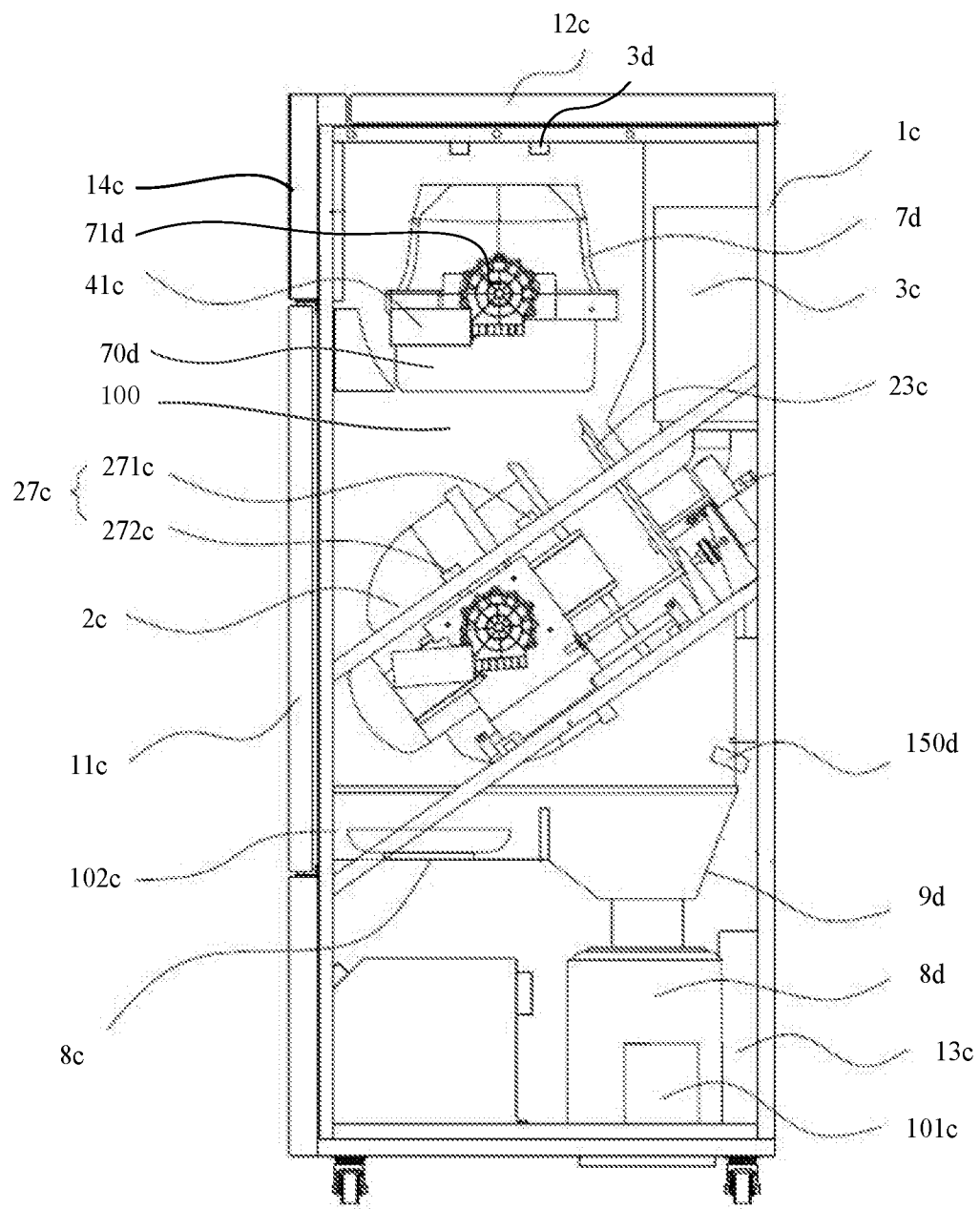
FIG. 39 is a schematic diagram of the overall structure of a cooking machine capable of achieving full-closed cooking provided by the second embodiment of the present invention.
Figure 40:
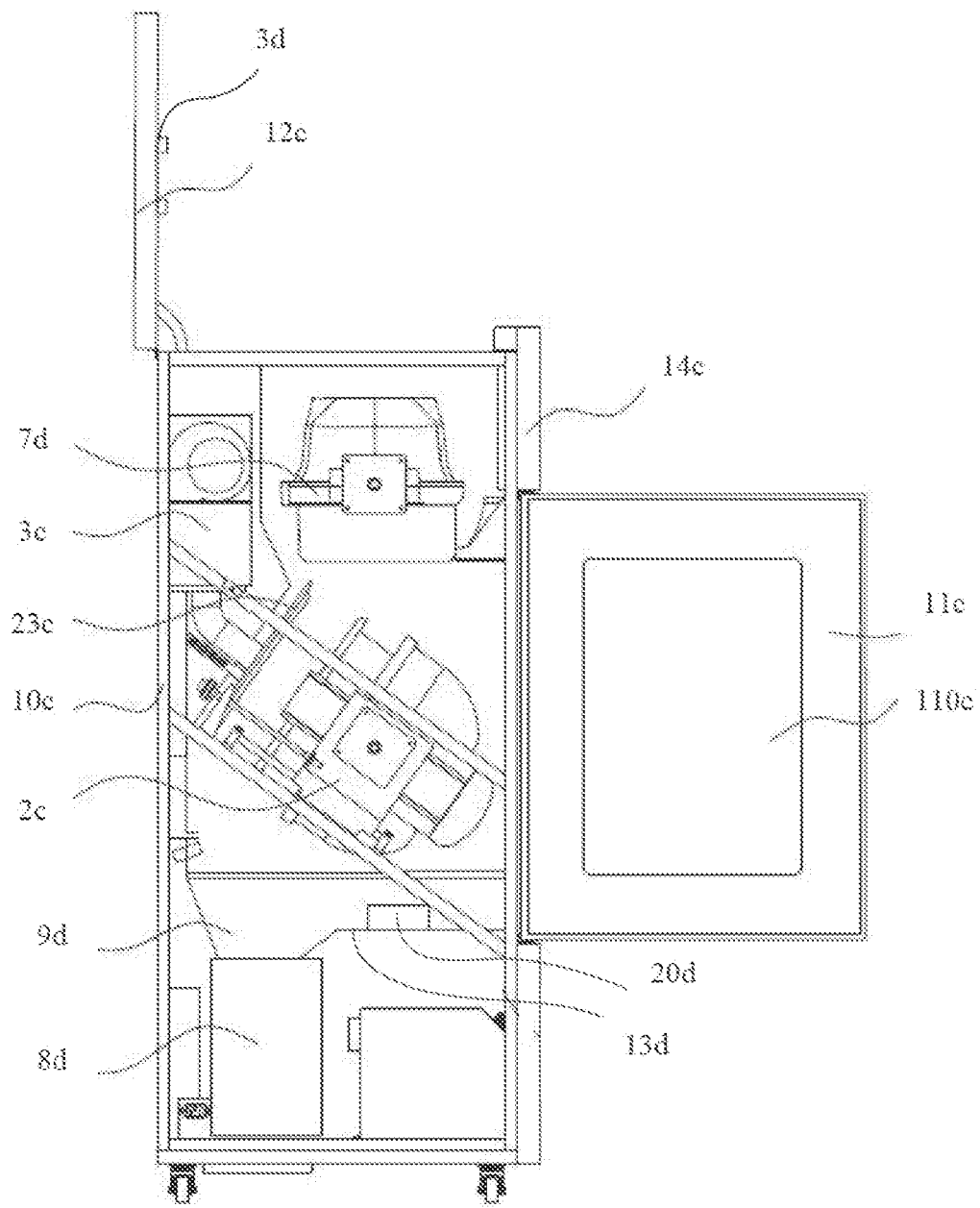
FIG. 40 is a state schematic view of the door plate and the top cover plate of the cooking machine shown in FIG. 39 in an open state.
Figure 41:
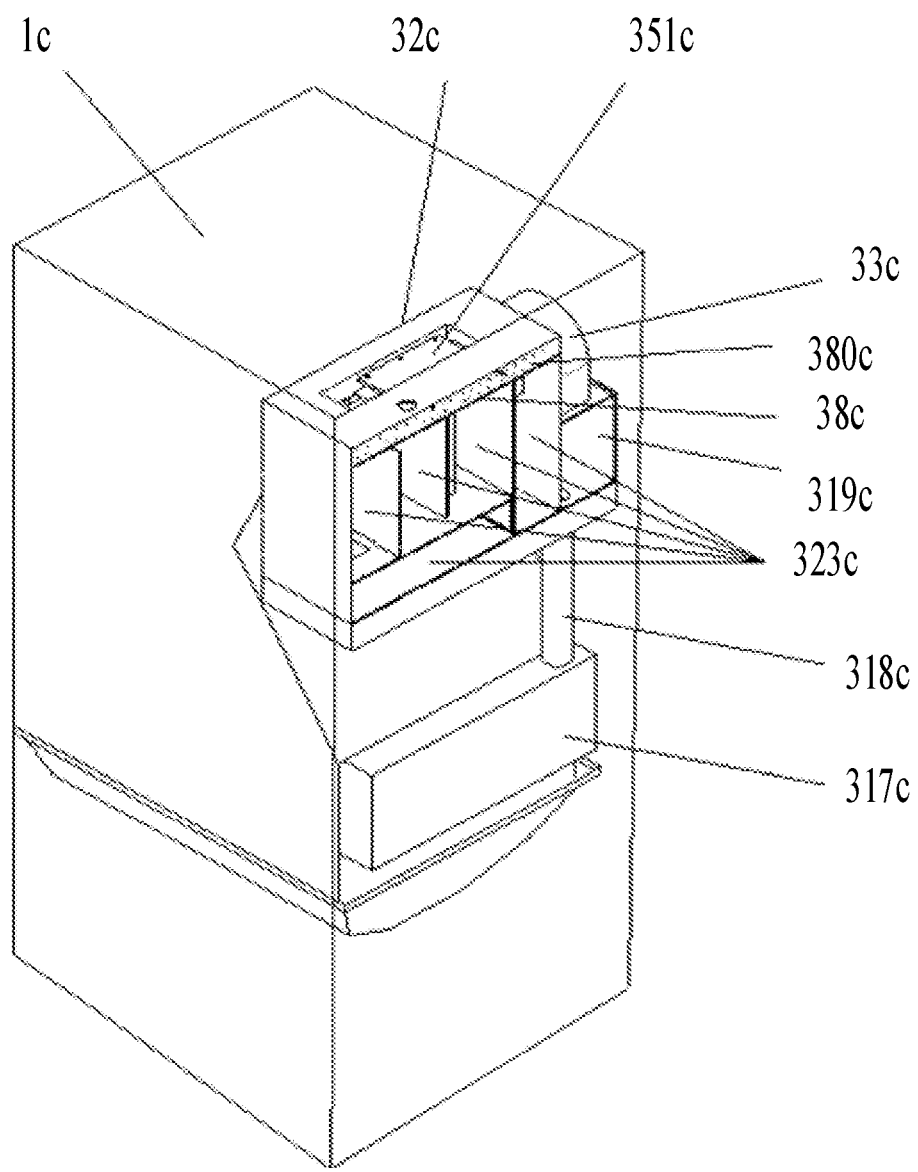
FIG. 41 is a partial structure schematic diagram of the cooking machine capable of achieving full-closed cooking provided by the second embodiment of the present invention.

Referring to FIGS. 39 and 40, the embodiment of the present invention provides an automatic cooking machine capable of realizing full-closed cooking, which comprises a shell (comprising an outer shell 1c and an inner shell 1d arranged inside the outer shell), a cooking fume treatment device 3c, a wok mechanism, a control device 13c and a human-machine operation interface 14c. The wok mechanism comprises a wok 20c, a furnace body device 24c, a wok rotating device 25c and a wok working position controlling device 21c which are arranged in the inner shell 1d, and a wok moving control device 22c which is arranged between the inner shell 1d and the outer shell 1c; the furnace body device 24c is used for supporting and heating the wok 20c; the wok rotating device 25c is used for controlling the wok 20c to rotate around a central axis of the wok 1 so as to cook; the wok working position controlling device 21c is used for controlling the wok 20c to turn so as to enable the wok 20c to reach a corresponding working position for corresponding operation; and the wok moving control device 22c is used for controlling the wok (specifically by the furnace body device) to move directionally in the inner shell 1d so as to drive the wok 20c to move directionally in the inner shell 1d. A cooking fume inlet 321c of the cooking fume treatment device 3c is communicated with the interior of the inner shell 1d, and a cooking fume outlet 322c of the cooking fume treatment device 3c can be communicated with the exterior of the outer shell 1c and can also be communicated with the interior of the inner shell 1d. The human-machine operation interface 14c is provided on an outer side of the outer shell 1c (e.g. may be provided on a top portion or a side portion outside the outer shell 1c). The human-machine operation interface 14c, the furnace body device 24c, the wok rotating device 25c, the wok working position controlling device 21c and the wok moving control device 22c are electrically connected with the control device 13c so as to receive control commands sent by the control device 13c according to a preset recipe program and perform corresponding operations according to the control commands.

In the embodiment of the present invention, in order to improve the air tightness of the shell and prevent the cooking fume in the shell from being directly discharged out of the shell, a cooking cavity 100 which is arranged in a sealed manner is formed in the inner shell 1d, and the whole wok mechanism (except the wok moving control device 22c) is arranged in the cooking cavity 100, so that cooking fume generated by the wok 20c can be gathered in the cooking cavity 100.

Figure 42:
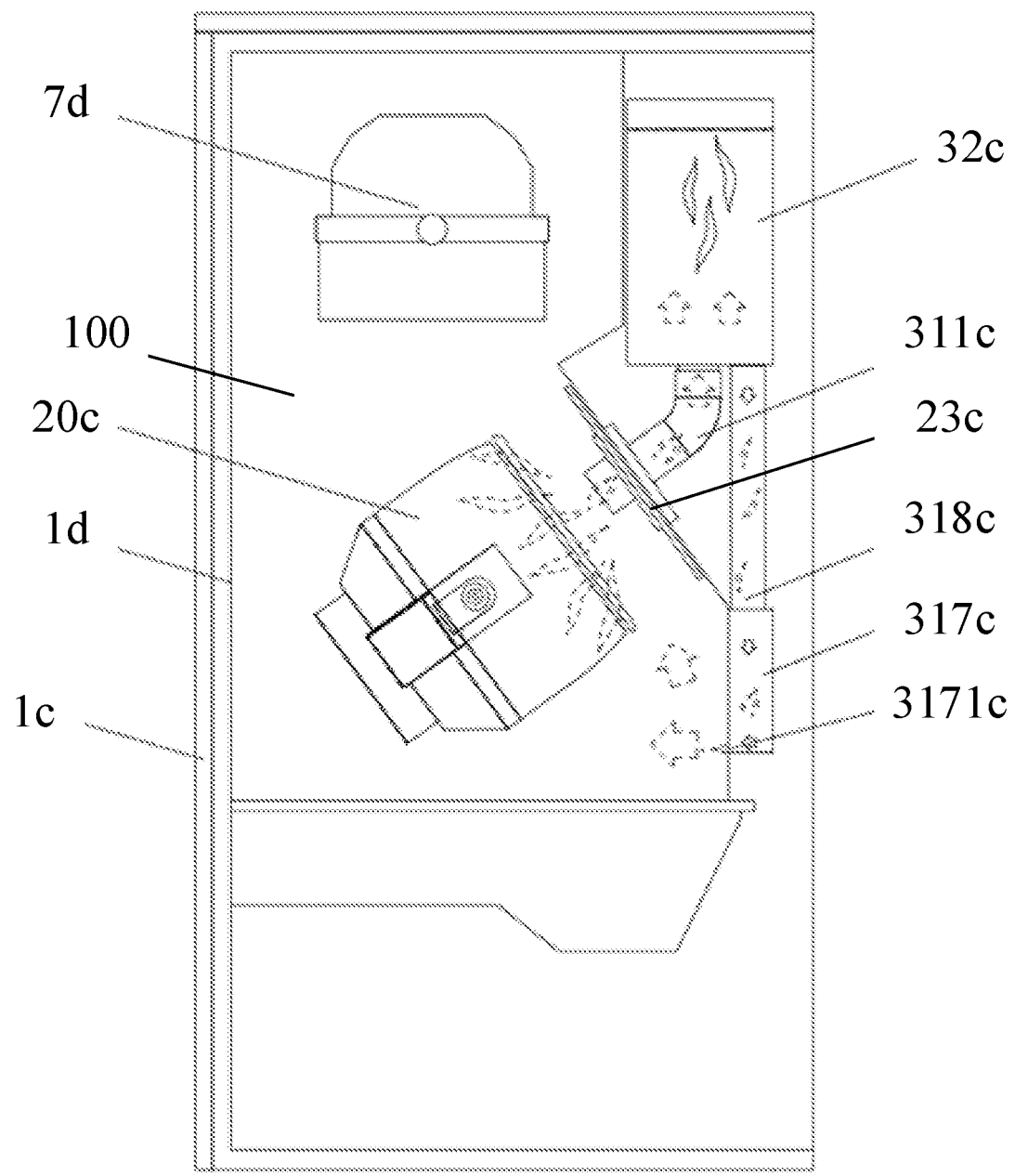
FIG. 42 is a right side view of a partial structure of the cooking machine capable of achieving full-closed cooking according to the second embodiment of the present invention.

Referring to FIGS. 39 and 42, the cooking machine further comprises a cooking fume inlet pipe 311c and a wok lid 23c which is fixed in the inner shell 1d and used for being matched with an opening of the wok 20c; one end of the cooking fume inlet pipe 311c is connected with an opening (exhaust port) penetrating through the wok lid 23c, and the other end of the cooking fume inlet pipe 311c penetrates through the cooking fume inlet 321c in a sealed manner and is communicated with the interior of the cooking fume treatment device 3c; the cooking fume outlet 322c of the cooking fume treatment device 3c is communicated with the interior of the inner shell 1d (and the interior of the closed cooking cavity).

Specifically, the exhaust port (not shown) penetrates through the center of the wok lid 23c, and the wok lid 23c is rotatably connected with one end of the cooking fume inlet pipe 311c, so that the wok lid 23c can rotate around the cooking fume inlet pipe 311c. The moving direction of the wok 20c is parallel to the central axis of the wok lid 23c; when the wok 20c is turned to a cooking position, the opening of the wok 20c faces the wok lid 23c, and the central axis of the wok 20c coincides with the central axis of the wok lid 23c. Therefore, when cooking is needed, the wok 20c is turned to a cooking working position by the wok working position controlling device 21c, the opening of the wok 20c faces the wok lid 23c, then the wok 20c is moved by the wok moving control device 22c to enable the wok lid 23c to cover the opening of the wok 20c, and then the wok 20c is controlled to rotate by the wok rotating device 25c to perform cooking operation, so that in the cooking process, cooking fume generated in the wok 20c can enter the cooking fume treatment device 3c from the cooking fume inlet pipe 311c in a centralized mode. After the cooking operation is completed, the wok 20c needs to be opened, and the wok 20c is moved by the wok moving control device 22c, so that the wok lid 23c is separated from the wok 20c.

The wok lid 23c comprises a wok lid plate and a wok lid sealing container (not shown); the wok lid sealing container comprises a fixing part installed on the wok lid plate and a sealing strip which can be arranged on the periphery of the fixing part in a relatively rotating and sleeving mode. An area enclosed by the sealing strip is matched with the opening of the wok in size and shape. Therefore, when the wok lid 23c seals the opening of the wok 20c with the sealing strip and the wok rotates, the sealing strip rotates along with the wok, so that the resistance of the wok as it rotates is reduced.

The exhaust port communicated with the cooking fume treatment device 3c is formed in the wok lid plate; the fixed part is provided with a first communication opening communicated with the cooking fume channel opening; the wok lid plate is provided with an seasoning adding opening communicated with an automatic seasoning adding device of the cooking machine; the fixing part is provided with a second communication opening communicated with the seasoning adding opening.

As a deformation embodiment, the wok lid plate is provided with a common channel opening; the common channel opening is communicated with the cooking fume treatment device 3c and the automatic seasoning adding device of the cooking machine; the fixing part is provided with a common communication opening communicated with the common channel opening. That is, the cooking fume channel opening and the seasoning adding opening are achieved through the common channel opening at the same time, and seasoning adding or cooking fume extracting can be performed through the common channel opening. Preferably, the fixing part is detachably installed on the wok lid plate.

Therefore, according to the cooking fume treatment system provided by the embodiment of the present invention, the closed cooking cavity 100 is formed in the inner cavity of the inner shell 1d, the wok mechanism (comprising the wok and the wok lid) is arranged in the closed cooking cavity 100, and the wok is closed by the wok lid during cooking, so that a first-layer of closed cooking space is formed in the inner cavity of the wok, and cooking fume generated by the wok 20c during closed cooking is discharged to a cooking fume treatment device 3c from the exhaust port of the wok lid 23c for treatment; in addition, under a second-layer of sealed cooking space of the sealed cooking cavity 100, even if the cooking fume escaping from the wok 20c in the cooking process is limited in the cooking cavity, the cooking fume is purified by the cooking fume treatment device (for example, after the wok 20c is separated from the wok lid 23c, the cooking fume is discharged from an exhaust port of the wok lid 23c) and then is discharged, so that the situation that cooking fume generated in the cooking process is directly exhausted outwards to pollute the surrounding environment is avoided.

For ease of understanding, the structure of the cooking fume treatment device 3c is described in detail below with reference to FIGS. 41-48:

Preferably, referring to FIGS. 41-48, the cooking fume treatment device 3c is arranged between the outer shell 1c and the inner shell 1d, and the cooking fume treatment device 3c comprises a box body 32c, a fan 33c, a cooking fume filtering assembly 34c, a micro refrigerator 35c, a water circulation pipeline 36c and a water pump 37c. Specifically, the box body 32c is provided with a water adding opening 320c, a cooking fume inlet 321c and a cooking fume outlet 322c, an cooking fume channel 323c communicating the cooking fume inlet 321c with the cooking fume outlet 322c is formed in the box body 32c, and the cooking fume inlet 321c and the cooking fume outlet 322c communicate with the cooking cavity 100. The fan 33c is used for drawing cooking fume into the box body 32c from the cooking fume inlet 321c and exhausting the cooking fume from the cooking fume outlet 322c. The cooking fume filtering assembly 34c is arranged in the cooking fume channel 323c. The micro refrigerator 35c is preferably a semiconductor refrigerator, and at least one refrigeration sheet 350c of the micro refrigerator 35c is arranged in the cooking fume channel 323c; at least one first water outlet 360c of the water circulation pipeline 36c is positioned at the upper part in the box body 32c and is positioned right above the cooking fume channel 323c, and at least one first water inlet 361c of the water circulation pipeline 36c is positioned at the lower part in the box body 32c; the water pump 37c is arranged in the water circulation pipeline 36c. The fan 33c, the micro refrigerator 35c and the water pump 37c are electrically connected with the control device 13c so as to receive control commands sent by the control device 13c according to a preset recipe program and perform corresponding operations according to the control commands.

The working principle of the cooking fume treatment device 3c provide by the embodiment of the invention is as follows: in the cooking process of the cooking machine, cooking fume can be continuously generated in an inner cavity of the wok in the cooking cavity 100. Under the pressurization blowing effect of the fan 33c, the cooking fume in the inner cavity of the wok can enter the cooking fume channel 323c from the cooking fume inlet 321c and then can be filtered by the cooking fume filtering assembly 34c. In this process, the temperature of the cooking fume channel 323c can be reduced when the refrigeration sheet 350c of the micro refrigerator 35c works, so that cooking fume entering the cooking fume channel 323c is condensed, and the cooking fume filtering assembly 34c can better filter the cooking fume. Under the action of the water pump 37c, the water circulation pipeline 36c continuously sprays water to the cooking fume filtering assembly 34c located in the cooking fume channel 323c from the first water outlet 360c, so that the temperature in the cooking fume channel 323c is further reduced, the cooking fume can be effectively condensed, and the cooking fume filtering assembly 34c can be used for better filtering the cooking fume. The water falling to the bottom in the box body 32c can enter the water circulation pipeline 36c again under the action of the water pump 37c. In addition, due to the fact that the cooking fume inlet 321c and the cooking fume outlet 322c are both communicated with the cooking cavity 100 arranged in the sealed manner, after the cooking fume in the wok enters the box body 32c from the cooking fume inlet 321c for cooking fume treatment, residual cooking fume enters the cooking cavity 100 from the cooking fume outlet 322c again. In the cooking process, the cooking fume gas escaping out of the wok and the cooking fume gas entering the cooking cavity 100 from the cooking fume outlet 322c of the cooking fume treatment device 3c continue to enter the box body 32c from the cooking fume inlet 321c to be subjected to cooking fume treatment, and the process is continuously repeated; therefor, the cooking fume in the cooking cavity 100 can be effectively treated without being discharged to the outside, and zero emission of the cooking fume is achieved.

It will be appreciated that micro refrigerator 35 can be other existing micro refrigerating devices, and the details are not described herein.

Figure 44:
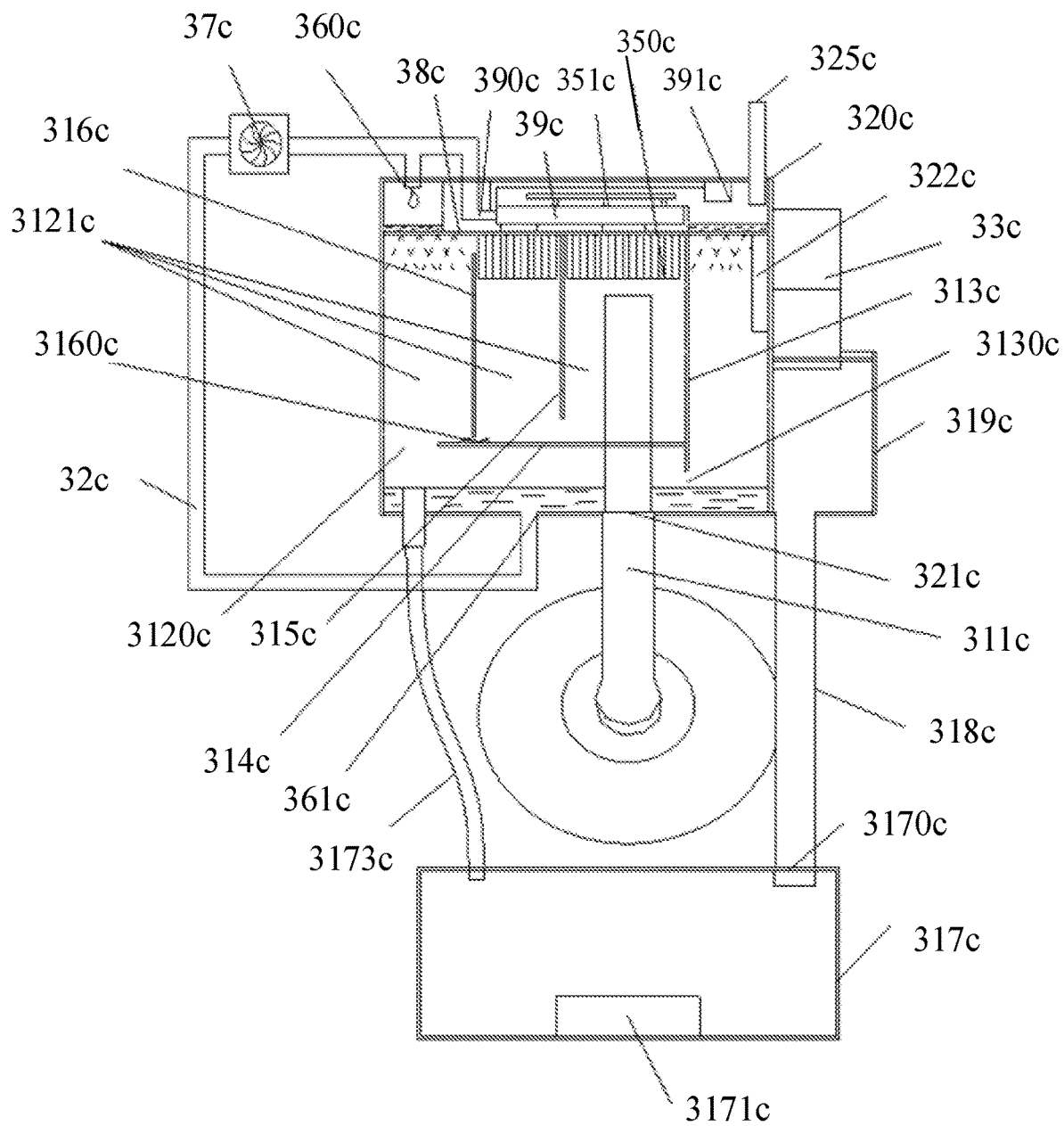
FIG. 44 is a structural schematic view of the cooking fume treatment device shown in FIG. 39.

It should be noted that referring to FIG. 44, when the water in the box body 32c and the water circulation pipeline 36c is insufficient, water can be added to the box body 32c from the water adding opening 320c. Preferably, referring to FIG. 44, the water adding opening 320c is formed in the top of the box body 32c, a water adding pipe 325c penetrates through the water adding opening 320c in a sealed manner, one end of the water adding pipe 325c penetrates into the box body 32c, and therefore water can be added into the box body 32c from the water adding pipe 325c. Exemplarily, the water adding pipe 325c can be communicated with an external water source, a water pipe valve (not shown) can be arranged in the water adding pipe 325c, and when water needs to be added into the box body 32c, the water pipe valve can be controlled to be opened. It can be understood that cooking fume cleaning liquid can be added into the box body 32c from the water adding opening 320c, so that the cooking fume cleaning liquid added into the box body 32c can be mixed with water in the box body 32c, and then the mixture is conveyed to the first water outlet 360c from the water circulation pipeline 36c and continuously sprayed to the cooking fume filtering assembly 34c below the first water outlet 360c so as to clean the cooking fume filtering assembly 34c, thus the cooking fume filtering assembly 34c does not need to be replaced frequently.

Figure 47:
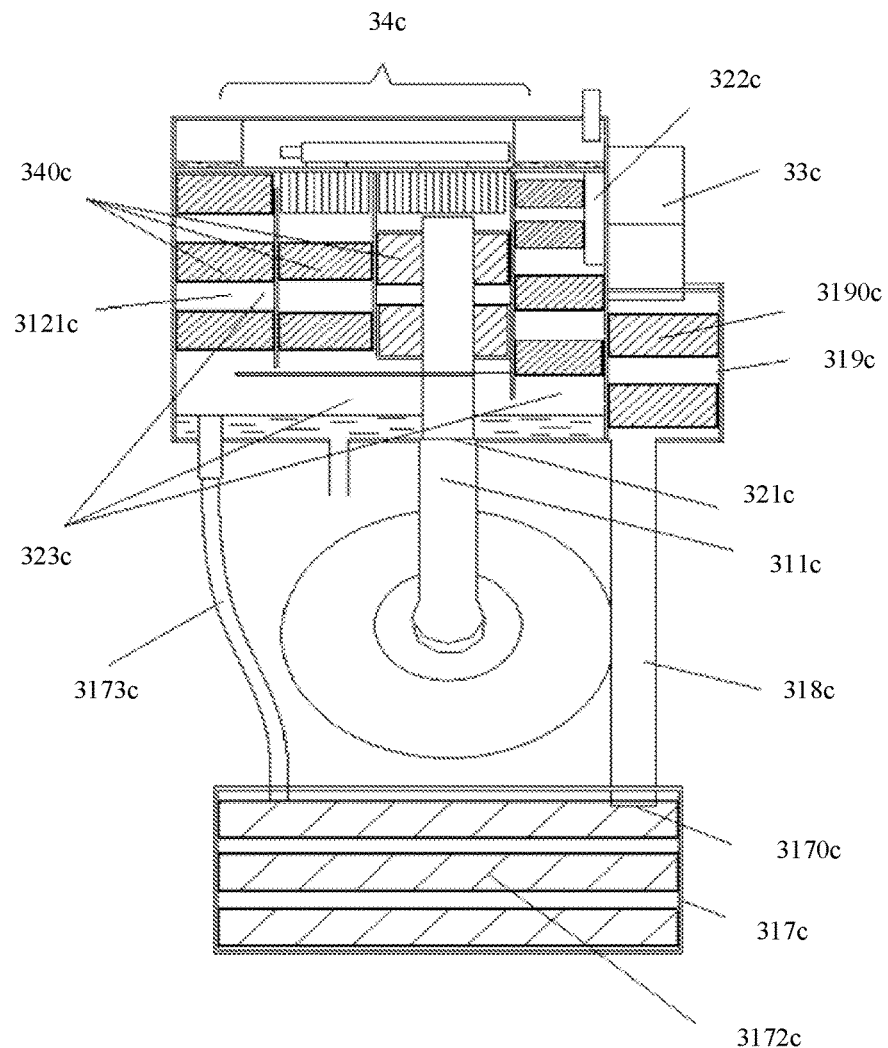
FIG. 47 is a schematic view of the cooking fume treatment device shown in FIG. 39 in a state in which a cooking fume filter layer is installed.
Figure 48:
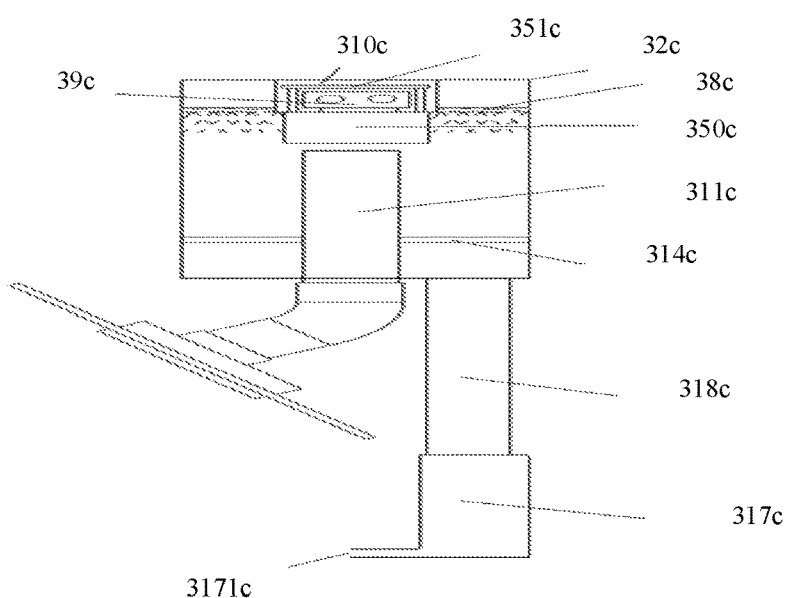
FIG. 48 is a side view of a partial structure of the cooking fume treatment device shown in FIG. 39.
Figure 49:
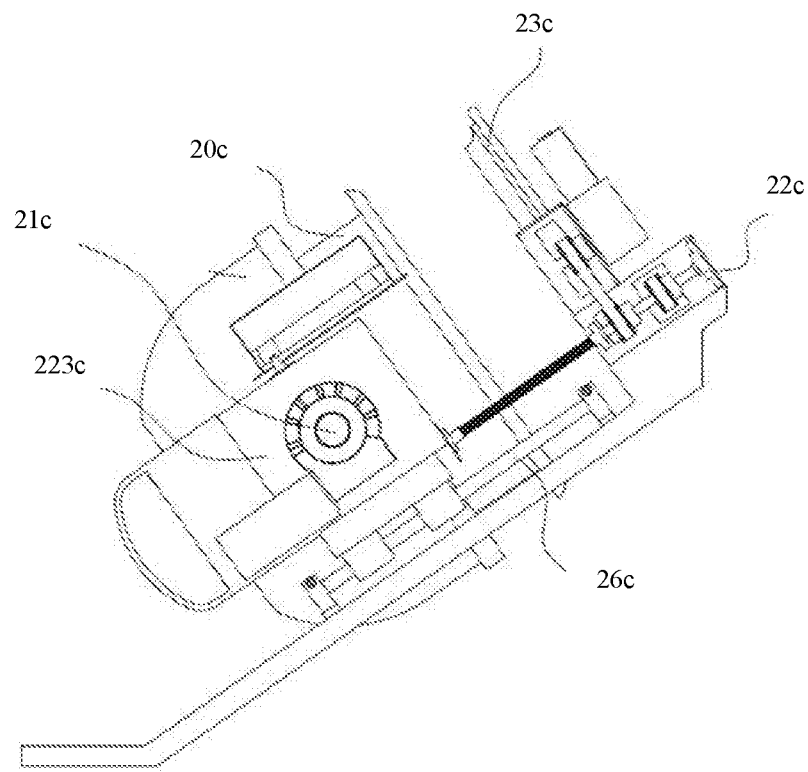
FIG. 49 is a schematic view of the overall structure of the wok device shown in FIG. 39.
Figure 50:
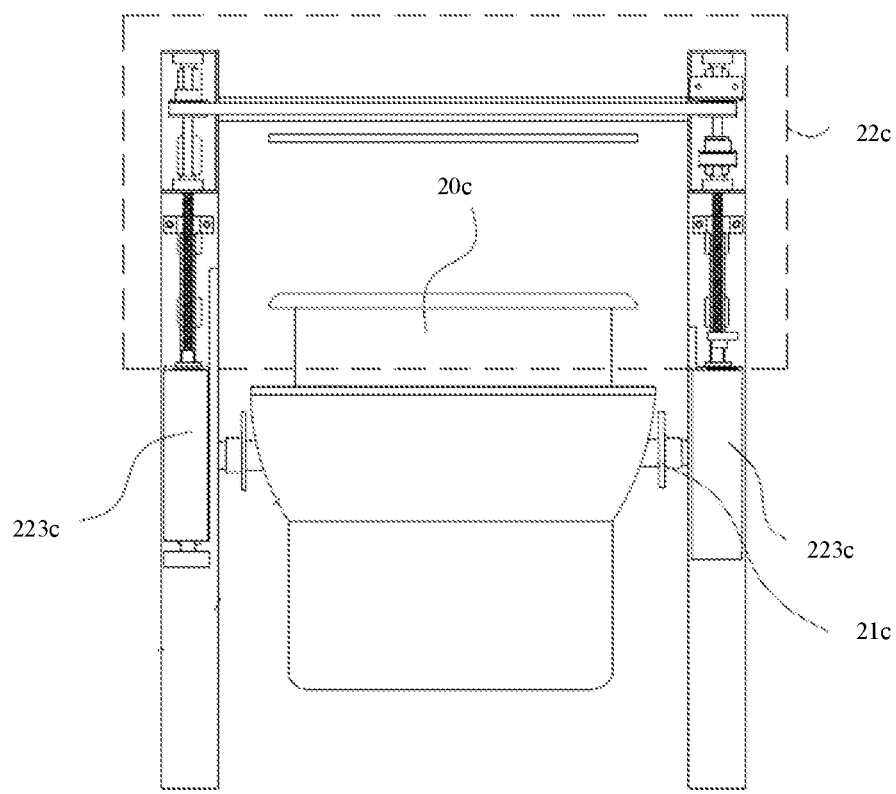
FIG. 50 is a side view of the wok moving control device shown in FIG. 49.

Illustratively, in an embodiment of the present invention, referring to FIG. 47, the cooking fume filter assembly 34c may preferably has a plurality of cooking fume filtering layers 340c disposed within the cooking fume channel 323c.

Figure 45:
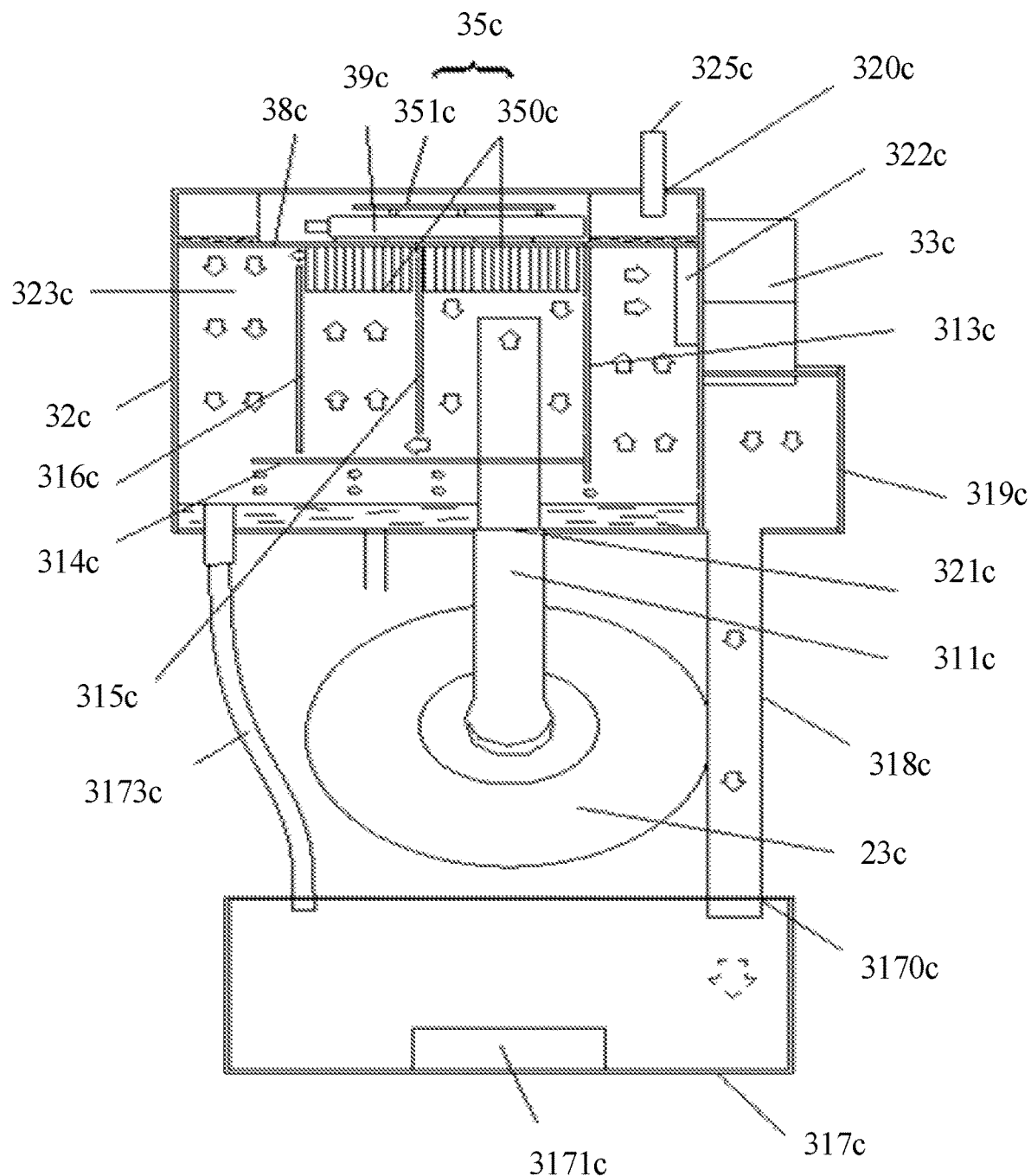
FIG. 45 is a schematic view of the cooking fume flow direction of the cooking fume treatment device shown in FIG. 39.
Figure 46:
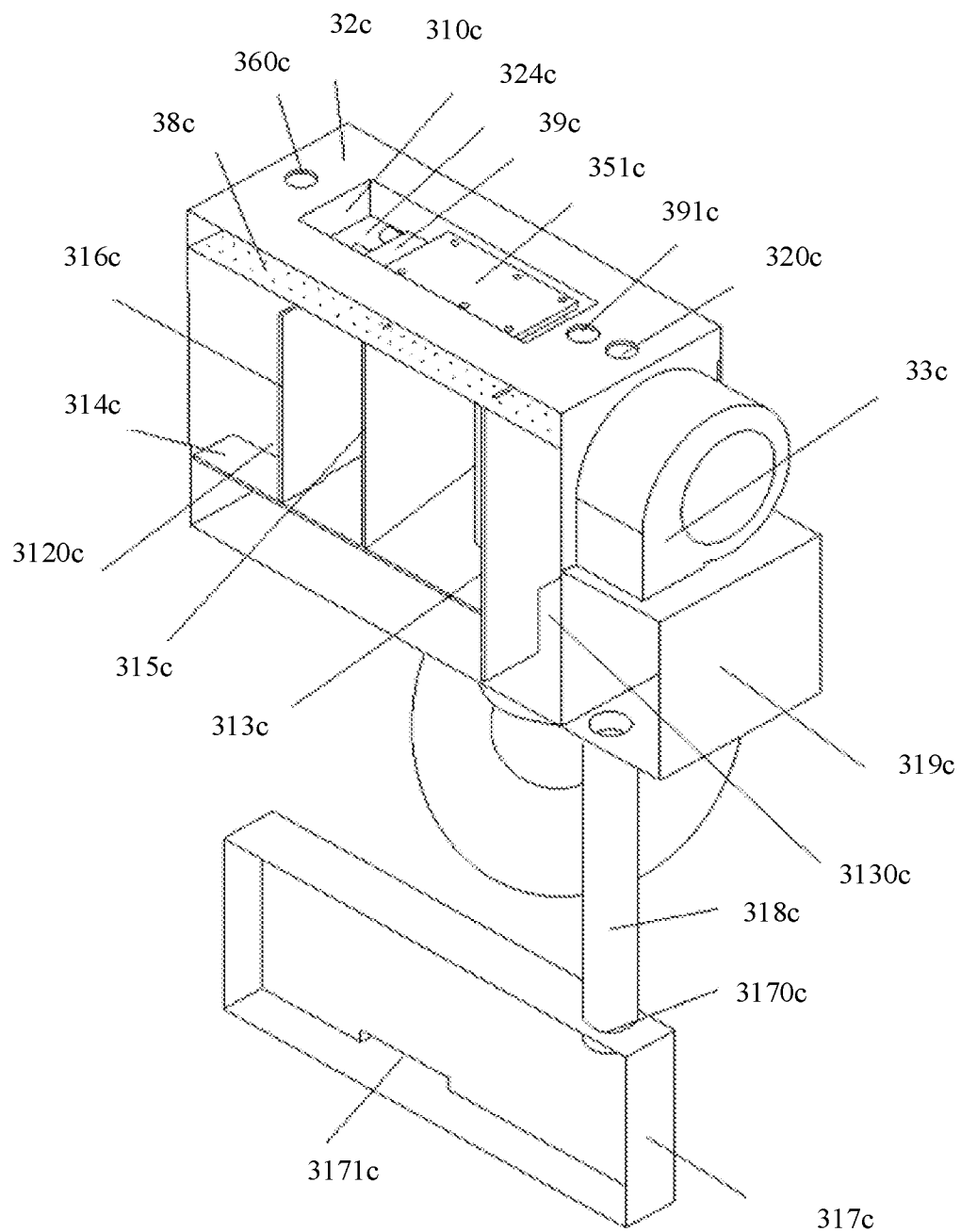
FIG. 46 is a partial cross-sectional view of the cooking fume treatment device shown in FIG. 39.

In an embodiment of the present invention, preferably, referring to FIGS. 44-46, the cooking fume treatment device 3c further comprises a spraying plate 38c provided with a plurality of spraying holes 380c, and the spraying plate 38c is arranged between the cooking fume channel 323c and the top in the box body 32c at intervals so as to separate the cooking fume channel 323c from the top in the box body 32c; the at least one first water outlet 360c is positioned above the spraying plate 38c, so that water sprayed from the first water outlet 360c can fall onto the spraying plate 38c and then dispersedly fall into the cooking fume channel 323c from the plurality of spraying holes 380c of the spraying plate 38c, thereby achieving the effect of uniform spraying. Therefore, by arranging the spraying plate 38c, water sprayed from the first water outlet 360c can be uniformly sprayed into the cooking fume channel 323c, so that the cooking fume channel 323c can be cooled more effectively.

Illustratively, referring to FIGS. 44-46, the cooking fume treatment device 3c further comprises a cooling body 39c of a hollow structure, a second water inlet 390c of the cooling body 39c is communicated with a water outlet pipe section of the water circulation pipeline 36c, a second water outlet 391c of the cooling body 39c is located above the spraying plate 38c, and a second water outlet 391c of the cooling body 39c is located below the spraying plate 38c, so that water in the water outlet pipe section of the water circulation pipeline 36c can flow into the cooling body 39c from the second water inlet 390c and then be sprayed onto the spraying plate 38c from the second water outlet 391c. In order to enable the cooling body 39c to cool the heat conduction part 351c of the micro refrigerator 35c, the cooling body 39c is in contact with the heat conduction part 351c of the micro refrigerator 35c, so that cold water continuously flowing into the cooling body 39c can continuously take away heat of the heat conduction part 351c to enable the heat conduction part 351c to be cooled, thereby enabling the micro refrigerator 35c to better perform refrigeration work. It should be noted that the cooling body 39c may be of a box structure or a bent pipeline structure or the like, which is not specifically limited herein.

In the embodiment of the present invention, further referring to FIG. 46, when the micro refrigerator 35c is located in the box body 32c, in order to enable the micro refrigerator 35c to effectively dissipate heat, a heat dissipation opening 324c is formed in the top of the box body 32c, a containing cavity 310c communicated with the heat dissipation opening 324c is formed above the spraying plate 38c, the heat conduction part 351c of the micro refrigerator 35c and the cooling body 39c are both arranged in the containing cavity 310c, and therefore heat generated by the heat conduction part 351c of the micro refrigerator 35c can be discharged out from the heat dissipation opening 324c. The containing cavity 310c is only communicated with the heat dissipation opening 324c, so that heat generated by the heat conduction part 351c can only be discharged from the heat dissipation opening 324 and cannot enter the cooking fume channel 323c. It should be noted that the containing cavity 310c may be a hollow cubic structure or a hollow cylindrical structure or the like, which is not specifically limited herein.

Figure 43:
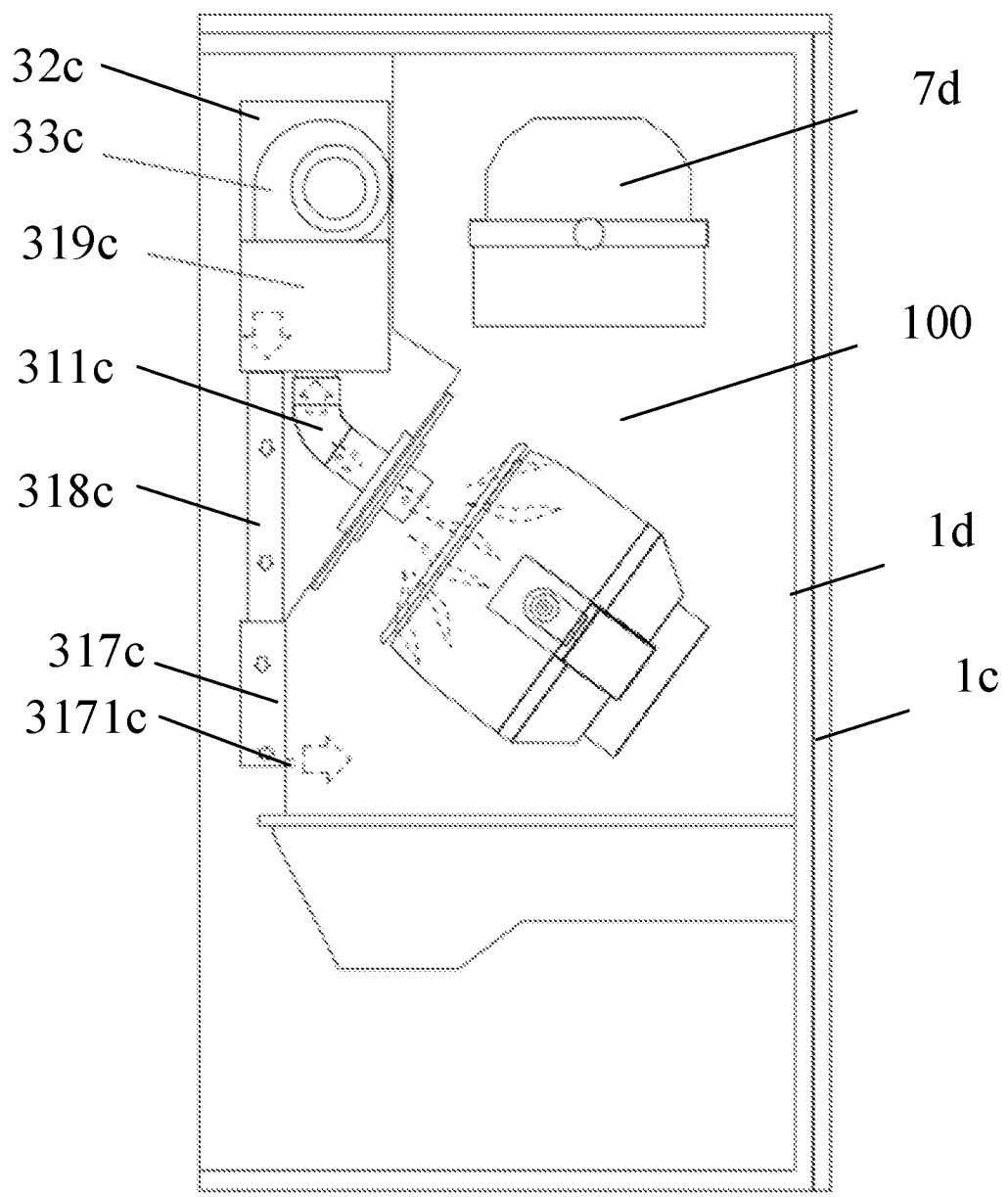
FIG. 43 is a left side view of a partial structure of the cooking machine capable of achieving full-closed cooking according to the second embodiment of the present invention.

In the embodiment of the present invention, preferably, referring to FIGS. 42-44, the cooking fume treatment device 3c further comprises a cooking fume inlet pipe 311c (which can be matched with the wok lid 23c mentioned below) and a spraying cavity 312c with an opening in the top, and the top of the spraying cavity 312c is fixed to the bottom of the part, provided with the spraying holes 380c, of the spraying plate 38c; the bottom of the spraying cavity 312c is positioned above the bottom in the box body 32c and is provided with a through opening 3120c; one end of the cooking fume inlet pipe 311c penetrates through the cooking fume inlet 321c in a sealed manner in the direction towards the interior of the box body 32c and penetrates into the spraying cavity 312c in a sealed manner, the other end of the cooking fume inlet pipe 311c penetrates into the cooking cavity 100, and therefore under the action of the fan 33c, the cooking fume in the cooking cavity 100 enters the spraying cavity 312c from the cooking fume inlet pipe 311c, and then the cooking fume enters an area between the box body 32c and the spraying cavity 312c from the through opening 3120c, and is finally discharged from the cooking fume outlet 322c. In the spraying cavity 312c, a cooking fume spraying channel 3121c which is arranged in an extending mode is formed between one end of the cooking fume inlet pipe 311c and the through opening 3120c, so that the path of cooking fume entering the spraying cavity 312c can become longer, and the condensation and filtration of the cooking fume are better facilitated. At least one cooking fume filtering layer 340c is arranged in the cooking fume spraying channel 3121c, and the at least one refrigerating sheet 350c is arranged in the spraying cavity 312c and is distributed right above the cooking fume spraying channel 3121c. In addition, the bottom of each section of the cooking fume spraying channel 3121c is communicated with the through opening 3120c, so that water sprayed into the cooking fume spraying channel 3121c from the spraying holes 380 of the spraying plate 38c can be discharged to the bottom in the box body 32c from the through opening 3120c.

Illustratively, the cooking fume treatment device 3c further comprises a transverse partition plate 314c, a first longitudinal partition plate 313c, a second longitudinal partition plate 315c and a third longitudinal partition plate 316c, all of which are shown in FIGS. 44-46; the first longitudinal partition plate 313c is longitudinally arranged between the spraying plate 38c and the bottom in the box body 32c, so that an area between the spraying plate 38c and the bottom in the box body 32c is divided into two parts, and a cooking fume channel opening 3130c is formed between the bottom of the first longitudinal partition plate 313 and the bottom in the box body 32c. The transverse partition plate 314 is located between the spraying plate 38c and the bottom in the box body 32c and transversely arranged between the first longitudinal partition plate 313c and a side plate, opposite to the first longitudinal partition plate 313c, of the box body 32c. Thus, the transverse partition plate 314c, the first longitudinal partition plate 313c, the spraying plate 38c and the corresponding inner side wall of the box body 32c can define the spraying cavity 312c.

In order to extend the cooking fume spraying channel 3121c formed between the end of the cooking fume inlet pipe 311c and the through opening 3120c, for example, as shown in FIGS. 44-46, the second longitudinal partition plate 315c is disposed longitudinally between the first longitudinal partition plate 313c and the side plate of the box body 32c, the top of the second longitudinal partition plate 315c is connected to the bottom of the spraying plate 38c in a sealed manner, and the bottom of the second longitudinal partition plate 315c is spaced from the top of the transverse partition plate 314c; the third longitudinal partition plate 316c is longitudinally arranged between the second longitudinal partition plate 315c and the side plate of the box body 32c, the top of the third longitudinal partition plate 316 and the bottom of the spraying plate 38c are arranged in a spaced mode, and the bottom of the third longitudinal partition plate 316c is fixed to the top of the transverse partition plate 314. Thus, at the other end of the smoke pipe between the first longitudinal partition plate 313c and the second longitudinal partition plate 315c, cooking fume exhausted by the cooking fume exhaust pipe can firstly pass through the area between the first longitudinal partition plate 313c and the second longitudinal partition plate 315, then pass through the area between the second longitudinal partition plate 315c and the third longitudinal partition plate 316c, and finally passes through an area between the third longitudinal partition plate 316c and the inner side wall of the corresponding box body 32c. Besides, the cooking fume outlet 322c is formed in the other side plate, opposite to the side plate, of the box body 32c and located below the spraying plate 38c, the through opening 3120c is formed in the transverse partition plate 314c, and the through opening 3120c is located between the third longitudinal partition plate 316 and the side plate (adjacent to and opposite to the third partition plate) of the box body 32c. Cooking fume entering the spraying cavity 312c can be discharged to the position between the transverse partition plate 314c and the bottom in the box body 32c from the through opening 3120c, and then is discharged out from the cooking fume channel opening 3130 and the cooking fume outlet 322c in sequence. Therefore, by arranging the partition plates in the box body 32c, the passing path of the cooking fume entering the box body 32c can be lengthened, which is more beneficial to the condensation and filtration of the cooking fume. In order to enable water sprayed between the second longitudinal partition plate and the third longitudinal partition plate to smoothly flow to the through opening 3120c, a gap 3160c is formed between the bottom of the third longitudinal partition plate and the transverse partition plate 314c.

It should be noted that the spraying cavity 312c may also be a hollow cylindrical structure or other structure or the like, which is not specifically limited herein. In addition, the extending mode of the cooking fume spraying channel 3121c in the spraying cavity 312c can also be other arrangement modes, for example, the cooking fume spraying channel 3121c can be of a spiral structure from top to bottom or a spiral structure from inside to outside on the horizontal plane, which is not limited herein.

As a further improvement on the cooking fume treatment device 3c, a secondary cooking fume treatment device is additionally arranged on the basis of the cooking fume treatment device 3c, and cooking fume treated by the cooking fume treatment device 3c needs to be treated by the secondary cooking fume treatment device and then flows back into the cooking cavity 100, that is, the cooking fume outlet 322c of the cooking fume treatment device 3c is communicated with the interior of the cooking cavity 100 via the secondary cooking fume treatment device instead of being directly connected with the interior of the cooking cavity 100. Specifically, referring to FIGS. 44-47, the secondary cooking fume treatment device comprises a first filter box 317c, the first filter box 317c is provided with a fume inlet 3170c and a fume outlet 3171c, the fume inlet 3170c is communicated with the cooking fume outlet 322c of the cooking fume treatment device 3c, and the fume outlet 3171c is communicated with the interior of the cooking cavity 100, thus, cooking fume entering the box body 32c from the cooking fume inlet 321c enters the first filter box 317c from the cooking fume outlet 322c and then enters the cooking cavity 100 again from the fume outlet 3171c. In addition, at least one cooking fume filter layer 3172c is arranged between the fume inlet 3170c and the fume outlet 3171c, so that the cooking fume treated in the box body 32c can be filtered by the cooking fume filter layer 3172c in the first filter box 317c after entering the first filter box 317c, and the cooking fume can be treated more effectively.

Preferably, referring to FIGS. 44-47, the cooking fume treatment device 3c further comprises a draining pipe 3173c. The fume inlet 3170c is formed in the top of the first filter box 317c, and the fume outlet 3171c is formed in the bottom of the first filter box 317c, so that cooking fume entering the first filter box 317c can sequentially pass through the cooking fume filter layer 3172c arranged between the fume inlet 3170c and the fume outlet 3171c from top to bottom. In addition, the first filter box 317c is located below the box body 32c, one end of the draining pipe 3173c is connected with the top of the first filter box 317c, and the other end of the draining pipe 3173c penetrates into the box body 32c in a sealed manner and protrudes relative to the bottom in the box body 32c, thus, when water is added into the box body 32c to enable the water level in the box body 32c to be higher than the set height of the other end of the draining pipe 3173c, the water in the box body 32c can flow into the first filter box 317c from the draining pipe 3173c and pass through the cooking fume filter layer arranged between the fume inlet 3170c and the fume outlet 3171c from top to bottom, so that the first filter box 317c can be effectively cooled, and cooking fume entering the first filter box 317c can be effectively condensed.

Water falling into the first filter box 317c can be discharged to the bottom of the cooking cavity 100 from the fume outlet 3171c and then discharged out from a water outlet 101c (the water outlet 101c is communicated with a bottom opening of the cooking cavity 100) formed in the bottom of the outer shell 1c. It should be noted that when the water adding opening 320c is formed in the top of the box body 32c, water is added into the box body 32c from the water adding opening 320c, so that the water passes through the spraying plate 38c and then can uniformly spray the cooking fume filtering assembly 34c, the cooking fume filtering assembly 34c can be cooled, and the cooking fume filtering assembly 34c can be cleaned to a certain extent; when the water level of the accumulated water falling into the bottom in the box body 32c is higher, the accumulated water falls into the first filter box 317c from the draining pipe 3173c, so that the cooking fume filter layer 3172c in the first filter box 317c is cleaned, then is discharged into the cooking cavity 100 from the fume outlet 3171c and finally discharged from the water outlet 101c. In order to enhance the cooking fume cleaning effect on the cooking fume filtering assembly 34c, cooking fume cleaning liquid can be added into the box body 32c from the water adding opening 320c.

As a further improvement of the above embodiment, referring to FIGS. 44-47, the secondary cooking fume treatment device further comprises a cooking fume outlet pipe 318c and a second filter box 319c, the second filter box 319c is communicated with the cooking fume outlet 322c via the fan 33c and communicated with the fume inlet 3170c of the first filter box 317c via the cooking fume outlet pipe 318c, and at least one cooking fume filter layer 3190c is arranged in the second filter box 319c. The cooking fume discharged from the cooking fume outlet 322c of the box body 32c enters the second filter box 319c, and enters the first filter box 317c to be filtered again after being filtered by the cooking fume filter layer 3190c in the second filter box 319, so that the cooking fume filtering effect can be further improved.

It should be noted that the cooking fume filtering layer of the above embodiments of the present invention may be made of a material which has good adsorption capacity on cooking fume and a good thermal conductivity, for example, the cooking fume filtering layer may be made of steel wire balls or stacked metal wire meshes arranged and the like, and is not limited in particular herein.

According to the analysis, in the embodiment of the present invention, the cooking fume generated in the cooking process can be effectively treated by arranging the cooking fume treatment device 3c, so that pollution of the cooking fume to the environment can be effectively avoided. Moreover, the cooking fume primarily treated by the cooking fume treatment device 3c sequentially enters the second filter box 319c and the first filter box 317c of the secondary cooking fume treatment device to be filtered twice and then returns to the cooking cavity to be circularly treated, so that zero cooking fume emission in a real sense is realized.

Figure 54:
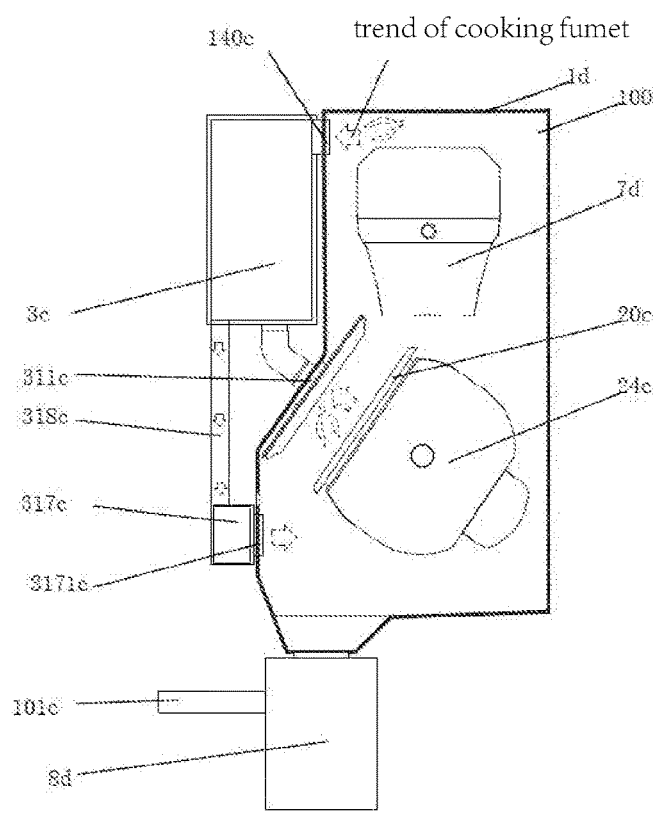
FIG. 54 is a schematic diagram of a cooking fume treatment system structure of another embodiment provided by the present invention.

Moreover, as a further optimized design of the cooking fume treatment system of the embodiment, referring to FIG. 54, on the basis of the cooking fume treatment system, a second exhaust port 140c is directly formed in the inner shell 1d, the interior of the cooking cavity 100 communicates with the cooking fume inlet 321c of the cooking fume treatment device 3c via the second exhaust port 140c, so that the cooking fume in the cooking cavity 100 can be directly discharged to the cooking fume treatment device 3c from the second exhaust port 140c for cooking fume treatment. Thus, the cooking fume escaping out from the wok to the cooking cavity 100 in the cooking process and the cooking fume flowing back into the cooking cavity 100 after being treated by the cooking fume treatment device 3c/the secondary cooking fume treatment device can be exhausted to the cooking fume treatment device 3c from the second exhaust port 140c for cooking fume treatment. Therefore, as an improved design, the cooking fume generated in the closed cooking process of the wok 20c is discharged to the cooking fume treatment device 3c from the exhaust port of the wok lid for cooking fume treatment; the cooking fume escaping out from the wok to the cooking cavity 100 is discharged to the cooking fume treatment device 3c from the second exhaust port 140c for cooking fume treatment when the wok 20c is opened, so that the cooking fume treatment efficiency and effect are further improved.

The structure of the wok moving control device 22c is described in detail below with referring with FIGS. 49-53:

In an alternative embodiment as shown in FIGS. 49-53, the wok moving control device 22c includes a main driving screw rod 220c, an auxiliary driving screw rod 221c, a driving motor 222c, a synchronous rotating assembly 224c and two moving connecting pieces 223c; the two moving connecting pieces 223c are used for being connected with both sides of the wok 20c; the first end of the main driving screw rod 220c is connected with one of the moving connecting pieces 223c, and the first end of the auxiliary driving screw rod 221c is connected with the other moving connecting piece 223c; the second end of the main driving screw rod 220c is connected with the second end of the auxiliary driving screw rod 221c via the synchronous rotating assembly 224c; the driving motor 222c is used for driving the main driving screw rod 220c to rotate. The main driving screw rod 220c and the auxiliary driving screw rod 221c are arranged in parallel.

The working principle of the wok moving control device 22c in the embodiment of the present invention is as follows: the driving motor 222c drives the main driving screw rod 220c to rotate, and simultaneously drives the auxiliary driving screw rod 221c to rotate through the synchronous rotating assembly 224c, that is, the driving motor 222c rotates to simultaneously drive the main driving screw rod 220c and the auxiliary driving screw rod 221c to rotate; the main driving screw rod 220c and the auxiliary driving screw rod 221c convert rotation into linear motion to drive the left side and the right side of the wok 20c to move front and back synchronously. The embodiment of the present invention adopts double-side synchronous driving, avoids the distortion of the wok device caused by single-side driving, and only needs one driving motor 222c, thereby having simple structure and reducing cost.

In an alternative embodiment, referring to FIGS. 49-53, the synchronous rotating assembly 224c includes a first synchronous wheel 2240c, a second synchronous wheel 2241c and a first synchronous belt 2242c; the first synchronous wheel 2240c is arranged on the main driving screw rod 220c; the second synchronous wheel 2241c is arranged on the auxiliary driving screw rod 221c; the first synchronous belt 2242 is connected with the first synchronous wheel 2240c and the second synchronous wheel 2241, so that the first synchronous wheel 2240c drives the second synchronous wheel 2241c to rotate when rotating. The rotation of the first synchronous wheel 2240 is transmitted to the second synchronous wheel 2241c via the first synchronous belt 2242c, so that the main driving screw rod 220c drives the auxiliary driving screw rod 221c to rotate.

In an alternative embodiment, please refer to FIGS. 49-53, the synchronous rotating assembly 224c further includes a third synchronous wheel 2243c, a fourth synchronous wheel 2244c and a second synchronous belt 2245c; a driving terminal of the driving motor 222c is connected with the third synchronous wheel 2243c; the fourth synchronous wheel 2244c is arranged on the main driving screw rod 220c; the second synchronous belt 2245c is connected with the third synchronous wheel 2243c and the fourth synchronous wheel 2244c, so that the third synchronous wheel 2243c drives the fourth synchronous wheel 2244c to rotate when rotating. According to the embodiment of the present invention, the main driving screw rod 220c is indirectly driven via the third synchronous wheel 2243c, the fourth synchronous wheel 2244c and the second synchronous belt 2245c instead of directly driving the main driving screw rod 220c by adopting the driving motor 222c, so that the driving motor 222c can be well protected, and the service life of the driving motor 222c is prolonged.

In an alternative embodiment, please refer to FIGS. 49-53, the wok moving control device 22c further comprises two linear sliding rails 26c fixed inside the cooking machine and parallel to each other; the two moving connecting pieces 223c are movably arranged on the two linear sliding rails 26c in a one-to-one correspondence mode. Specifically, the two movable connecting pieces 223c are each provided with a sliding block (not shown), and the sliding blocks are provided with sliding grooves (not shown) matched with the corresponding linear sliding rails 26c.

In an alternative embodiment, please refer to FIGS. 49-53, the wok moving control device 22c further comprises a limit switch box 27c disposed above one of the moving connecting pieces 223, and the limit switch box 27c comprises a first limit switch 271c arranged at the upper limit position of the wok and a second limit switch 272c arranged at the lower limit position of the wok.

By using the first limit switch 271c and the second limit switch 272c, whether the wok 20c reaches two limit positions in the linear motion direction or not can be detected, and when the wok 20c reaches the two limit positions, the driving motor 222c is stopped, so that the moving mechanism is prevented from being damaged.

More preferably, the wok moving control device 22c further comprises an upper sensor (not shown) and a lower sensor (not shown) which are arranged on one of the moving connecting pieces 223c and used for sensing whether the up-and-down driving position of the furnace body reaches the position required by the system or not. The upper sensor is used for controlling the driving motor 222c to stop rotating by the system after sensing that the wok 20c reaches a wok lid position when moving upwards, so that the wok 20c is positioned at the position to perform a cooking operation, and the lower sensor is used for controlling the driving motor 222c to stop rotating by the system after sensing that the wok 20c moves downwards to reach a wok lid opening position, so that the wok 20c is positioned at the position to perform a working position changing operation.

According to the embodiment of the present invention, the wok moving control device 22c is used for controlling the wok 20c to move, so that the wok 20c can be moved to a preset position as required in the cooking process, the wok 20c can be matched well with other devices of the full-automatic cooking machine, and the automation of the cooking machine is improved.

Figure 51:
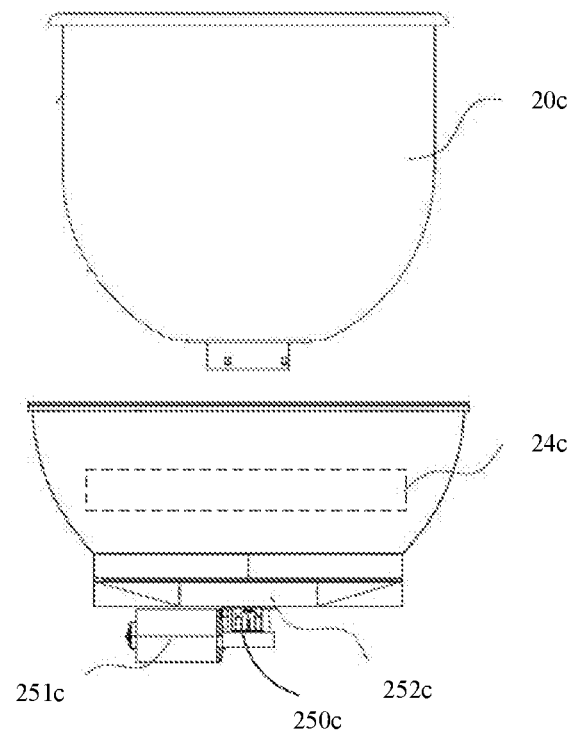
FIG. 51 is a schematic view of a partial structure of the wok device shown in FIG. 39.
Figure 52:
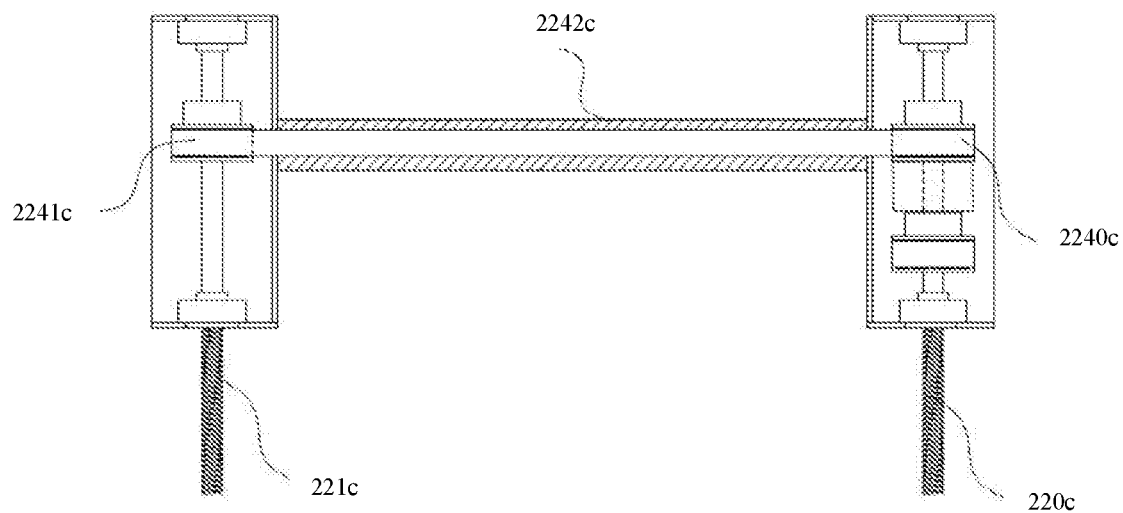
FIG. 52 is a schematic partial configuration of the wok moving control device shown in FIG. 49.
Figure 53:
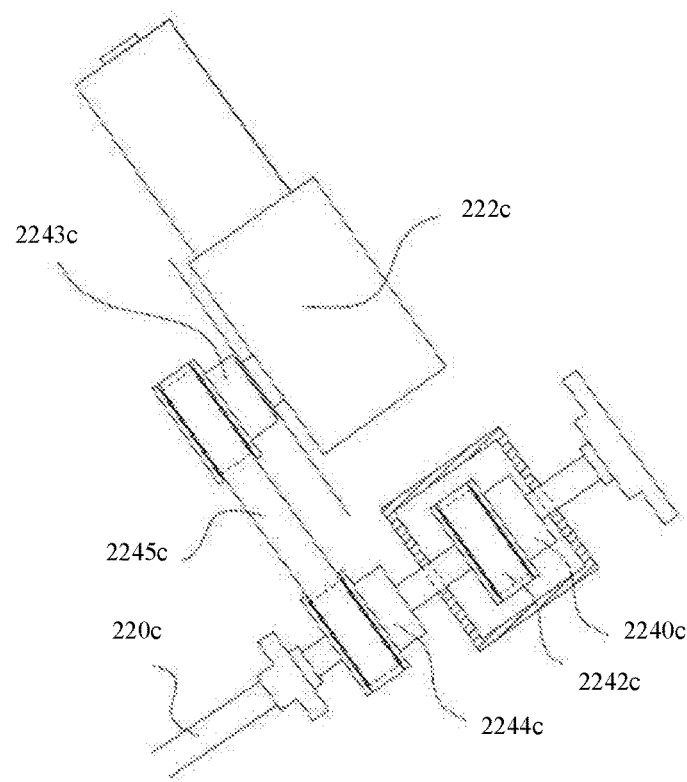
FIG. 53 is a schematic partial configuration of the wok moving control device shown in FIG. 49.

Referring to FIG. 51, the furnace body device 24c is electrically connected with the control device 13c and is used for heating the wok 20d; the wok rotating device 25d is electrically connected with the control device 13c and is used for controlling the wok 20c to rotate around the central axis of the wok 20c so as to realize cooking. Exemplarily, referring to FIG. 51, the wok rotating device 25c comprises a rotating shaft 250c, a stir-frying motor 251c and a wok fixing frame 252c; the wok working position controlling device is used for turning the wok fixing frame 252c; the furnace body device 24c and the wok 20c are both arranged in the wok fixing frame 252c, the stir-frying motor 251c is fixed at the bottom of the wok fixing frame 252c, the stir-frying motor 251c is in driving connection with the wok 20c via the rotating shaft 250c, and the stir-frying motor 251c is electrically connected with the control device 13c, so that when a stir-frying control command sent out by the control device 13c is received, the stir-frying motor 251c drives the rotating shaft 250c to rotate to drive the wok 20c to rotate. Specifically, the furnace body device 24c comprises a heating coil (not shown) which is wound on the inner side wall of the wok fixing frame 252c and surrounds the wok 20c. It should be noted that the specific structures of the furnace body device 24c and the wok rotating device 25c may also be referred to the prior art and will not be described in detail herein.

In addition, according to the embodiment of the present invention, the cooking cavity arranged in a sealed manner is used as a closed cooking working space, the cooking equipment is arranged in the closed cooking space in the cooking cavity to realize the cooking function, and the spraying piece capable of washing the cooking equipment is arranged in the cooking cavity, and an opening used for being connected with a water outlet is formed in the bottom of the cooking cavity so as to discharge water generated after the spraying piece washes the cooking equipment.

Please refer to FIGS. 55-59, the automatic cooking machine provided by the embodiment of the present invention further comprises a water supply switch 2d, at least one water spraying piece 3d, a wok turning angle detector 6d, an ingredient feeding mechanism 7d, a food waste processor 8d and a flow guiding device 9d. The at least one water spraying piece 3d is arranged in the cooking cavity 100 and is communicated with a water source via the water supply switch 2d, for example, the at least one water spraying piece 3d is arranged at the top in the cooking cavity 100 to directly spray and flush the ingredient feeding mechanism 7d arranged at the upper part in the cooking cavity. The wok turning angle detector 6d is arranged in the inner shell 1d (or is arranged between the inner shell 1d and the outer shell 1c) and is used for detecting the turning angle of the wok 20c. The ingredient feeding mechanism 7d comprises an ingredient-dropping chamber 70d and compartment door driving mechanisms 71d, the ingredient-dropping chamber 70d is used for containing food ingredients, the ingredient-dropping chamber 70d is arranged under the at least one water spraying piece 3d and located over the wok 4, and at least one water spraying inlet facing the corresponding water spraying piece 3d is formed in the top wall of the ingredient-dropping chamber 70d; the bottom wall of the ingredient-dropping chamber 70d is provided with at least one ingredient-dropping opening aligned with the opening of the wok 20c in the feeding/flushing process, and each ingredient-dropping opening is provided with a compartment door. Each compartment door driving mechanism 71d is used for correspondingly driving the compartment door to be opened and closed. The flow guiding device 9d is arranged below the wok 20c and is positioned at the bottom of the cooking cavity 100, and the flow guiding device 9d is connected with the water outlet 101c via the food waste processor 8d and is used for guiding water poured from the wok 20c to an inlet 81d of the food waste processor 8d. An outlet 80d of the food waste processor 8d is communicated with the water outlet 101c. The wok turning angle detector 6d, the food waste processor 8d, the compartment door driving mechanisms 71d and the water supply switch 2d are electrically connected with the control device 13c so as to receive control commands sent by the control device 13c according to a preset recipe program and perform corresponding operations according to the control commands.

Figure 59:
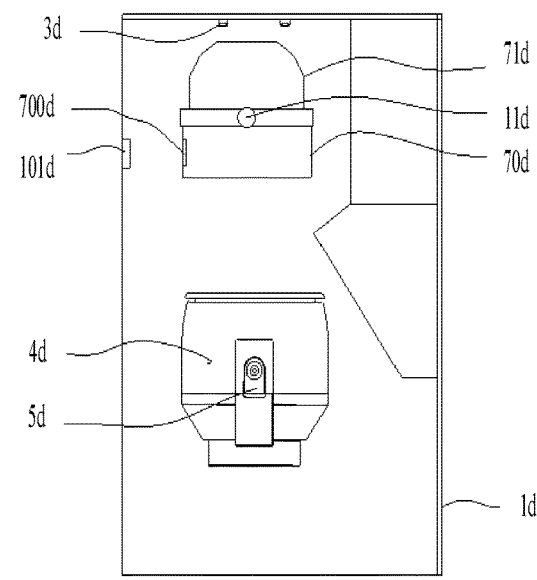
FIG. 59 is a schematic view of the state of the ingredient feeding device shown in FIG. 55 after the ingredient feeding device is flipped down.
Figure 60:
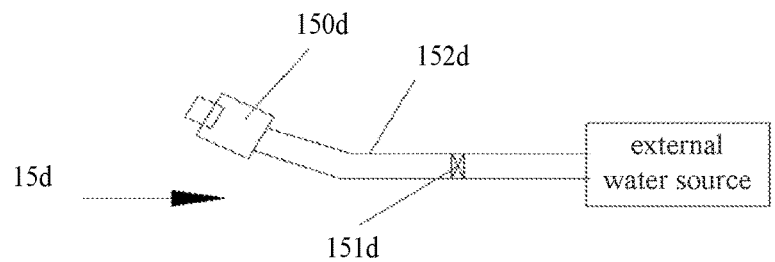
FIG. 60 is a schematic diagram of a structure of the wok washing device of the present embodiment.

The working process of the embodiment of the present invention has the following two situations:

1. When the intelligent cooking machine needs to be used for cooking, food ingredients can be put into the ingredient-dropping chamber 70d in advance, so that when the intelligent cooking machine is in a feeding procedure, the wok turning angle detector 6d sends detected turning angle data of the wok 20c to the control device 13c; the control device 13c controls the wok working position controlling device 21c to drive the wok 20c to turn according to the turning angle data received at the moment, as shown in FIG. 59, so that the opening of the wok 20c is aligned with the ingredient-dropping opening 73d of the ingredient feeding mechanism 7d; the control device 13c sends a corresponding operation command to the compartment door driving mechanism 71d, so that the compartment door driving mechanism 71d opens the corresponding compartment door according to the operation command, and the food ingredients in the ingredient-dropping chamber 70d can fall into the wok 20c from the corresponding ingredient-dropping opening 73d.

Figure 55:
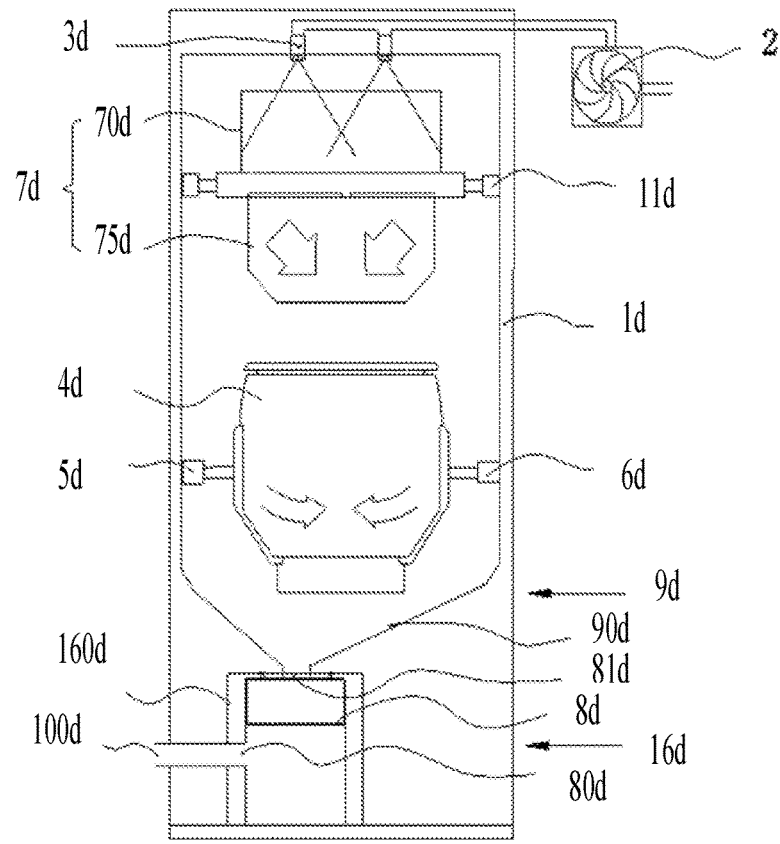
FIG. 55 is a front view of a cooking machine showing a spraying flushing system of an ingredient feeding device in accordance with an embodiment of the present invention.
Figure 56:
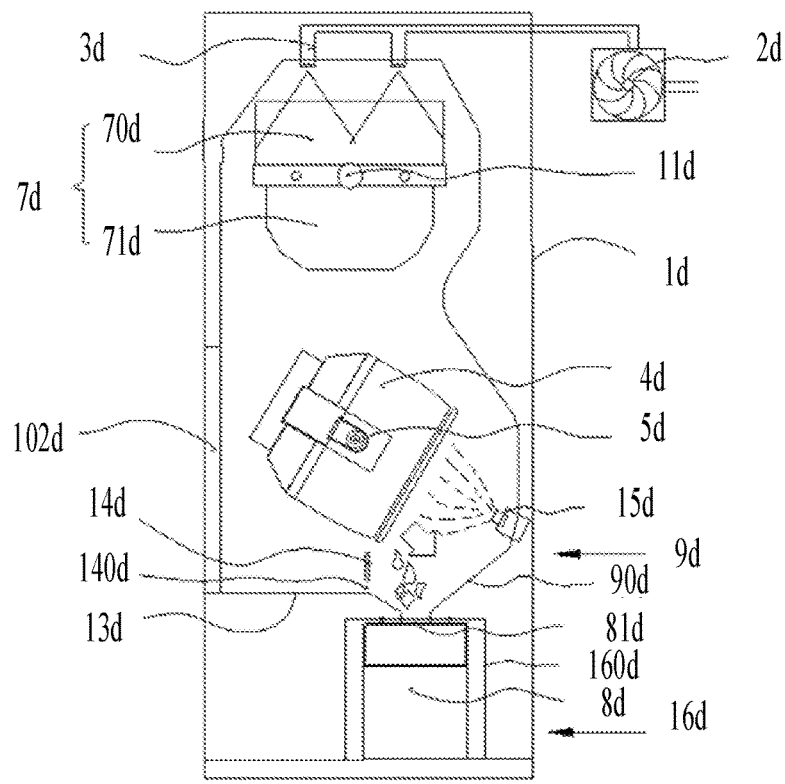
FIG. 56 is a front view of a cooking machine showing a spraying flushing system of an ingredient feeding device according to an embodiment of the present invention.
Figure 57:
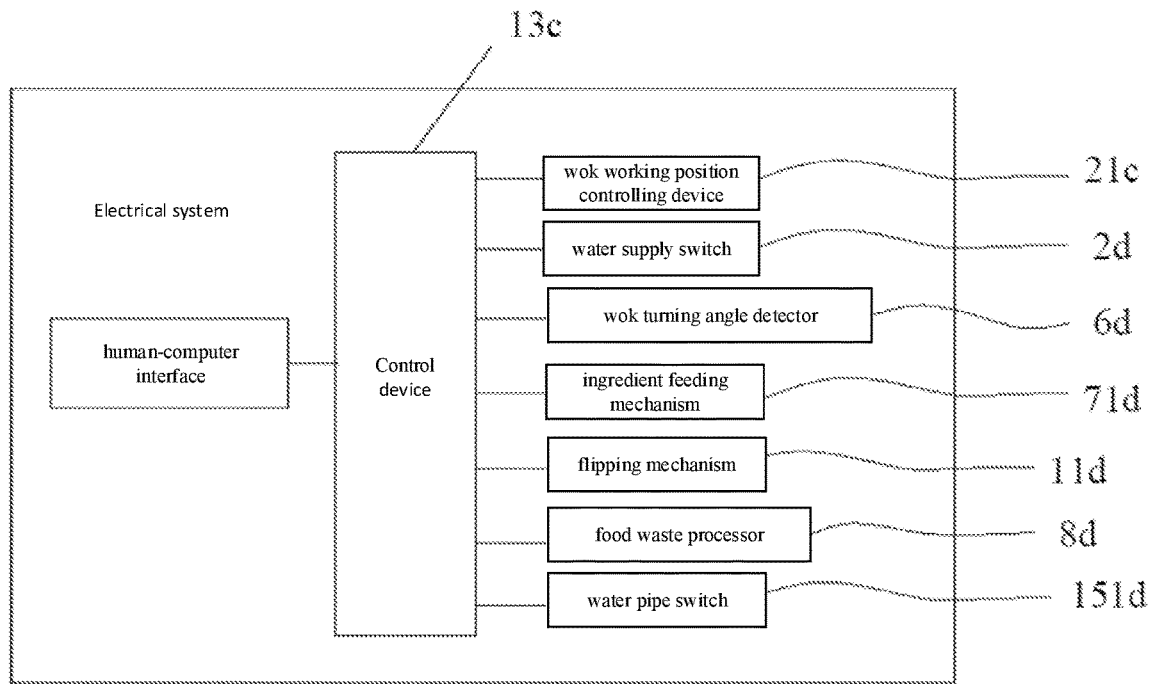
FIG. 57 is a schematic diagram of an electrical system of a cooking machine according to an embodiment of the present invention.
Figure 58:
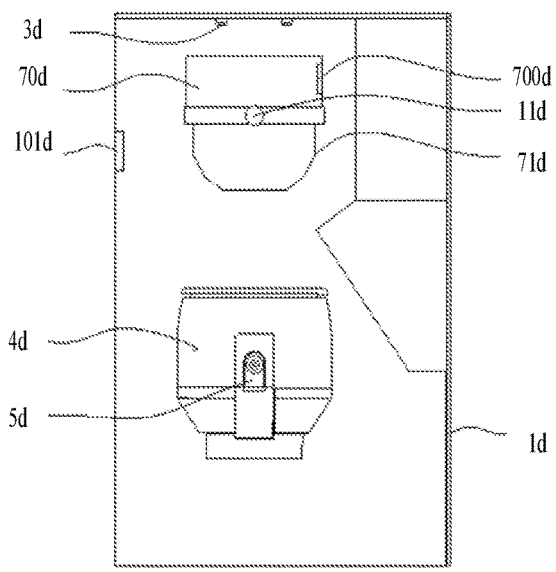
FIG. 58 is a schematic view of the state of the ingredient feeding device shown in FIG. 55 after ingredient feeding device is flipped up.

2. After the intelligent cooking machine finishes a dish discharging process, the wok turning angle detector 6d sends detected turning angle data of the wok 20c to the control device 13c; the control device 13c controls the wok working position controlling device 21c to drive the wok 20c to turn according to the turning angle data received at the moment, as shown in FIG. 59, so that the opening of the wok 20c is aligned with the ingredient-dropping opening 73d of the ingredient feeding mechanism 7d; the control device 13c also sends a corresponding operation command to the compartment door driving mechanism 71d, so that the compartment door driving mechanism 71 opens the corresponding compartment door according to the operation command, as shown in FIG. 55, and at the moment, the control device 13c controls the water supply switch 2d to be switched on to supply high-pressure water to the water spraying pieces 3d, so that the water spraying pieces 3d spray water to the ingredient feeding mechanism 7d below the water spraying piece 3d; the water sprayed by the water spraying pieces 3d falls into the ingredient-dropping chamber 70d from the corresponding water spraying inlets 72d, ingredient residues in the ingredient-dropping chamber 70d are washed down from the ingredient-dropping openings 73d, and the ingredient residues attached to the compartment door can be washed down by the water washed down from the ingredient-dropping openings 73; flushed ingredient residues and water fall into the wok 20c located under the ingredient-dropping chamber 70d to flush the wok. After the water spraying pieces 3d stop spraying water, the control device 13c controls the wok working position controlling device 21d to drive the wok 20c to turn according to the received turning angle data of the wok 20c at the moment, as shown in FIG. 56, so that the opening of the wok 20c faces the opening in the top of the flow guiding device 9d to perform water pouring work, so that water and ingredient residues in the wok 20c fall into the flow guiding device 9d, the flow guiding device 9d guides the water and ingredient residues poured down from the wok 20c to the food waste processor 8d, and the food waste processor 8d treats the ingredient residues mixed in the water and then discharges the water from the water outlet 101c, and finally, the cleaning of the ingredient feeding mechanism 7d and the wok 20c is completed.

It will be appreciated that the intelligent cooking machine may also clean the ingredient feeding mechanism 7d before food ingredients are placed into the ingredient-dropping chamber 70d, and the cleaning process can be referred to the foregoing and is not described herein again.

It should be noted that the water supply switch 2d can be an electric valve body arranged in the inner shell 1d or outside the inner shell 1d, and can also be an electric water pump arranged in the inner shell 1d or outside the inner shell 1d, which is not particularly limited herein.

In the embodiment, reference may be made to the description related to the first embodiment for the working process and the working principle of the ingredient feeding device and the wok that are washed by the spraying pieces 3d, the specific arrangement and the structure of the spraying pieces 3d, and the specific structure of the ingredient feeding mechanism 7d, which are not described herein again.

In the embodiment of the present invention, please refer to FIGS. 56, 61, 62, 64 and 65, the automatic cooking machine further comprises a dish discharging tray 13d, a flushing piece 18d and a water inlet switch 17d electrically connected with the control device 13c. One side face of the inner shell 1d is provided with a dish discharging outlet 102d adjacent to the dish discharging tray 13d. The dish discharging tray 13d is arranged under the wok 20c and obliquely above the flow guiding shell 90d, and the dish discharging tray 13d is located between the dish discharging outlet 102d and the top of the flow guiding shell 90d; a dish containing plate (not shown) can be placed on the dish discharging tray 13d from the dish discharging outlet 102d, so that dishes poured down from the wok 20c can be contained in the dish containing plate, and the dish containing plate can be taken out from the dish discharging tray 13d from the dish discharging outlet 102d. In addition, the top face of the dish discharging tray 13d gradually inclines downwards from one end to the other end thereof, and the flushing piece 18d is arranged at the one end of the top face of the dish discharging tray 13d and communicated with a water source via the water inlet switch 17d. When the top face of the dish discharging tray 13d needs to be cleaned, the control device 13c controls the water inlet switch 17d to be turned on, so that the flushing piece 18d sprays water to the top face of the dish discharging tray 13d, and the water sprayed from the flushing piece 18d flows from the one end to the other end of the top face of the dish discharging tray 13d, so that the top face of the dish discharging tray 13d can be washed, and the water used for washing the top face of the dish discharging tray 13d can flow into the flow guiding device 9d and then is guided to the water outlet 101c by the flow guiding device 9d to be drained out.

Figure 63:
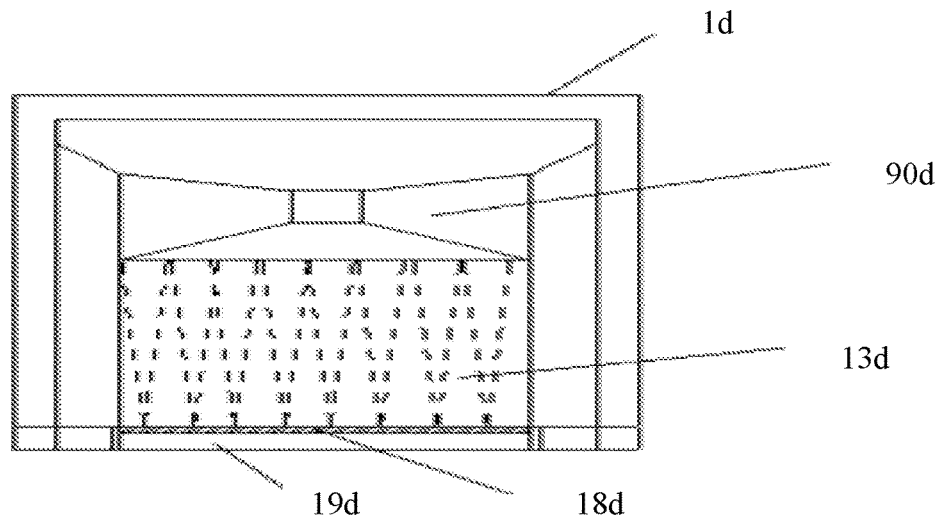
FIG. 63 is a top view of the intelligent cooking machine shown in FIG. 61.

In the embodiment of the present invention, preferably, referring to FIGS. 55 and 56, the flow guiding device 9d comprises a flow guiding shell 90d which is open at the upper end and the lower end and is of a hollow structure. The flow guiding shell 90d is arranged at the bottom of the cooking cavity and located below the wok 20c and over the food waste processor 8d, and an opening in the bottom of the flow guiding shell 90d communicates with an inlet 81d of the food waste processor 8d. The flow guiding shell 90d is gradually narrowed from the top to the bottom thereof, so that when the wok 20c is used for pouring water, the water poured from the wok 20c can intensively flow down into the food waste processor 8d. Specifically, referring to FIGS. 56, 63 and 64, the other end of the top surface of the dish discharging tray 13d extends to the opening at the top of the flow guiding shell 90d, so that water falling from the top surface of the dish discharging tray 13d can flow into the flow guiding shell 90d from the opening at the top thereof.

In order to prevent water poured down from the wok 20c from splashing onto the dish discharging tray 13d, referring further to FIG. 56, the cooking machine further comprises a water baffle 14d. The water baffle 14d is arranged at the other end of the top surface of the dish discharging tray 13d, and at least one water through opening 140d is formed by the water baffle 14d and the top surface of the dish discharging tray 13d, so that water poured and splashed from the wok 20c can be blocked by the water baffle 14d, and water for flushing the top surface of the dish discharging tray 13d can flow into the opening in the top of the flow guiding shell 90d from the water through opening 140d.

In order to effectively clean the wok 20c, preferably, referring to FIG. 56, the automatic cooking machine further comprises a wok washing device 15d, and the wok washing device 15d comprises a wok washing spray head 150d arranged in the cooking cavity 100, so that the wok 20c can be cleaned by the wok washing spray head 150d. The wok washing device 15d further comprises a water pipe switch 151d and a water inlet pipe 152d, the water pipe switch 151d and the water inlet pipe 152d are arranged outside the cooking cavity 100; a water outlet pipe opening of the water inlet pipe 152d is connected with the wok washing spray head 150d, and a water inlet pipe opening of the water inlet pipe 152d is used for being communicated with an external water source; the water pipe switch 151d is arranged on the water inlet pipe 152d and is electrically connected with the control device 13c.

Preferably, referring to FIG. 56, the wok washing spray head 150 is arranged over the flow guiding shell 90d and used for spraying and washing the wok 20c with the wok opening facing the opening in the top of the flow guiding shell 90d after being turned, that is, the arrangement position of the wok washing spray head 150d enables the wok washing spray head 150d to be aligned with the opening of the wok 20c after being turned. After the intelligent cooking machine finishes the dish discharging process, if the wok 20c needs to be cleaned, the wok 20c can be turned by the wok working position controlling device 21c, so that the opening of the wok 20c faces the opening in the top of the flow guiding shell 90, and at the moment, the water pipe switch 151d can be turned on, so that the wok washing spray head 150d can perform high-pressure spray washing on the interior of the wok 20c, and the wok washing water after spray washing can fall into the flow guiding shell 90d. It should be noted that after the ingredient feeding mechanism 7d is cleaned and the wok 20c is in a water pouring work state, the water pipe switch 151d can also be turned on, so that the wok washing spray head 150d can perform high-pressure spray washing on the interior of the wok 20c, and the wok 20c is effectively cleaned.

It is worth noting that the water pipe switch 151d is an electrically controlled valve body switch. In addition, the wok washing device 15d can also be of other structures, and specific reference can be made to the prior art, which are not described herein again.

Preferably, referring to FIGS. 55 and 56, the cooking machine further comprises a fixing device 16d for fixing the food waste disposer 8d, and the fixing device 16d is arranged inside the inner shell 1d and the outer shell 1c, so that the food waste disposer 8d can be effectively fixed by the fixing device 16d. Specifically, referring to FIGS. 55 and 56, the fixing device 16d comprises a fixing frame 160d, the fixing frame 160d sleeves the food waste processor 8d, the bottom of the fixing frame 160d is connected with the bottom in the shell 1c, and the top of the fixing frame 160d is located above the top of the food waste processor 8d and clamped with the top of the food waste processor 8d, so that the food waste disposer 8d can be effectively fixed by the fixing frame 160d. It is to be noted that the fixing device 16d may also be a screw connection structure or a snap-fit structure or the like for connecting the food waste disposer 8d to the shell 1, which is not specifically limited herein.

The food waste disposer 8d may also be fixed in other forms, exemplarily, referring to FIGS. 55 and 56, the bottom of the flow guiding shell 90d is clamped into the inlet 81d at the top of the food waste disposer 8d, such that the food waste disposer 8d and the bottom of the flow guiding shell 90d are clamped together, and the food waste disposer 8d is effectively fixed. It will be appreciated that the connection relationship between the inlet 81d of the food waste disposer 8d and the opening at the bottom of the flow guiding shell 90d may also be: the inlet 81d of the food waste disposer 8d and opening at the bottom of the flow guiding shell 90d are of uniform size and are connected in alignment with each other, and the connection between the inlet 81d and the opening at the bottom of the flow guiding shell 90d is provided by waterproof sealing (reference may be made to the existing waterproof sealing technology).

Figure 62:
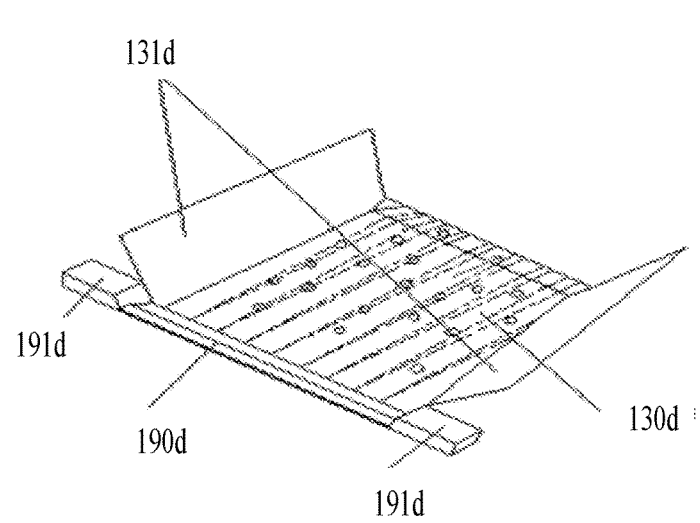
FIG. 62 is a schematic diagram of the structure of the dish discharging tray shown in FIG. 61.
Figure 64:
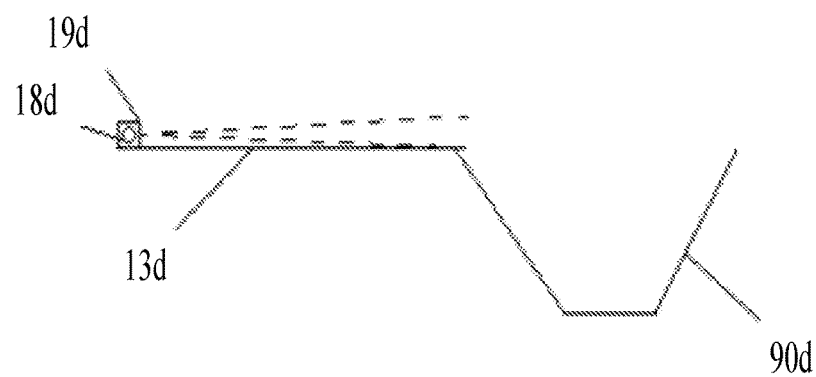
FIG. 64 is a cross-sectional view of the intelligent cooking machine shown in FIG. 63.
Figure 65:
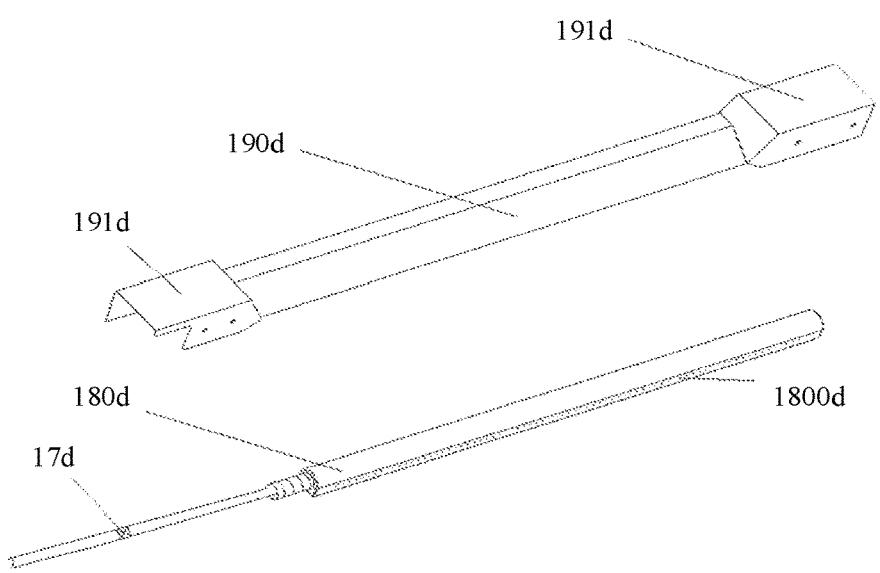
FIG. 65 is an assembled schematic view of the protective cover and the flushing tube shown in FIG. 64.

In the embodiment of the present invention, preferably, with reference to FIGS. 62, 64, and 65, the flushing piece 18d includes a flushing tube 180d for communicating with an external water source via the water inlet switch 17d, the outer sidewall of the flushing tube 180d is provided with a row of water outlet holes 1800d that faces the other end of the dish discharging tray 13d, and the row of water outlet holes 1800d are sequentially arranged from one end to the other end thereof. The row of water outlet holes 1800d are formed in the outer side wall of the flushing tube 180d, so that a flushing water curtain can be formed on the top surface of the dish discharging tray 13d during flushing, and the whole top surface of the dish discharging tray 13d can be better flushed. It should be noted that the flushing piece 18d may also be a spray head or the like, which is not specifically limited herein.

Figure 61:
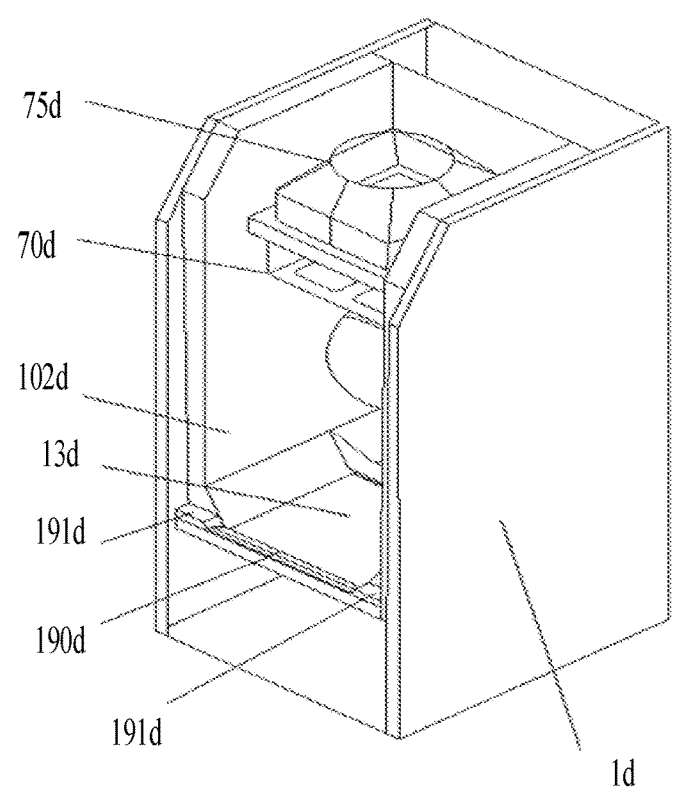
FIG. 61 is a schematic view of a partial structure of a cooking machine showing the internal structure of a cooking cavity in accordance with an embodiment of the present invention.

Further, referring to FIGS. 61, 62 and 65, the cooking machine further comprises a protective cover 19d for covering the flushing tube 180d on the top surface of the dish discharging tray 13d, so that the flushing tube 180d can be effectively protected by arranging the protective cover 19d. The protective cover 19d is provided with a side wall facing the other end of the dish discharging tray 13d, the bottom of the side wall is spaced from the top surface of the dish discharging tray 13d, and therefore water sprayed out of the flushing tube 180d can smoothly flow to the other end of the top surface of the dish discharging tray 13d. Preferably, when the bottom of the side wall of the protective cover 19d is higher than the set height of the row of water outlet holes 1800d, the side wall does not block the sprayed water of the row of water outlet holes 1800d, so that the row of water outlet holes 1800d can effectively form a flushing water curtain on the top surface of the dish discharging tray 13d.

Illustratively, referring to FIGS. 61 and 65, the protective cover 19d comprises an elongated main protective cover body 190d and two side limiting bodies 191d. The main protective cover body 190d covers the flushing tube 180d on the top surface of the dish discharging tray 13d, and the bottom of one side wall of the main protective cover body 190d is spaced from the top surface of the dish discharging tray 13d; and the side wall of the main protective cover body 190d faces the other end of the dish discharging tray 13d. The two side limiting bodies 191d are arranged at the two ends of the main protective cover body 190d respectively and further connected with two opposite inner side walls of the inner shell 1d of the cooking machine respectively, and therefore the protective cover 19d is fixed in the inner shell 1d. Preferably, the two side limiting bodies 191d are both of a cover-shaped structure communicated with the main protective cover body 190d, and certainly, the two side limiting bodies 191d can be of a cylindrical structure or a spherical structure or the like and are not specifically limited herein.

In the embodiment of the present invention described above, illustratively, with reference to FIGS. 61 and 62, the dish discharging tray 13d includes a base plate 130d and two side plates 131d. The base plate 130d gradually inclines downwards from one end to the other end thereof, and the flushing piece 18d is arranged at one end of the base plate 130d. Besides, the two side plates 131d are arranged on the two side parts of the base plate 130d respectively and used for being connected with the two opposite inner side walls of the inner shell 1d of the cooking machine respectively. The two side plates 131d can enable water sprayed by the flushing piece 18d to flow from one end to the other end of the top surface of the base plate 130d in a concentrated mode.

Figure 66:
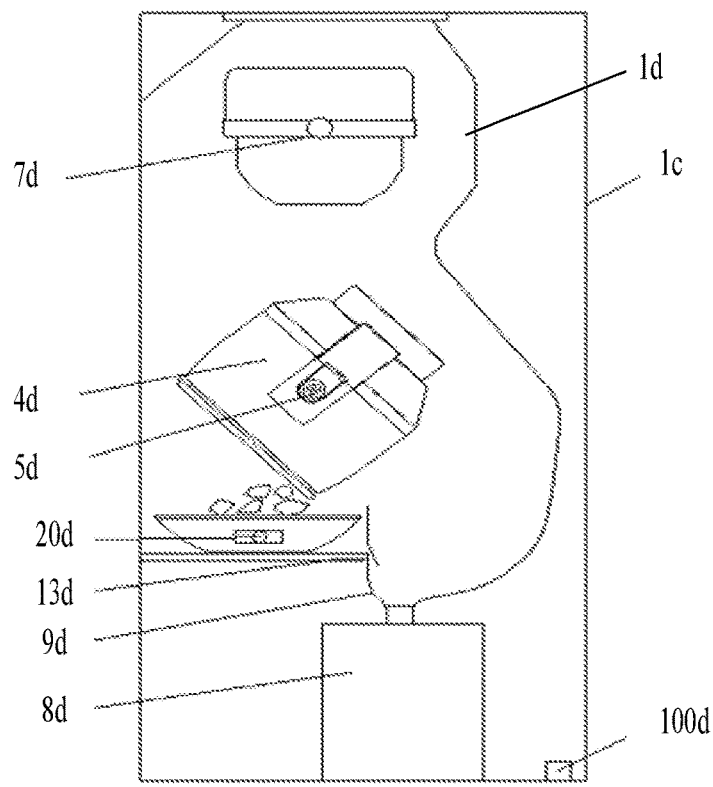
FIG. 66 is a simplified diagram of a cooking machine according to an embodiment of the present invention.

In the embodiment of the present invention, referring to FIG. 66, the cooking machine further comprises a dish position detector 20d for detecting the placement position of a dish containing plate on the dish discharging tray 13d; the dish position detector 20d is arranged on the inner shell and is electrically connected with the control device 13c; and the control device 13c controls the wok working position controlling device 21c to turn for dish pouring according to a detection signal of the dish position detector 20d. When a dish containing plate is placed on the dish discharging tray 13d and the cooking machine is in the dish pouring process, the control device 13c can judge whether the dish containing plate is aligned with the wok 20c or not according to a detection signal of the dish position detector 20d. And if yes, the control device 13c controls the wok working position controlling device 21c to turn the wok 20c, so that food in the wok 20c falls into the dish containing plate. And if not, the cooking machine gives a prompt and stops the dish pouring work. Illustratively, the dish position detector 20d is an infrared correlation detection device.

In an alternative embodiment, referring to FIGS. 39 and 40, the shell is further provided with a door plate 11c and a side door opening corresponding to the door plate 11c on the side of the inner shell 1d on which the dish discharging outlet 102c is provided, the door plate 11c being movably installed on the shell to open and close the side door opening. The door plate 11c and the opening are arranged in the shell, so that the internal devices such as the wok mechanism 2c, the cooking fume treatment device 3c and the automatic dish discharging device and the like in the inner shell 1d can be conveniently repaired and maintained. Preferably, the door plate 11c is provided with a transparent or semitransparent window 110c, so that a user can observe the working condition of the full-automatic cooking machine conveniently. More preferably, the door plate 11c can also open or close the dish discharging outlet 102c, so that the automatic dish discharging device can send out dishes loaded in dish the dish containing plate conveniently.

In an alternative embodiment, referring to FIGS. 39 and 40, the top of the shell 1 is provided with a top cover plate 12c and a top door opening corresponding to the top cover plate 12c, the top cover plate 12c is movably installed on the shell to open and close the top door opening. By arranging the top door opening and the top cover plate 12c, the top-ingredient feeding mechanism can be conveniently repaired and maintained.

It can be understood that the internal working space of an intelligent cooking machine is a high-temperature, high-humidity and high-acidity-alkalinity environment, the working structure and electrical components which are matched with the internal working space of an intelligent cooking machine are difficult to work effectively for a long time under such environment, in addition, food safety, sanitation and environmental protection are involved in the internal working space of an intelligent cooking machine, but according to the embodiment of the present invention, a closed cooking machine working space (cooking cavity) is constructed in the inner shell 1d, main cooking apparatuses in contact with food materials are placed in the closed space of the cooking cavity to realize main cooking functions such as feeding, cooking, heating and dish discharging, and a spraying piece is arranged in the cooking cavity to wash the cooking apparatuses; and meanwhile, accessory cooking apparatuses (including an electric appliance, a circuit, a power supply, a transmission line, a pipeline part and the like which are matched with the main cooking apparatuses to work) for assisting the main cooking equipment in realizing cooking functions are arranged outside the cooking cavity.

In addition to the cooking cavity structure shown in FIG. 61, the structure of the cooking cavity can also adopt other structures. For example, FIGS. 67-70 show another alternative structure of the cooking cavity 100. A cooking area 2e used for containing a wok (not shown) and a wok turning device (not shown) and a dish discharging area 3e located below the cooking area 2e and used for containing a dish discharging device (not shown) are arranged in the cooking cavity 100, and the dish discharging area 3 is located between the cooking area 2e and the bottom of the cooking cavity. The bottom of the cooking cavity 100 is provided with a dish discharging area drain outlet 4e for discharging sewage falling into the dish discharging area 3e, so that when sewage is accumulated at the bottom in the cooking cavity 100, the dish discharging area drain outlet 4e can discharge the sewage at the bottom in the cooking cavity 100, and therefore the interior of the cooking cavity of the cooking machine can be kept sanitary.

Figure 67:
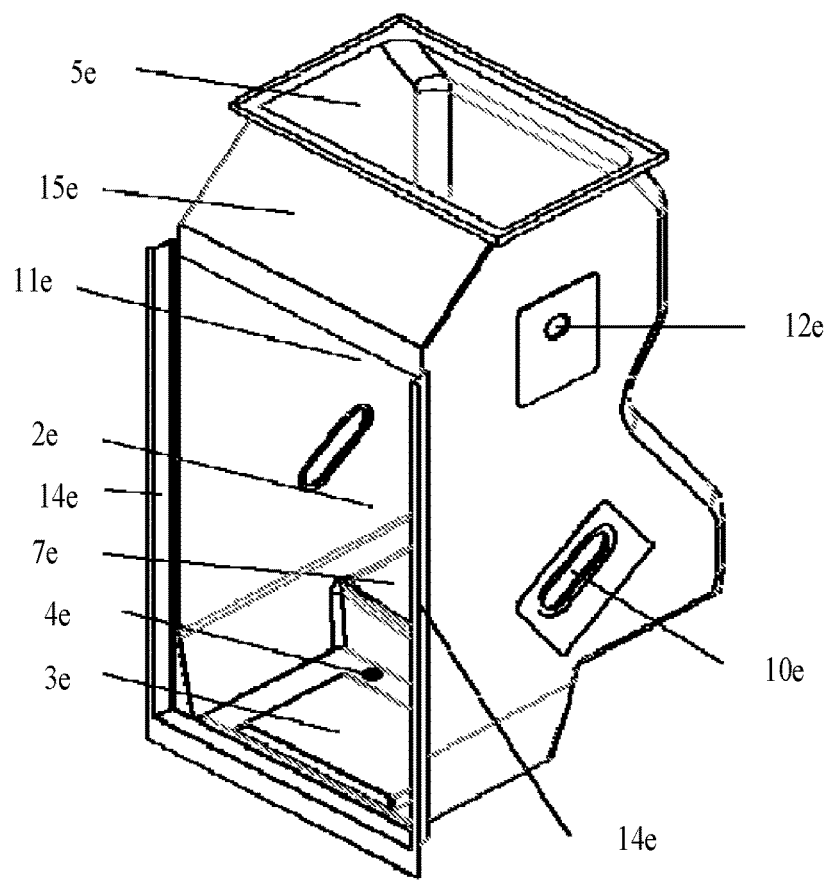
FIG. 67 is a perspective view of a cooking cavity according to an embodiment of the present invention.

Preferably, referring to FIG. 67, the top of the cooking cavity 100 is provided with a top cover opening 5e for installing an openable and closable top cover door panel (not shown). When a device (such as a wok or a wok turning mechanism) in the cooking cavity 100 needs to be maintained, the top cover door plate arranged at the top cover opening 5e can be opened. Therefore, by arranging the top cover opening 5e used for installing the top cover door plate in the top of the cooking cavity 100, the device in the cooking machine is convenient to maintain. Preferably, referring to FIGS. 67-70, the bottom of the cooking cavity 100 is further provided with a draining channel structure 6e which is of a hollow structure and used for draining sewage falling off when the wok is cleaned out of the cooking cavity 100, the top end of the draining channel structure 6e is provided with a sewage collecting opening 7e which is located in the cooking cavity 100 and faced the wok, and a draining opening 8e is formed in the bottom end of the draining channel structure 6e. When the wok needs to be cleaned, sewage falling from the wok flows into the draining channel structure 6e from the sewage collecting opening 7e and is guided by the draining channel structure 6e to the draining opening 8e to be drained out. By arranging the draining channel structure 6e, sewage generated by cleaning the wok can be conveniently drained out. Ideally, the draining channel structure 6e comprises a flow guiding shell of a funnel-shaped structure, and therefore sewage falling from the wok can be conveniently guided out of the shell. It should be noted that the draining channel structure 6e may also be of other structures, for example, the draining channel structure 6e may be of a hollow cylinder structure with the upper end and the lower end being provided with the sewage collecting opening 7e and the draining opening 8e respectively, or the draining channel structure 6e may be a hollow inverted pyramid structure with the upper end and the lower end being provided with the sewage collection port 7e and the draining port 8e respectively, and the like, which is not specifically limited herein.

Figure 68:
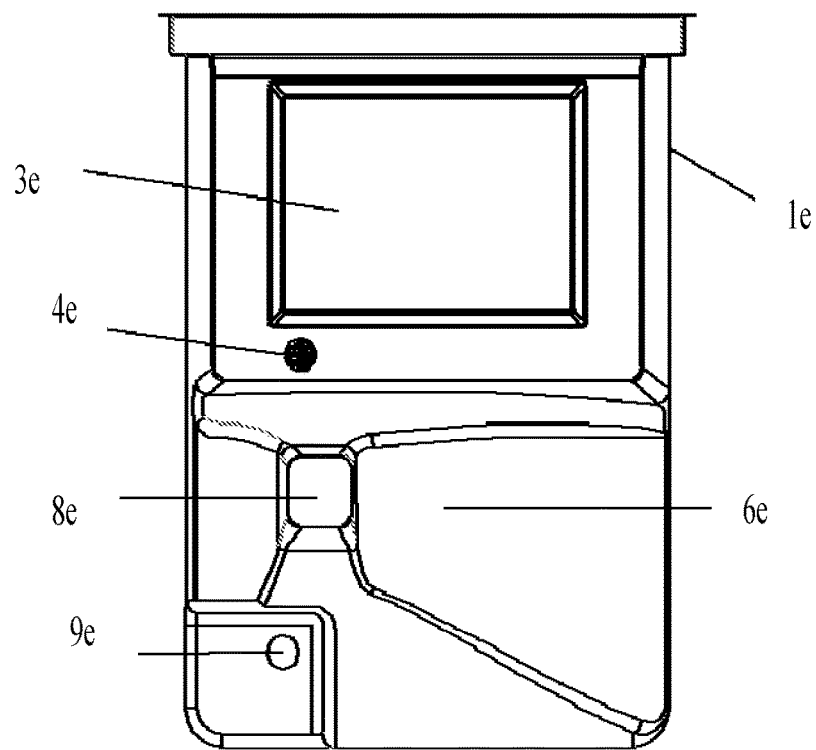
FIG. 68 is a bottom view of a cooking cavity according to an embodiment of the present invention.
Figure 69:
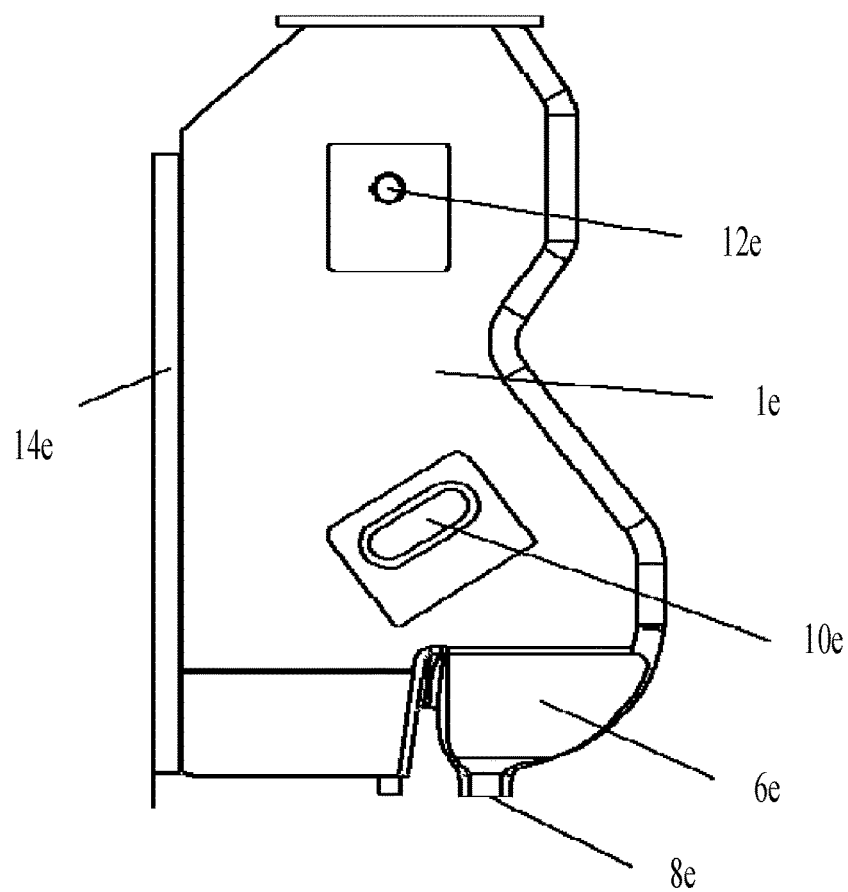
FIG. 69 is a side view of a cooking cavity according to an embodiment of the present invention.
Figure 70:
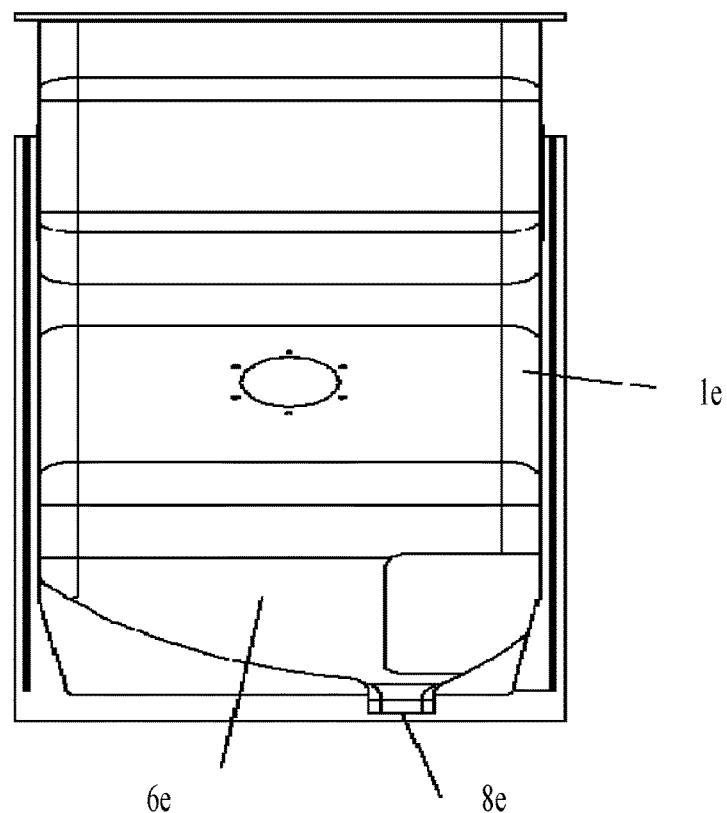
FIG. 70 is a rear view of a cooking cavity according to an embodiment of the present invention.
Figure 71:
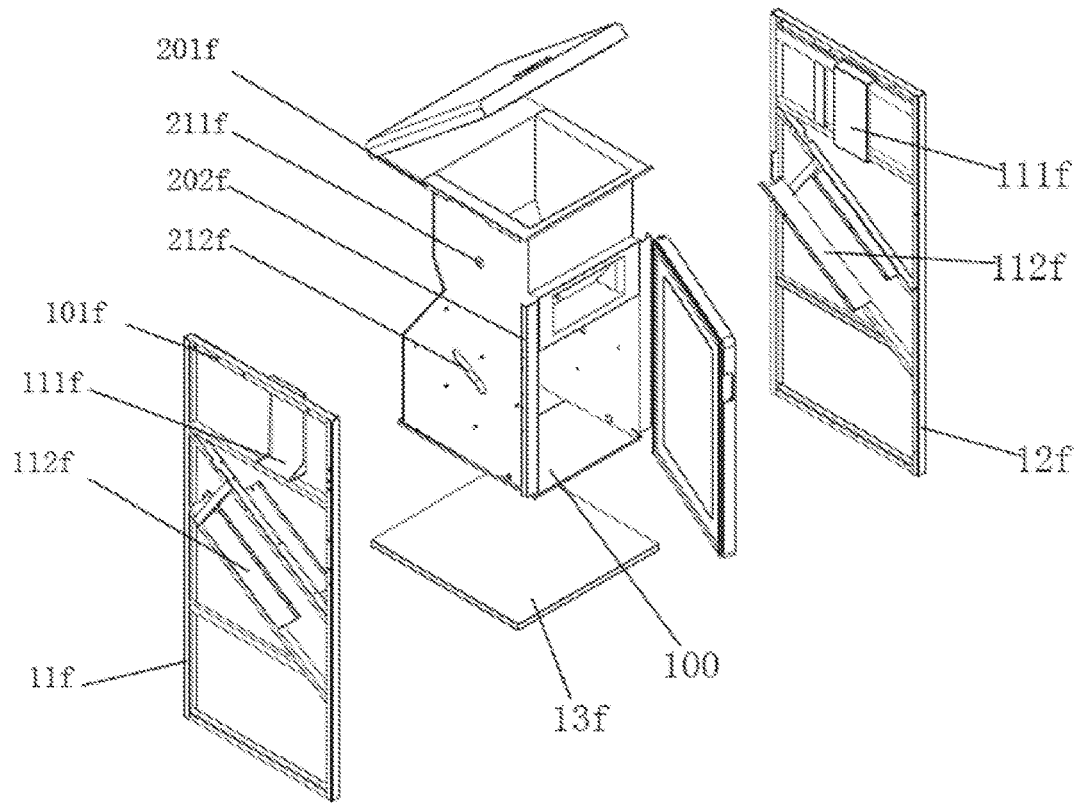
FIGS. 71-79 are schematic diagrams of structures of a cooking cavity and other functional assemblies of the cooking machine provided by the embodiment of the present invention.
Figure 72:
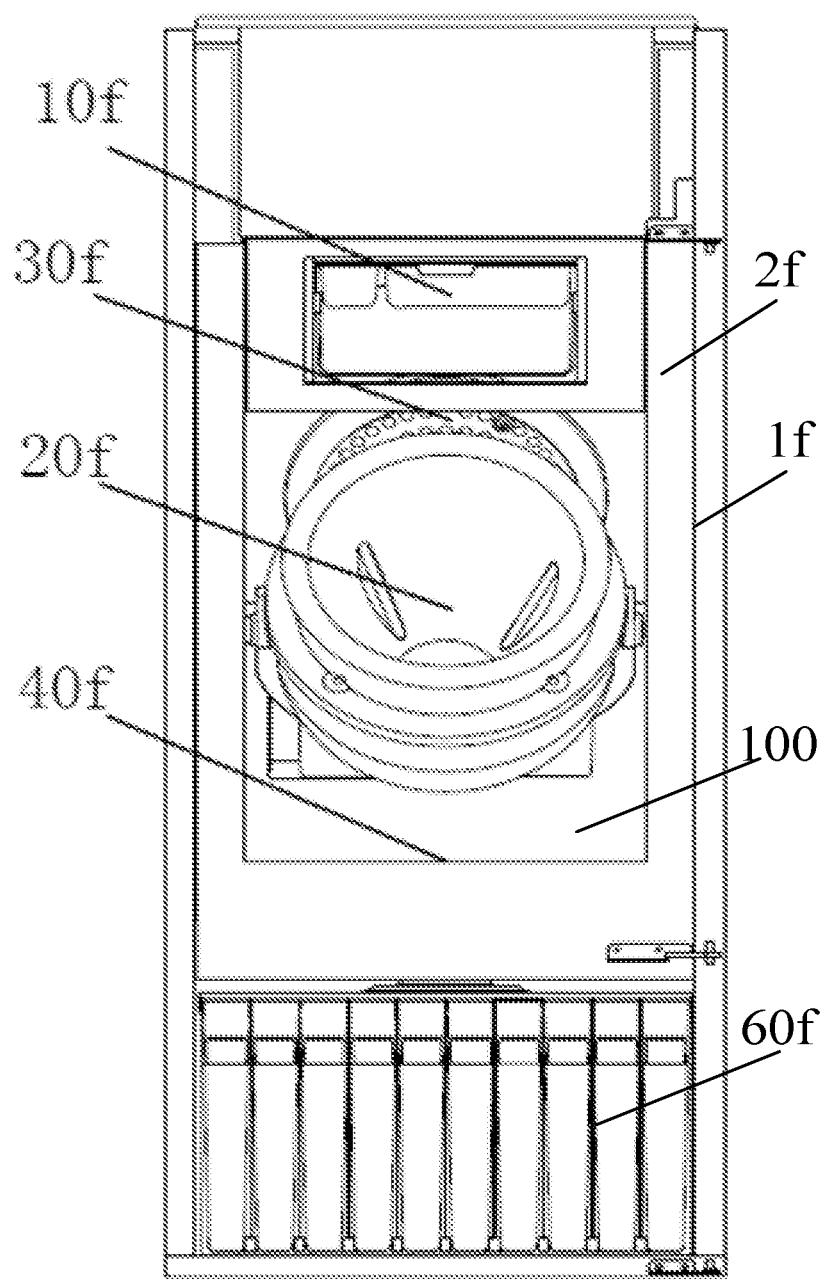
Figure 73:
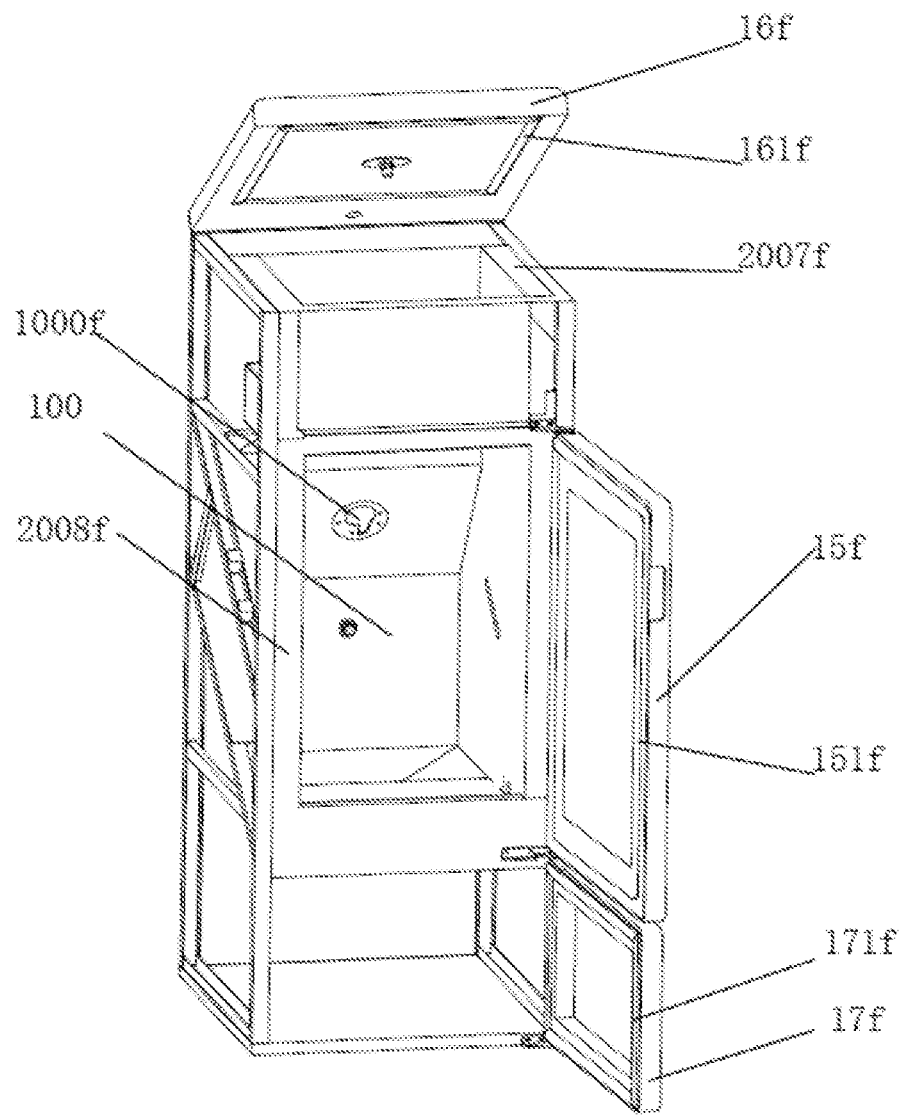
Figure 74:
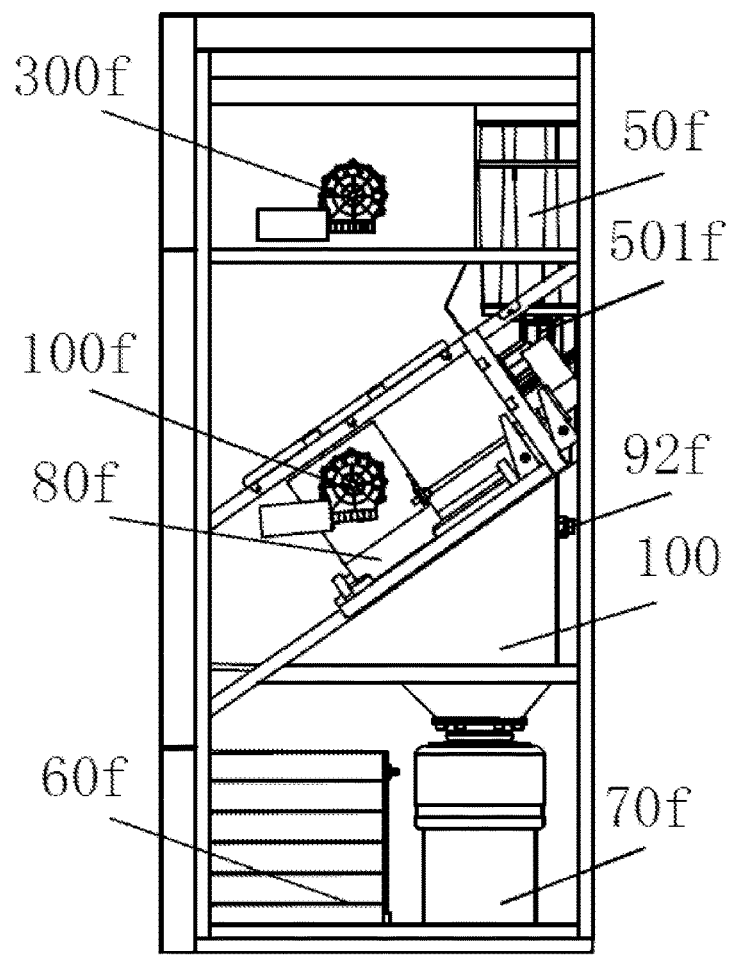
Figure 75:
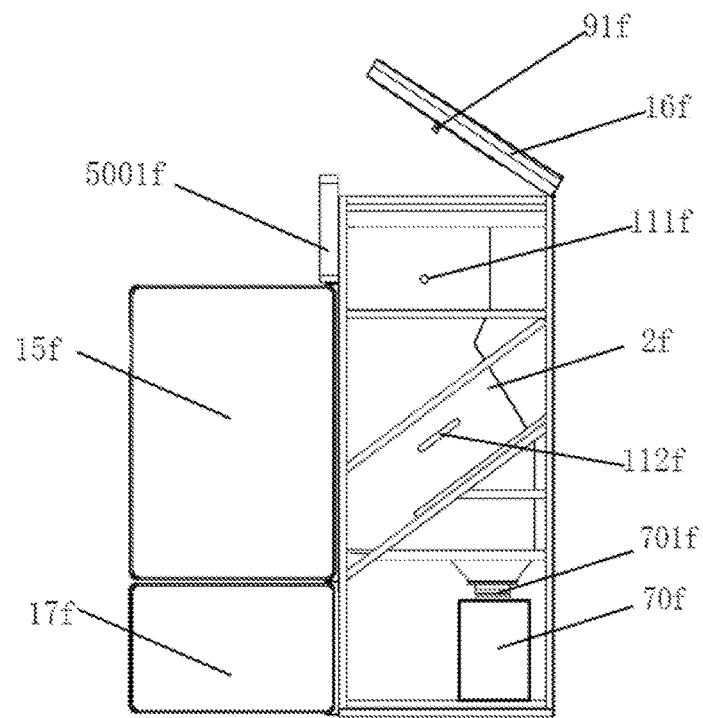
Figure 76:
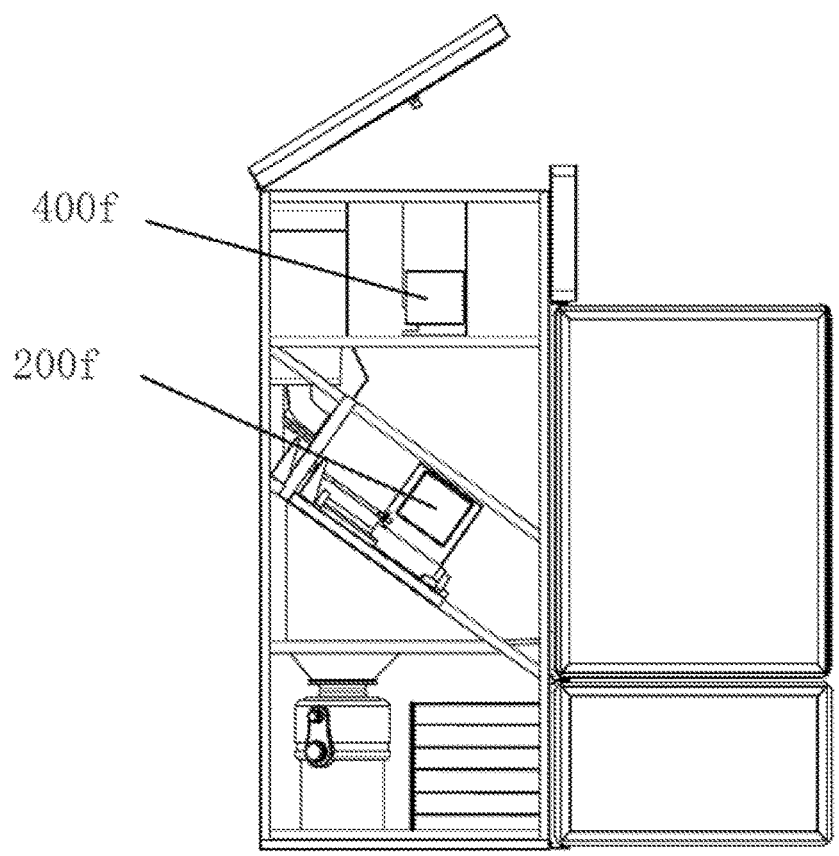
Figure 77:
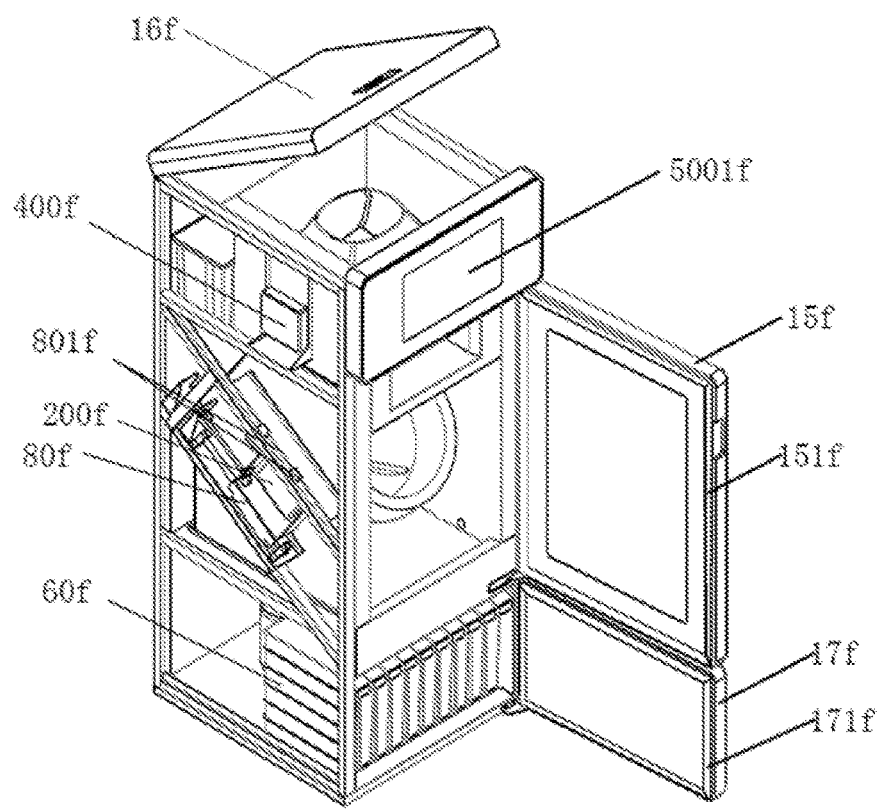
Figure 78:
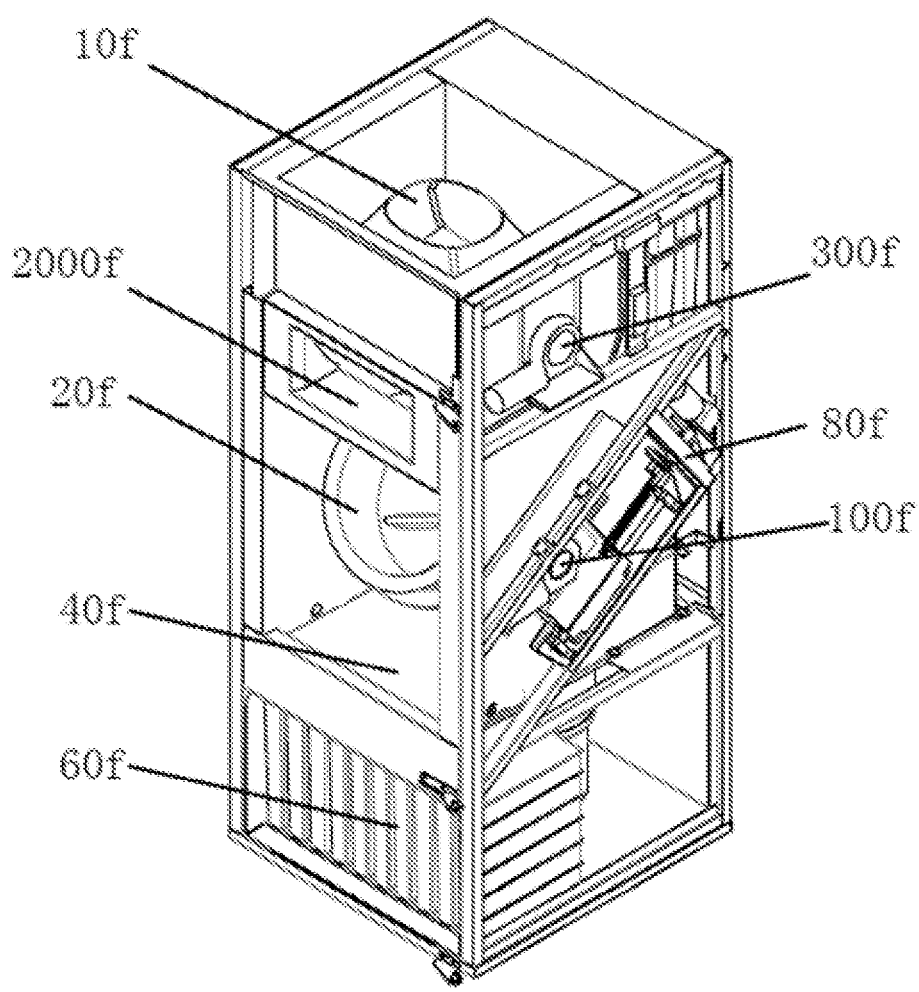
Figure 79:
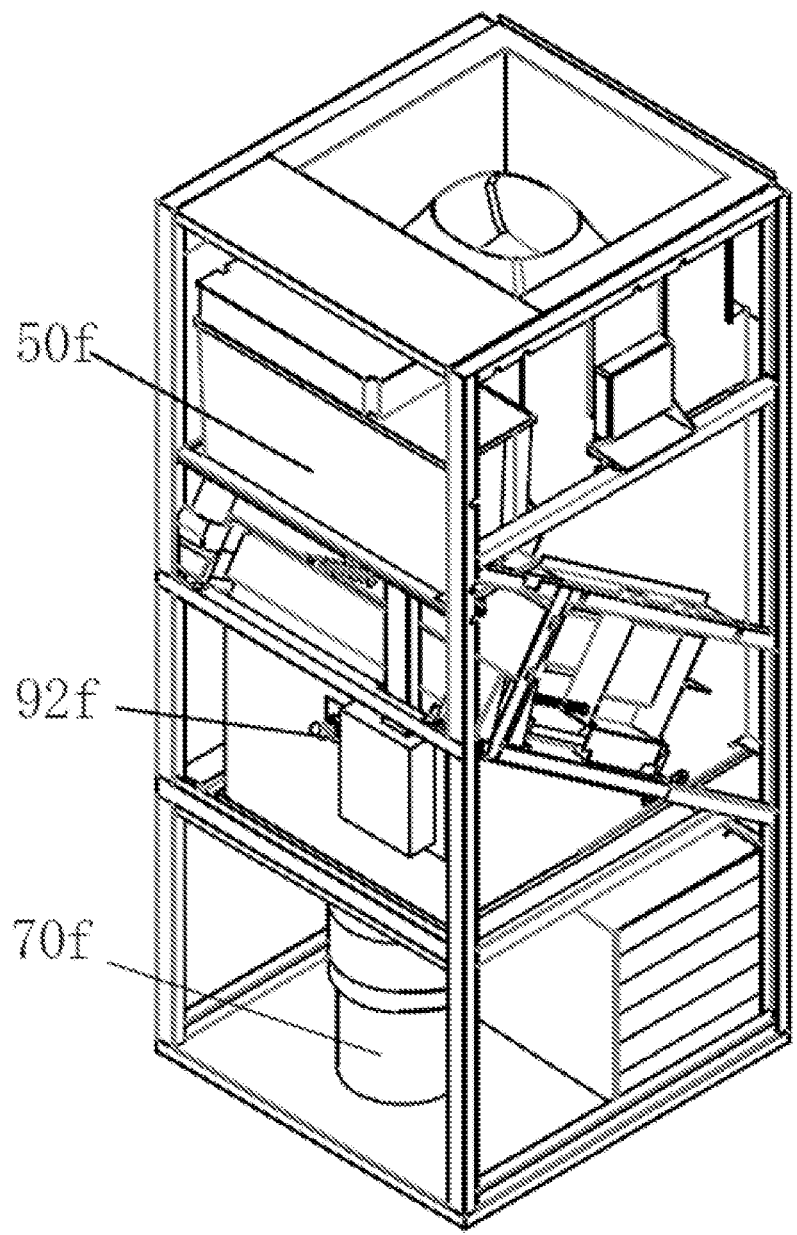

Referring to FIG. 68, the bottom of the shell 1 is further provided with a water inlet pipe installing hole 9 for a water inlet pipe (not shown) to penetrate into the shell 1, and the water inlet pipe penetrating into the shell 1 from the water inlet pipe installing hole 9 is used for cleaning the wok. Preferably, referring to FIGS. 67 and 69, the two side walls of the inner shell 1e constituting the cooking cavity 100 are each provided with a first installing hole 10e for installing a wok working position controlling device for controlling the wok to be turned in the cooking area 2e. Preferably, the first installing hole 10e can be a rotating shaft installing groove and used for installing a rotating shaft of a wok working position controlling device for controlling the wok to turn. The first installing hole 10e is also used as a wok moving installing groove and used for installing a connecting shaft of the wok moving device for driving the wok to move directionally, and the wok moving installing groove limits the movement range of the wok. An feeding area 11e located above the cooking area 2e and used for containing an ingredient feeding device (not shown) is further arranged in the cooking cavity 100, and the two side walls of the inner shell 1e forming the cooking cavity 100 are each provided with a second installing hole 12e used for installing the ingredient feeding device in the feeding area 11e. Preferably, the second installing hole 12e can be an ingredient feeding rotating shaft installing groove and used for installing a rotating shaft of the ingredient feeding device. It should be noted that the second installing hole 12e can also be an installing frame or an installing plate and the like and used for installing the ingredient feeding device, which is not specifically limited herein. Further, referring to FIG. 67, the first side of the inner shell 1e constituting the cooking cavity 100 is provided with an installing opening for installing an openable and closable door plate (not shown), and the left side, the right side and the bottom side of the installing opening are provided with sealing strips 14e. When the wok needs to be manually cleaned or devices in the cooking cavity 100 need to be maintained, the door plate arranged at the installing opening can be opened. In addition, the sealing strips 14e are arranged at the installing opening, so that the sealing strips 14e can better seal a gap between the door plate and the inner shell 1 when the door plate is closed, and the cooking cavity 100 can have better sealing performance; and therefore, external sundries (such as dust) are prevented from entering the cooking cavity 100 easily. The upper end part of the first side is further provided with a third installing position 15e which is located above the installing opening and is used for installing a human-computer interface device (not shown). Specifically, the third installing position 15e can be an installing groove which is formed in the upper end part of the first side and used for containing the human-computer interface, or the third installing position 15e can be an installing plate which is arranged at the upper end part of the first side and used for installing the human-computer interface and the like, which is not specifically limited herein.

It can be seen that cooking cavity 100 shown in FIGS. 67-70 is further provided with a dish discharging area drain outlet 4e at the bottom of the cooking cavity 100 on basis of previous embodiment, so that when sewage is accumulated at the bottom in the cooking cavity 100, the dish discharging area drain outlet 4e can discharge the sewage at the bottom in the cooking cavity 100, and the sewage in the dish discharging area drain outlet 4e can be discharged from the bottom in the cooking cavity 100, and therefore, the interior of the inner shell of the cooking machine can be more sanitary.

Therefore, in the first embodiment and the second embodiment of the present invention, the inner shell is disposed inside the outer shell, the sealed cooking cavity is formed in the inner shell, and the main cooking equipment making contact with food materials are placed in the closed space of the cooking cavity to achieve the main cooking functions of feeding, cooking, heating, dish discharging and the like, the spraying pieces are arranged in the cooking cavity to wash the cooking devices, and the accessory cooking equipment (including an electric appliance, a circuit, a power supply, a transmission line, a pipeline component and the like which is matched with the main cooking equipment to work) for assisting the main cooking equipment in realizing a cooking function are arranged outside the cooking cavity, so as to ensure the food safety and environmental sanitation. In addition, according to the cooking machine provided by the embodiments of the present invention, based on the cooking cavity arranged in the sealed manner, all the functional components are combined into a whole by taking the sealed cooking cavity as a core, the main cooking equipment such as the ingredient feeding device, the furnace body device, the wok lid device and the like which are directly contacted with food materials are arranged in the closed space of the cooking cavity, and the spraying pieces are arranged in the cooking cavity to wash the cooking devices, so that water and cooking fume are blocked in the sealed cooking cavity, the washed water is discharged in a unified manner after being treated, and environmental pollution caused by cooking fume discharge is avoided.

The following further describes how the cooking machine provided by the invention is based on the fact that all the functional components are combined into a whole with the sealed cooking cavity as the core. Referring to FIGS. 71-79, the cooking machine includes an outer shell 1f and an inner shell 2f disposed inside the outer shell, the interior of the cavity of the inner shell 2f forming a sealed cooking cavity 100. The specific structure of the cooking cavity in which the inner shell 2f is constructed may be omitted herein with reference to the foregoing description of the related embodiments. According to the cooking machine, the main cooking equipment comprising an ingredient feeding device 10f, a wok device 20f, a wok lid device 30f and a dish discharging device 40f are arranged in the sealed cooking cavity 100, and accessory cooking equipment for assisting the main cooking equipment in achieving the a cooking function is arranged outside the cooking cavity 100 and placed in a space area formed between the outer shell 1f and the inner shell 2f. The wok device 20f comprises a wok, a furnace body device used for bearing and heating the wok, a wok rotating device used for controlling the wok to rotate, a wok working position controlling device used for driving the wok to turn, and the like, and the specific structure and function refer to the related description. The accessory cooking equipment comprises a cooking fume treatment device 50f, an seasoning adding device 60f, a garbage processor 70f, a wok moving control device 80f, a wok working position conversion motor 100f, a wok working position detection device 200f, an ingredient feeding device working position conversion motor 300f, an ingredient feeding device working position detection device 400f, an electric member, a circuit member, a power supply, a transmission line and a pipeline component.

The outer shell 1f comprises a left rack 11f and a right rack 12f, and the left rack 11f and the right rack 12f are connected with the inner shell 2f so that the inner shell 2f can be fixed into the outer shell 1f. Specifically, the tops of the two side walls of the inner shell 2f are each provided a connecting upper edge opening 201f, and the tops of the left rack and the top of the right rack are each provided with a first connecting hole position 101f correspondingly connected with one of the connecting upper edge openings 201f. The two side parts of the front side wall 2008f of the inner shell 2f are each provided a connecting front edge opening 202f, and the side portions of the left rack and side portion of the right are each provided with a second connecting hole position 102f correspondingly connected with one of the connecting front edge openings 202f. The inner shell 2f with the sealed cooking cavity is fixed to the left rack 11f and the right rack 12f through matched connection of the connecting upper edge openings 201f and the first connecting hole positions 101f and matched connection of the connecting front edge openings 202f and the second connecting hole positions 102f. The left rack and the right rack are each provided with an ingredient feeding device installation position 111f correspondingly connected with an ingredient feeding mechanism installation hole 211f which is formed in the inner shell 2f and used for installing the ingredient feeding device in the feeding area. The ingredient feeding mechanism arranged in the feeding area of the cooking cavity penetrates through the installation holes 211f of the inner shell 2f and the ingredient feeding device installation positions 111f on the left rack and the right rack by supports/rotating shafts and is connected with the ingredient feeding device working position conversion motor 300f and the ingredient feeding device working position detection device 400f which are arranged on the ingredient feeding device installation positions 111f respectively. The left rack and the right rack are each provided with a wok device installation position 112f, and the wok device installation positions 112f correspond to installation grooves 212f which are formed in the inner shell 2f and used for installing the wok device 20f in the cooking area. A wok device arranged in a cooking area in the cooking cavity penetrates through an installation grooves 212f of the inner shell 2f and the wok device installation positions 112f by supports/rotating shafts and is connected with the wok working position conversion motor 100f and the wok working position detection device 200f which are respectively arranged on the wok device installation positions 112f. In addition, the wok device installation positions 112f on the left rack and the right rack are further used for installing and fixing the wok moving control device 80f used for controlling the wok to do directional movement in the cooking area, and installation positions used for arranging wok moving limiting sensors 801f are further arranged close to the wok device installation positions 112f.

The outer shell 1f further comprises a bottom plate 13f, a left side plate (not shown), a right side plate (not shown) and a rear plate 14f which are fixedly connected with the left rack and the right rack. The outer shell 1f further comprises a middle door plate 15f used for opening and closing an ingredient container guiding opening 2000f and a dish discharging outlet 2001f of the inner shell 2f, a top cover door plate 16f used for opening and closing a top cover opening 2002f of the inner shell 2f, and a seasoning bin door plate 17f used for opening and closing a seasoning area which is used for containing a seasoning adding device 60f and is formed between the inner shell 2f and the bottom plate 13f. A sealing strip 161f is arranged at the contact position of the top cover door plate 16f and the top wall 2007f of the inner shell 2f, a sealing strip 151f is arranged at the contact position of the middle door plate 15f and the front side wall 2008f of the inner shell 2f, and a sealing strip 171f is arranged at the contact position of the seasoning bin door plate 17f and the front side wall 2008f of the inner shell 2f, so as to achieving sealing and guarantee the sealing performance in the cooking cavity. It can be understood that the middle door plate 15f and the seasoning bin door plate 17f can be integrally formed. In addition, a human-machine panel installation position 500f is arranged on the upper portion of the front side wall 2008f of the inner shell 2f and used for installing a human-machine control panel 5001f, and therefore a user can operate the human-machine control panel 5001f conveniently.

In addition, spraying pieces capable of washing main cooking equipment are further arranged in the cooking cavity of the cooking machine, and the spraying pieces comprise an ingredient feeding device spraying piece 91f which is arranged at the top in the cooking cavity and used for directly washing the ingredient feeding device and a wok spraying piece 92f which is arranged at the side part or the bottom in the cooking cavity and is used for directly washing the interior of the wok. Reference is made to the previous related description regarding the specific structure and working principle of the ingredient feeding device spray piece 91f and the wok spraying piece 92f.

The cooking fume treatment device 50f is arranged between the outer shell 1f and the inner shell 2f and located on the upper portion of the rear wall of the inner shell 2f, the cooking fume treatment device 50f is communicated with the interior of the cooking cavity 100 (specifically communicated with a wok device in the cooking cavity, and a cooking fume treatment outlet 1000f is formed in the position, where a wok lid is arranged, of the inner shell 20 via a cooking fume pipeline 501f, the cooking fume in the cooking cavity (and in the wok) is discharged from the cooking fume treatment outlet 1000f so as to be treated by the cooking fume treatment device 50f. It can be understood that the inner shell 2f can also be provided with a cavity cooking fume outlet (not shown) communicated with the cooking fume treatment device 50f at other positions so that the cooking fume in the cooking cavity can be directly discharged to the cooking fume treatment device 50f from the cavity cooking fume outlet for cooking fume treatment. In addition, the cooking fume outlet of the cooking fume treatment device 50f can also be communicated with the interior of the cooking cavity, so that cooking fume treated by the cooking fume treatment device 50f is returned to the cooking cavity again to be circularly treated, and zero emission of cooking fume gas is achieved. The specific structure and treatment process that the cooking fume treatment device 50f can employ refer to the relevant description above. The seasoning adding device 60f is arranged below an inner shell forming the cooking cavity 100 and is far away from a bottom opening (the bottom opening is connected with the garbage processor 700 of the cooking cavity 100; the seasoning adding device 60f comprises seasoning bottles, and each seasoning bottle is communicated with the wok in the cooking cavity via a seasoning pipe and a seasoning pump (specifically via a connecting pipe communicated with the wok lid, the specific structure and implementation mode refer to the relevant description). The seasoning adding device adds seasoning into the wok via the seasoning pump, the seasoning pipe connecting with the seasoning bottle and an adding channel in the wok lid, and the seasoning can be added in the whole cooking process. The garbage processor 70f is arranged below the inner shell 2f forming the cooking cavity 100 and is in sealed connection with the bottom opening of the cooking cavity 100 through a garbage processor connecting piece 701f.

In the description of the present invention, it is to be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", and the like, indicate orientations or positional relationships based on those shown in the drawings, merely for convenience of description and simplification of the description, and do not indicate or imply that the device or element referred to must have a particular orientation, be constructed in a particular orientation, and be operated, and thus, are not to be construed as limiting the present invention.

Furthermore, the terms "first", "second" are used for descriptive purposes only and are not to be construed as indicating or implying relative importance or to implicitly indicate the number of technical features indicated. Thus, a feature defined as "first" or "second" may explicitly or implicitly include one or more of that features. In the description of the present invention, "a plurality" means at least two, e.g., two, three, etc., unless explicitly specified otherwise.

In the present invention, unless expressly specified and limited otherwise, the terms "installed", "jointed", "connected", "fixed" and the like are to be construed broadly, e.g., as being permanently connected, detachably connected, or integral; may be mechanically, electrically or otherwise in communication with each other; they may be directly connected or indirectly connected through intervening media, or may be connected through the use of two elements or the interaction of two elements. The specific meanings of the above terms in the present invention can be understood according to specific situations by those of ordinary skill in the art.

The steps of a method or algorithm described in connection with the present disclosure may be implemented in hardware or by a processor executing software commands. The software commands may consist of corresponding software modules, which may be stored in Random Access Memory (RAM), flash memory, Read Only Memory (ROM), Erasable Programmable Read-Only Memory (EPROM), Electrically Erasable Programmable Read-Only Memory (CD-ROM or any other removable EPROM in the art of optical disks, registers in the art of CD-ROMs, etc. An exemplary storage medium is coupled to the processor such that the processor can read information from, and write information to, the storage medium. The storage medium may, of course, also be integral to the processor.

Those skilled in the art will appreciate that in one or more of the examples described above, the functions described herein may be implemented in hardware, software, firmware, or any combination thereof. When implemented in software, the functions may be stored on or transmitted over as one or more commands or code, on a computer-readable medium. Computer-readable media includes both computer storage media and communication media including any medium that facilitates transfer of a computer program from one place to another. Storage media may be any available media that can be accessed by a general purpose or special purpose computer.

The specific embodiments described above further describe the purposes, technical schemes and beneficial effects of the present application in detail, and it is to be understood that the above description has been made only for the specific embodiments of the present application and is not intended to limit the scope of protection of the present application, but rather, on the basis of the technical schemes of the present application, the above description is not intended to limit the scope of protection of the present application. Any modifications, equivalent substitutions, improvements, etc. should be included within the scope of this application.

What is claimed is:

1. An ingredient feeding, cooking and heating system, comprising a cooking cavity formed by a hollow shell in a sealed manner and main cooking equipment arranged in an interior of the cooking cavity, the main cooking equipment comprises a wok device and an ingredient feeding device, a cooking area for accommodating the wok device is arranged at a middle portion of the interior of the cooking cavity, and a feeding area for accommodating the ingredient feeding device is arranged at an upper portion of the interior of the cooking cavity and positioned above the cooking area; the wok device comprises a wok, a wok lid for closing or opening the wok, a furnace body device adapted for bearing and heating the wok, and a wok rotating device adapted for controlling the wok to rotate; the ingredient feeding device guides in food materials and feeds the food materials into the wok, the furnace body device heats the wok and the wok rotating device rotates the wok, thereby achieving cooking processing of the food materials in the wok;

wherein the interior of the cooking cavity is further adapted as a cooking fume exhaust gathering space, and cooking fume generated by the wok device in the cooking cavity during cooking is gathered in the cooking cavity.

2. The ingredient feeding, cooking and heating system according to claim 1, wherein the wok device further comprises a wok working position controlling device for driving the wok to turn; before the ingredient feeding device feeds the food materials into the wok, the wok working position controlling device drives the wok to turn until an opening of the wok faces the ingredient feeding device.

3. The ingredient feeding, cooking and heating system according to claim 2, wherein after the ingredient feeding device guides in food materials and feeds the food materials into the wok, the wok working position controlling device drives the wok to turn until the opening of the wok faces the wok lid so as to close the wok, then the furnace body device heats the wok and the wok rotating device rotates the wok, thereby achieving cooking processing of the food materials in the wok; after the wok lid closes the wok, the wok lid rotates along with the wok when the wok rotates.

4. The ingredient feeding, cooking and heating system according to claim 2, wherein the main cooking equipment further comprises a dish discharging device, and a dish discharging area for accommodating the dish discharging device is arranged below the cooking area in the cooking cavity; after the cooking processing of the food materials in the wok is achieved, the wok is driven by the wok working position controlling device to turn until the opening of the wok faces a dish plate on the dish discharging area so as to achieve dish discharging.

5. The ingredient feeding, cooking and heating system according to claim 1, wherein the ingredient feeding device comprises an ingredient-dropping chamber for containing the food materials and at least one compartment door driving mechanism; a bottom wall of the ingredient-dropping chamber is provided with at least one ingredient-dropping opening aligned with an opening of the wok in ingredient feeding process, each ingredient-dropping opening is provided with a compartment door, and each compartment door driving mechanism is adapted for driving corresponding compartment door to be opened and closed.

6. The ingredient feeding, cooking and heating system according to claim 5, wherein a side portion of the shell forming the cooking cavity is provided with an ingredient container guiding opening corresponding to the feeding area, a side face of the ingredient-dropping chamber is provided with an ingredient-receiving opening for an ingredient container to go in and out, and the ingredient container guiding opening is correspondingly arranged with the ingredient-receiving opening; a door plate capable of being opened and closed is arranged on an outer side of the ingredient container guiding opening; the ingredient container is provided with at least one compartment respectively corresponding to the at least one ingredient-dropping opening.

7. The ingredient feeding, cooking and heating system according to claim 6, wherein the ingredient feeding device further comprises a flipping mechanism, and the flipping mechanism is adapted for turning the ingredient feeding device as a whole up and down; when the ingredient feeding device guides in the food materials, each ingredient-dropping opening faces a direction opposite to the opening of the wok, and the ingredient-receiving opening is aligned with the ingredient container guiding opening; after the ingredient feeding device guides in the food materials, the ingredient feeding device is turned by the flipping mechanism, so that each ingredient-dropping opening faces the opening of the wok to achieve feeding.

8. The ingredient feeding, cooking and heating system according to claim 1, wherein two side walls of the shell forming the cooking cavity are respectively provided with installing holes for installing the ingredient feeding device in the feeding area;

the system further comprises an ingredient feeding device working position conversion motor or/and an ingredient feeding device working position detection device arranged outside the cooking cavity, and the ingredient feeding device working position conversion motor or/and the ingredient feeding device working position detection device is/are installed in a matched manner with the ingredient feeding device arranged in the cooking cavity via the installing holes, respectively.

9. The ingredient feeding, cooking and heating system according to claim 3, further comprising a wok lid driving device arranged outside the cooking cavity and adapted for controlling the wok lid to move up and down inside the cooking cavity, and the wok lid is moved directionally towards or away from the opening of the wok by the wok lid driving device so as to close or open the wok.

10. The ingredient feeding, cooking and heating system according to claim 3, further comprising a wok moving control device arranged outside the cooking cavity and adapted for driving the wok to move up and down inside the cooking area; the wok lid is fixed in the cooking cavity by a wok lid fixing device, and the opening of the wok is moved directionally towards or away from the wok lid by the wok moving control device so as to realize the closing or opening of the wok.

11. The ingredient feeding, cooking and heating system according to claim 10, wherein two side walls of the shell are respectively provided with installing grooves for installing the wok device in the cooking area; and a sealing ring is arranged at a juncture of the wok device and each of the installing grooves;

the system further comprising a wok working position conversion motor or/and a wok working position detection device arranged outside the cooking cavity, and the wok working position conversion motor or/and the wok working position detection device is/are connected with the wok device via the installing grooves, respectively;

each of the installing grooves further serves as a wok moving installing groove for a connecting shaft of a wok moving control device, and the wok moving installing groove limits a movement range of the wok.

12. The ingredient feeding, cooking and heating system according to claim 4, wherein a front side wall of the shell is provided with an observation opening corresponding to the cooking area, the observation opening is provided with a door plate capable of being opened and closed at an outer side;

a front side wall of the shell is provided with a dish discharging outlet corresponding to the dish discharging area, the dish discharging outlet is provided with a door plate capable of being opened and closed at the outer side; or/and a top wall of the shell is provided with a top cover opening for installing a top cover plate capable of being opened and closed.

13. The ingredient feeding, cooking and heating system according to claim 4, wherein the feeding area, the cooking area and the dish discharging area are sequentially communicated; the ingredient feeding device, the wok device and the dish discharging device which are respectively arranged in the feeding area, the cooking area and the dish discharging area are arranged in a matched manner to complete feeding, cooking and dish discharging processes.

14. The ingredient feeding, cooking and heating system according to claim 1, further comprising a cooking fume treatment device, a side wall of the shell is provided with a first exhaust port for connecting the cooking fume treatment device, and the cooking fume gathered in the cooking cavity is exhausted to the cooking fume treatment device from the first exhaust port to be treated.

15. The ingredient feeding, cooking and heating system according to claim 14, wherein the wok lid is provided with a smoke outlet corresponding to the first exhaust port; the smoke outlet is communicated with a cooking fume inlet of the cooking fume treatment device via a cooking fume pipeline; the cooking fume generated in the cooking process with the wok being closed is discharged to the cooking fume treatment device from the smoke outlet to be treated; cooking fume escaping into the cooking cavity is exhausted to the cooking fume treatment device from the smoke outlet to be treated when the wok is opened.

16. The ingredient feeding, cooking and heating system according to claim 15, wherein a side wall or bottom wall of the shell is provided with an exhaust gas return port communicated with a cooking fume outlet of the cooking fume treatment device, and cooking fume exhausted after being treated by the cooking fume treatment device enters the cooking cavity from the exhaust gas return port to be subjected to circulating cooking fume treatment so as to achieve zero emission of the cooking fume.

17. The ingredient feeding, cooking and heating system according to claim 1, wherein the interior of the cooking cavity is further adapted as a cleaning space and provided with a spraying piece for washing the main cooking equipment, and an opening adapted for being connected with a water outlet is formed in a bottom portion of the cooking cavity so as to drain water generated after the main cooking equipment is washed by the spraying piece;

the spraying piece comprises an ingredient feeding device spraying piece arranged at a top portion of the cooking cavity and faces the ingredient feeding device, and the ingredient feeding device is directly flushed by the ingredient feeding device spraying piece;

the spraying piece further comprises a wok spraying piece arranged at a side portion or a bottom portion of the cooking cavity, and an interior of the wok is directly flushed by the wok spraying piece when the wok is driven to turn until the opening of the wok faces the wok spraying piece.

18. The ingredient feeding, cooking and heating system according to claim 3, further comprising a seasoning adding device arranged outside the cooking cavity, the seasoning adding device comprises seasoning bottles adapted for containing liquid seasonings, each of the seasoning bottles is communicated with the wok device via a seasoning pipe, and a seasoning pump is arranged at the seasoning pipe; and each of the seasoning bottles is communicated with a smoke outlet formed in a wok lid and a first exhaust port which is formed in the shell and corresponds to the smoke outlet via the seasoning pipe, and the seasoning adding device is adapted for adding seasonings in a cooking process with the wok closed.

19. A full-closed cooking machine, comprising the ingredient feeding, cooking and heating system according to claim 1.

* * * * *